US012064972B2

(12) United States Patent
Kawate et al.

(10) Patent No.: US 12,064,972 B2
(45) Date of Patent: *Aug. 20, 2024

(54) LIQUID CONTAINER AND LIQUID EJECTION SYSTEM

(71) Applicant: SEIKO EPSON CORPORATION, Tokyo (JP)

(72) Inventors: Hiroyuki Kawate, Hokuto (JP); Akihiro Toya, Matsumoto (JP); Yoshiaki Shimizu, Matsumoto (JP); Mikinori Sawai, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/143,392

(22) Filed: May 4, 2023

(65) Prior Publication Data

US 2023/0271422 A1 Aug. 31, 2023

Related U.S. Application Data

(63) Continuation of application No. 17/479,839, filed on Sep. 20, 2021, now Pat. No. 11,679,595, which is a
(Continued)

(30) Foreign Application Priority Data

May 27, 2016 (JP) ................................ 2016-106433
May 27, 2016 (JP) ................................ 2016-106434
(Continued)

(51) Int. Cl.

| | |
|---|---|
| *B41J 2/175* | (2006.01) |
| *B41J 29/02* | (2006.01) |
| *B41J 29/13* | (2006.01) |

(52) U.S. Cl.
CPC ....... *B41J 2/17523* (2013.01); *B41J 2/17513* (2013.01); *B41J 2/17526* (2013.01);
(Continued)

(58) Field of Classification Search
CPC ......................... B41J 2/17503; B41J 2/17513; B41J 2/17509; B41J 2/17523; B41J 2/175;
(Continued)

(56) References Cited

U.S. PATENT DOCUMENTS

| | | | |
|---|---|---|---|
| 7,018,027 | B2 | 3/2006 | Harada et al. |
| 7,048,348 | B2 | 5/2006 | Mochizuki et al. |

(Continued)

FOREIGN PATENT DOCUMENTS

| | | | |
|---|---|---|---|
| CN | 1919614 | A | 2/2007 |
| CN | 104442001 | A | 3/2015 |

(Continued)

OTHER PUBLICATIONS

Jun. 14, 2021 Notice of Allowance issued in U.S. Appl. No. 16/303,870.

(Continued)

*Primary Examiner* — Anh T Vo
(74) *Attorney, Agent, or Firm* — Oliff PLC

(57) ABSTRACT

A liquid container includes a storage portion configured to store the liquid and a connection member. The connection member is provided with a liquid outlet which is inserted with a liquid introduction portion, a container-side electrical connector which makes electrical contact with an apparatus-side electrical connection unit while receive at least +Z direction force from the apparatus-side electrical connection unit, a first receiver configured to receive a first positioning portion, a second receiver configured to receive a second positioning portion, and a recess which houses a protrusion of the case. The recess and the container-side electrical
(Continued)

connector are formed at positions which at least partially overlap each other when viewed from a Z direction in a mounting state. In the mounting state, the width of the liquid container in the Z directions is larger than the width in the Y directions and the width in the X directions.

6 Claims, 35 Drawing Sheets

Related U.S. Application Data continuation of application No. 16/303,870, filed as application No. PCT/JP2017/018634 on May 18, 2017, now Pat. No. 11,148,426.

(30) Foreign Application Priority Data

May 27, 2016 (JP) ................................ 2016-106435
Aug. 12, 2016 (JP) ................................ 2016-158399

(52) U.S. Cl.
CPC .......... *B41J 2/17553* (2013.01); *B41J 29/02* (2013.01); *B41J 29/13* (2013.01)

(58) Field of Classification Search
CPC .... B41J 2/1752; B41J 2/1753; B41J 2/17553; B41J 29/13; B41J 25/34; B41J 2002/17516
See application file for complete search history.

(56) References Cited

U.S. PATENT DOCUMENTS

| | | | |
|---|---|---|---|
| 7,237,880 | B2 | 7/2007 | Miyazawa et al. |
| 7,293,864 | B2 | 11/2007 | Kimura et al. |
| 7,438,401 | B2 | 10/2008 | Seino et al. |
| 7,806,523 | B2 | 10/2010 | Seino et al. |
| 7,954,935 | B2 | 6/2011 | Kimura et al. |
| 8,192,003 | B2 | 6/2012 | Ishizawa |
| 8,220,909 | B2 | 7/2012 | Domae |
| 8,449,091 | B2 | 5/2013 | Kanbe et al. |
| 8,931,887 | B2 | 1/2015 | Aoki et al. |
| 9,090,078 | B2 | 7/2015 | Karasawa et al. |
| 9,139,013 | B2 | 9/2015 | Nagashima et al. |
| 10,449,772 | B2 | 10/2019 | Nagashima et al. |
| 11,148,426 | B2 | 10/2021 | Kawate et al. |
| 2005/0036015 | A1 | 2/2005 | Seino et al. |
| 2005/0052511 | A1 | 3/2005 | Seino et al. |
| 2005/0068382 | A1 | 3/2005 | Kimura et al. |
| 2005/0185036 | A1 | 8/2005 | Seino et al. |
| 2008/0024572 | A1 | 1/2008 | Kimura et al. |
| 2008/0106575 | A1 | 5/2008 | Shimizu et al. |
| 2008/0136878 | A1 | 6/2008 | Nozawa et al. |
| 2008/0284810 | A1 | 11/2008 | Shimizu et al. |
| 2009/0262170 | A1 | 10/2009 | Ishizawa |
| 2010/0225704 | A1 | 9/2010 | Aoki et al. |
| 2011/0310188 | A1 | 12/2011 | Kanbe et al. |
| 2013/0186513 | A1 | 7/2013 | Aoki et al. |
| 2015/0062262 | A1 | 3/2015 | Petersen et al. |
| 2015/0077483 | A1 | 3/2015 | Nagashima et al. |
| 2015/0077484 | A1 | 3/2015 | Nagashima et al. |
| 2015/0097902 | A1 | 4/2015 | Nagashima et al. |
| 2015/0321481 | A1 | 11/2015 | Ishizawa et al. |
| 2016/0031224 | A1 | 2/2016 | Aoki et al. |
| 2016/0096375 | A1 | 4/2016 | Ozeki |
| 2017/0021634 | A1 | 1/2017 | Tsukahara et al. |
| 2017/0057236 | A1 | 3/2017 | Hatano et al. |
| 2017/0341395 | A1 | 11/2017 | Toya et al. |

FOREIGN PATENT DOCUMENTS

| | | | |
|---|---|---|---|
| EP | 1798044 | A1 | 6/2007 |
| EP | 2848411 | A2 | 3/2015 |
| JP | 2002192752 | A | 7/2002 |
| JP | 2005059317 | A | 3/2005 |
| JP | 2007098958 | A | 4/2007 |
| JP | 2009279876 | A | 12/2009 |
| JP | 2010-012803 | A | 1/2010 |
| JP | 2010-208038 | A | 9/2010 |
| JP | 2011-235652 | A | 11/2011 |
| JP | 2014240182 | A | 12/2014 |
| JP | 2015-058545 | A | 3/2015 |
| JP | 2015058703 | A | 3/2015 |
| JP | 2015-074103 | A | 4/2015 |
| JP | 2015101008 | A | 6/2015 |
| JP | 2015174302 | A | 10/2015 |
| JP | 2015214040 | A | 12/2015 |
| JP | 2016-043595 | A | 4/2016 |
| JP | 5980391 | B1 | 8/2016 |
| JP | 2017209945 | A | 11/2017 |
| JP | 6702077 | B2 | 5/2020 |
| WO | 2004/037541 | A1 | 5/2004 |
| WO | 2013/105504 | A1 | 7/2013 |
| WO | 2015/199703 | A1 | 12/2015 |

OTHER PUBLICATIONS

Sep. 28, 2022 Office Action Issued In U.S. Appl. No. 17/479,839.
Feb. 9, 2023 Notice of Allowance Issued in U.S. Appl. No. 17/479,839.

LIQUID CONTAINER AND LIQUID EJECTION SYSTEM

CROSS-REFERENCE TO RELATED APPLICATIONS

This application is a continuation of U.S. patent application Ser. No. 17/479,839 filed Sep. 20, 2021, which is a continuation of U.S. patent application Ser. No. 16/303,870 filed May 27, 2016; which is a national phase entry of PCT/JP2017/018634, filed May 18, 2017; which claims priority to Japanese Appl. 2016-106433, filed May 27, 2016; Japanese Appl. 2016-106434, filed May 27, 2016; Japanese Appl. 2016-106435, filed May 27, 2016; and Japanese Appl. 2016-158399, filed Aug. 12, 2016: the contents of all of which are incorporated by reference herein in their entirety.

FIELD

The present invention relates to a liquid container and a liquid ejection system.

BACKGROUND

As one example of a liquid container, for example, an "ink pack" as disclosed in Patent Literature 1 to 3 described below is known. An ink pack stores ink to be supplied to an inkjet printer, which is an example of a liquid ejection apparatus, in a flexible container. The inkjet printer is also simply referred to as "printer" below. Some printers mounted with an ink pack include a case such as a tray for holding the ink pack. In these kinds of printers, the ink pack is disposed in the case and both the ink pack and the case are mounted to the printer, which establishes an ink supply path and electrical communication path between the ink pack and the printer.

CITATION LIST

Patent Literature

[Patent Literature 1] Japanese Unexamined Application Publication 2009-279876
[Patent Literature 2] WO 2013/105504 Pamphlet
[Patent Literature 3] Japanese Unexamined Application Publication 2014-240182

SUMMARY

Technical Problem

An ink pack is preferably mounted to a printer at a predetermined appropriate posture. When the mounting posture is not appropriate, an ink supply path and an electrical communication path with the printer may not be established. There is also the risk that the connection state of the ink supply path and the electrical communication path is unstable and deteriorates over time. In addition, excessive stress, damage and deterioration may occur due to contact with components of the printer during connection with the printer. Improving the mounting posture of the ink pack when mounted to the printer has been a topic of research for many years, and there is still room for improvement. This problem is not just limited to ink packs and printing systems which include ink packs and printers and also applies to liquid containers and liquid ejection systems which include a liquid container and a liquid ejection apparatus.

Solution to Problem

The present invention has been made in order to solve at least one of the above-mentioned problems and is able to be implemented in the form of the following aspects.

(1) According to a first aspect of the present invention, a liquid container configured to be mounted onto a liquid ejection apparatus is provided. A direction parallel to a gravity direction is defined as Z directions, a direction of the Z directions which is the same as the gravity direction is defined as a +Z direction, a direction of the Z directions opposite to the gravity direction is defined as a −Z direction, a direction intersecting the Z directions is defined as Y directions, one direction of the Y directions is defined as a +Y direction and another direction of the Y directions is defined as a −Y direction, a direction orthogonal to the Z directions and the Y directions is defined as X directions, one direction of the X directions is defined as a +X direction and another direction of the X directions is defined as a −X direction. The liquid ejection apparatus may include a housing, a case, an apparatus-side fixing structure, a liquid introduction portion, an apparatus-side electrical connection unit, a first positioning portion and a second positioning portion. The housing may include the case storage portion. The case may be configured to move along the +Y direction, to thereby be inserted into the case storage portion. The case may include a protrusion and a case-side fixing structure. The protrusion may protrude toward the −Z direction side at an end portion on the +Y direction side. The case-side fixing structure may include an internal space of the protrusion. The case-side fixing structure may be configured to engage with an apparatus-side fixing structure to restrict movement of the case toward the −Y direction while a force facing the −Z direction side is applied to the case in a case storage state in which the case is mounted to the case storage portion. The liquid introduction portion may be positioned on an end of the case storage portion on the +Y direction side. The apparatus-side electrical connection unit may be positioned on the +Y direction side of the case storage portion. The first positioning portion and the second positioning portion which each extend from an end portion of the case storage portion on the +Y direction side toward the −Y direction side may be provided at positions separated from each other in the X directions and sandwich the liquid introduction portion. The liquid container may be configured to be mounted to and removed from the case of the liquid ejection apparatus. The liquid container may include a storage portion and a connection member. The storage portion may be flexible and store liquid. The connection member may be positioned on an end on the +Y direction side when the liquid container is in a mounting state in which the liquid container is mounted to the liquid ejection apparatus. The connection member may be provided with a liquid outlet, a container-side electrical connector, a first receiver, a second receiver and a recess. The liquid outlet may be configured to receive insertion of the liquid introduction portion in the −Y direction in the mounting state. The container-side electrical connector may be configured to electrically connect to the apparatus-side electrical connection unit while receive at least force having a +Z direction component from the apparatus-side electrical connection unit in the mounting state. The first receiver may be configured to receive the first positioning portion in the mounting state. The second receiver may be configured to receive the second positioning portion in the mounting state. The recess may be recessed in the −Z direction and be configured to house the protrusion of the holder in the mounting state. The recess and the container-side electrical connector may be provided at positions at which the recess and the container-side electrical connector at least partially overlap when viewed from the Z directions in a posture in the mounting state. In the posture in the mounting state, a width of the liquid container in the Z directions may smaller than a width of the liquid container in the Y directions and a width of the liquid container in the X directions.

According to the liquid container according to this aspect, the +Z direction force applied to the container-side electrical connector from the apparatus-side electrical connection unit is at least partly reduced by the −Z direction force applied to the case-side fixing structure by the apparatus-side fixing structure in order to form the engagement state of the case. Therefore, a component of Z directions force applied to the liquid container is reduced, the arrangement posture of the liquid container is prevented from deviating in the Z directions from an appropriate posture, and the state of connection between the liquid ejection apparatus and the liquid container is improved. In addition, excessive stress is prevented from occurring at a contact portion between the liquid ejection apparatus and the liquid container due to deterioration of the arrangement posture of the liquid container. Because of this, damage and deterioration at the connection portion is reduced. In addition, according to the liquid container of this aspect, because the width in the Z directions is smaller than the other widths in the X directions and the Y directions in the posture in the mounting state, the mounting posture of the liquid container on the case is further stabilized. Therefore, the state of connection between the liquid ejection apparatus and the liquid container is improved even further.

(2) In the liquid container according to the above-described aspect, the container-side electrical connector may include a contact surface configured to contact with the apparatus-side electrical connection unit in the mounting state, and, when the liquid container is in the posture in the mounting state, a normal vector of the contact surface may include a −Z direction vector component and a +Y direction vector component. According to the liquid container of this aspect, an electrical connection state between the container-side electrical connector and the apparatus-side electrical connection unit is formed by using the force generated when the case moves in the +Y direction, and electrical connectivity between the container-side electrical connector and the apparatus-side electrical connection unit is enhanced.

(3) In the liquid container according to the above-described aspect, when the liquid container is placed in the posture in the mounting state, the first receiver may be positioned on the −X direction side relative to the liquid outlet and the second receiver may be positioned on the +X direction side relative to the liquid outlet. According to the liquid container of this aspect, when the liquid container is mounted to the liquid ejection apparatus, providing a pair of positioning portions and a pair of receivers improves positioning accuracy in the X directions when mounting the liquid outlet of the liquid container to the liquid introduction portion of the liquid ejection apparatus. Therefore, connectivity between the liquid introduction portion and the liquid outlet is improved.

(4) In the liquid container according to the above-described aspect, when the liquid container is placed in the posture in the mounting state, the container-side electrical connector and the recess may be positioned between the liquid outlet and the first receiver in the X directions. According to the liquid container of this aspect, providing the pair of positioning portions and the pair of receivers improves positioning accuracy in the X directions when mounting the liquid outlet to the liquid introduction portion and positioning accuracy when mounting the container-side electrical connector to the apparatus-side electrical connection unit. Therefore, connectivity between the liquid outlet and the liquid introduction portion and electrical connectivity between the apparatus-side electrical connection unit and the container-side electrical connector is improved. In addition, the distance between the first receiver and the second receiver in the X directions is increased by the size of the container-side electrical connector and the recess provided between the liquid outlet and the first receiver and positioning accuracy is further improved by providing the pair of positioning portions and the pair of receivers.

(5) In the liquid container according to the above-described aspect, the first receiver may have a first opening configured to receive insertion of the first positioning portion; the second receiver may have a second opening configured to receive insertion of the second positioning portion; and, when the liquid container is placed in the posture in the mounting state, an open width of the second opening in the X directions may be larger than an open width of the first opening in the X directions. According to the liquid container of this aspect, the angle in the X directions when the second positioning portion is inserted into the second receiver and positioning is started can be given some margin, connectivity between the liquid ejection apparatus and the liquid container is improved. Further, due to the margin, stress generated at the connection portion when the liquid ejection apparatus and the liquid container are connected to each other is relieved.

(6) According to a second aspect of the present invention, there is provided a liquid ejection system. The liquid ejection system may include a liquid ejection apparatus and a liquid container. Directions parallel to a gravity direction are defined as Z directions, a direction of the Z directions which is the same as the gravity direction is defined as a +Z direction, a direction of the Z directions opposite to the gravity direction is defined as a −Z direction, directions intersecting the Z directions are defined as Y directions, one direction of the Y directions is defined as a +Y direction and another direction of the Y directions is defined as a −Y direction, directions orthogonal to the Z directions and the Y directions are defined as X directions, one direction of the X directions is defined as a +X direction and another direction of the X directions is defined as a −X direction. The liquid ejection apparatus may include a housing, a case, an apparatus-side fixing structure, a liquid introduction portion, an apparatus-side electrical connection unit, a first positioning portion and a second positioning portion. The housing may include the case storage portion. The case may be configured to move along the +Y direction, to thereby be inserted into the case storage portion. The case may include a hollow protrusion which protrudes toward the −Z direction side at an end portion on the +Y direction side. The case-side fixing structure may include an internal space of the protrusion. The apparatus-side fixing structure may be configured to engage with the case-side fixing structure to restrict movement of the case toward the −Y direction while a force facing the −Z direction side is applied to the case in a case storage state in which the case is mounted to the case storage portion. The liquid introduction portion may be positioned on an end of the case storage portion on the +Y direction side. The apparatus-side electrical connection unit may be positioned on the +Y direction side of the case storage portion. The first positioning portion and the second positioning portion which each extend from an end portion of the case storage portion on the +Y direction side toward the −Y direction side may be provided at positions separated from each other in the X directions and sandwich the liquid introduction portion. The liquid container may be configured to be mounted to and removed from the case of the liquid ejection apparatus. The liquid container may include a storage portion and a connection member. The storage portion may be flexible and store liquid. The connection member may be positioned on an end on the +Y direction side when the liquid container is in a mounting state in which the liquid container is mounted to the liquid ejection apparatus. The connection member may be provided with a liquid outlet, a container-side electrical connector, a first receiver, a second receiver and a recess. The liquid outlet may be configured to receive insertion of the liquid introduction portion in the −Y direction in the mounting state. The container-side electrical connector may be configured to electrically connect to the apparatus-side electrical connection unit while receive at least force having a +Z direction component from the apparatus-side electrical connection unit in the mounting state. The first receiver may be configured to receive the first positioning portion in the mounting state. The second receiver may be configured to receive the second positioning portion in the mounting state. The recess may be recessed in the −Z direction and be configured to house the protrusion of the case in the mounting state. The recess and the container-side electrical connector may be provided at positions at which the recess and the container-side electrical connector at least partially overlap when viewed from the Z directions in a posture in the mounting state. In the posture in the mounting state, a width of the liquid container in the Z directions may smaller than a width of the liquid container in the Y directions and a width of the liquid container in the X directions.

According to the liquid ejection system of this aspect, in the liquid container, the +Z direction force applied to the container-side electrical connector from the apparatus-side electrical connection unit is at least partly reduced by the −Z direction force applied to the case-side fixing structure by the apparatus-side fixing structure in order to form the engagement state of the case. Therefore, a component of Z direction force applied to the liquid container is reduced, the arrangement posture of the liquid container is prevented from deviating in the Z directions from an appropriate posture, and the state of connection between the liquid ejection apparatus and the liquid container is improved. In addition, excessive stress is prevented from occurring at a contact portion between the liquid ejection apparatus and the liquid container due to deterioration of the arrangement posture of the liquid container, and damage and deterioration at the connection portion is reduced. In addition, according to the liquid ejection system of this aspect, the width in the Z directions is smaller than the other widths in the X directions and the Y directions in the mounting state posture, so the mounting posture of the liquid container on the case is further stabilized. Therefore, the state of connection between the liquid ejection apparatus and the liquid container is improved even further.

(7) In the liquid ejection system according to the above-described aspect, the container-side electrical connector may include a contact surface configured to contact with the apparatus-side electrical connection unit in the mounting state, and, when the liquid container is in the posture in the mounting state, a normal vector of the contact surface may include a −Z direction vector component and a +Y direction vector component. According to the liquid ejection system of this aspect, an electrical connection state between the container-side electrical connector and the apparatus-side electrical connection unit is formed by using the force generated when the case moves in the +Y direction and electrical connectivity between the container-side electrical connector and the apparatus-side electrical connection unit is enhanced.

(8) In the liquid ejection system according to the above-described aspect, when the liquid container is placed in the posture in the mounting state, the first receiver may be positioned on the −X direction side relative to the liquid outlet and the second receiver may be positioned on the +X direction side relative to the liquid outlet. According to the liquid ejection system of this aspect, when the liquid container is mounted to the liquid ejection apparatus, providing a pair of positioning portions and a pair of receivers improves positioning accuracy in the X directions when mounting the liquid outlet of the liquid container to the liquid introduction portion of the liquid ejection apparatus. Therefore, connectivity between the liquid introduction portion and the liquid outlet is improved.

(9) In the liquid ejection system according to the above-described aspect, when the liquid container is placed in the posture in the mounting state, the container-side electrical connector and the recess may be positioned between the liquid outlet and the first receiver in the X directions. According to the liquid ejection system of this aspect, providing the pair of positioning portions and the pair of receivers improves positioning accuracy in the X directions when mounting the liquid outlet to the liquid introduction portion and positioning accuracy when mounting the container-side electrical connector to the apparatus-side electrical connection unit. Therefore, connectivity between the liquid outlet and the liquid introduction portion and electrical connectivity between the apparatus-side electrical connection unit and the container-side electrical connector is improved. In addition, the distance between the first receiver and the second receiver in the X directions is increased by the size of the container-side electrical connector and the recess provided between the liquid outlet and the first receiver and positioning accuracy is further improved by providing the pair of positioning portions and the pair of receivers.

(10) In the liquid ejection system according to the above-described aspect, the first receiver may have a first opening through which the first positioning portion is inserted, the second receiver may have a second opening through which the second positioning portion is inserted, and, when the liquid container is in the posture in the mounting state, an open width of the second opening in the X directions may be larger than an open width of the first opening in the X directions. According to the liquid ejection system of this aspect, the angle in the X directions when the second positioning portion is inserted into the second receiver and positioning is started can be given some margin, so connectivity between the liquid ejection apparatus and the liquid container is improved. Further, due to the margin, stress generated at the connection portion when the liquid ejection apparatus and the liquid container are connected to each other is relieved.

(11) In the liquid ejection system according to the above-described aspect, when the apparatus-side fixing structure and the case-side fixing structure are in an engagement state of engaging with each other, the case may be pushed in the +Y direction to release the engagement state and allow movement of the case toward the −Y direction. According to the liquid ejection system of this aspect, the operation of mounting the liquid container to the liquid ejection apparatus is simplified, and hence user convenience is improved.

The components in the above-described aspects of the present invention are not all required and some components may be altered, omitted, replaced with other components, or Imitative content of a component may be partially deleted in order to partially or entirely solve the above-mentioned problem or partially or entirely achieve the effects described herein. In addition, part or all of the technical characteristics included in one of the above-described aspects of the present invention may be combined with part or all of technical characteristics included in another of the above-described aspect of the present invention to form an independent aspect of the present invention in order to partially or entirely solve the above-mentioned problem or partially or entirely achieve the effects described herein.

The present invention can also be embodied as various aspects other than the liquid container and the liquid ejection system. For example, the present invention can be embodied as a method or structure for connecting a liquid ejection apparatus or a liquid container in a liquid ejection apparatus. Note that the term "system" herein refers to a configuration in which each of a plurality of elements are connected to each other in order to perform one function or a plurality of functions. The "system" is not limited to part or all of the plurality of elements being connected to each other while being disposed far away from each other, and also includes a case in which each of the plurality of elements are connected to each other inside a single apparatus.

A. FIRST EMBODIMENT

In the first embodiment, the configuration of a liquid ejection apparatus 10 is described with reference to FIGS. 1 to 5. In addition, the configuration of a liquid container 100, which is mounted to the liquid ejection apparatus 10, and a case 61 used for mounting the liquid container 100 are described with reference to FIGS. 6 to 20B. Note that, when the liquid container 100 is mounted to the liquid ejection apparatus 10, the liquid ejection apparatus 10 is also referred to herein as a "liquid ejection system 11".

A1. Configuration of Liquid Ejection Apparatus:

External Configuration of Liquid Ejection Apparatus

Figure 1:
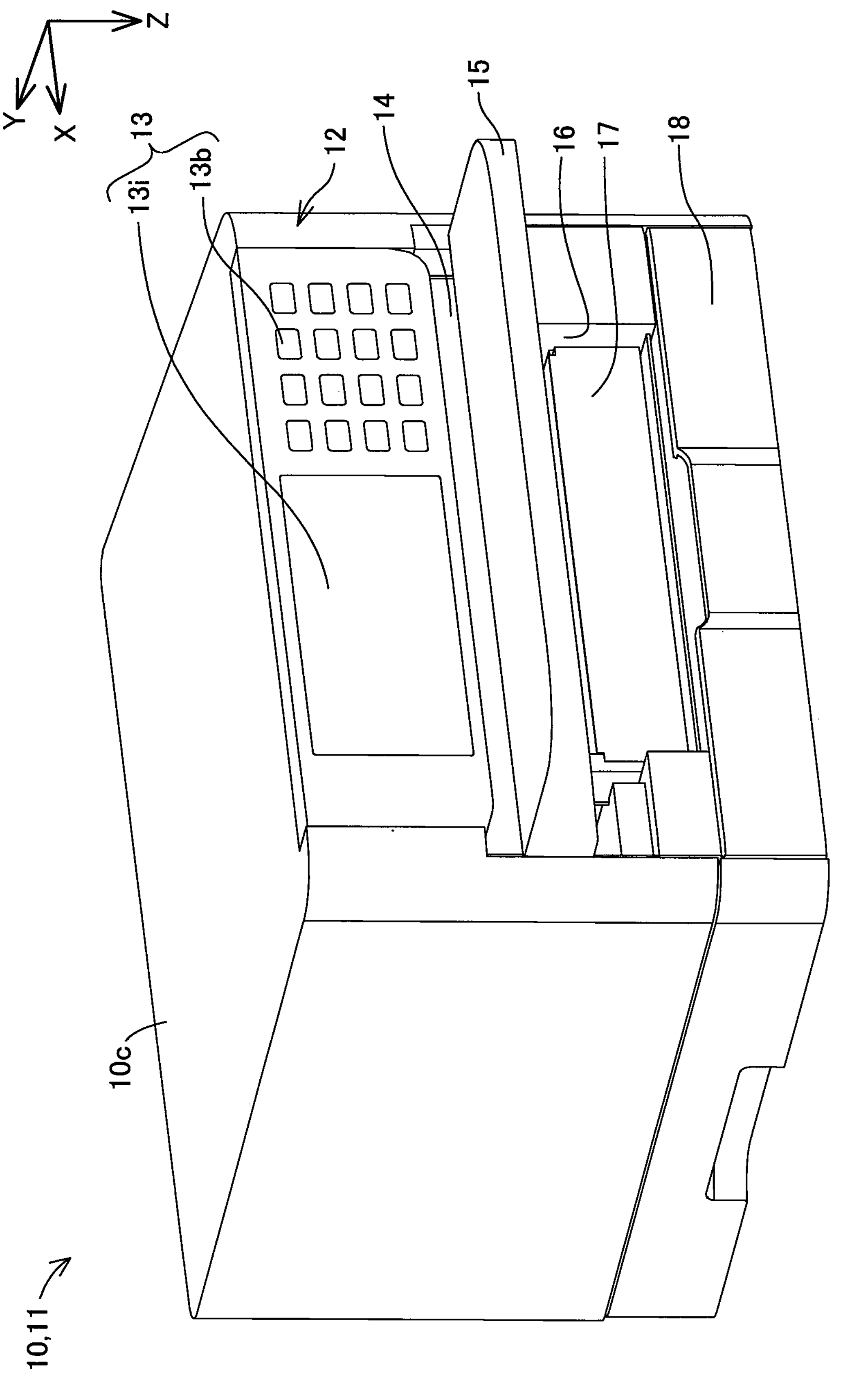
FIG. 1 is a schematic perspective view for illustrating an external configuration of a liquid ejection apparatus.

FIG. 1 is a schematic perspective view for illustrating an external configuration of the liquid ejection apparatus 10 which makes up the liquid ejection system 11. Arrows X, Y and Z which represent three directions orthogonal to each other are illustrated in FIG. 1. Note that the arrows X, Y and Z are also employed as necessary in other figures that are referenced herein to correspond to FIG. 1.

The directions represented by the arrows X, Y and Z correspond to mounting postures of the liquid ejection apparatus 10 under normal usage conditions. A normal usage condition of the liquid ejection apparatus 10 refers to a state in which the liquid ejection apparatus 10 is used when placed on a horizontal surface. Herein, the directions represented by the arrows X, Y and Z are referred to as "X direction", "Y direction" and "Z direction", respectively. One direction in the X directions is referred to as a "+X direction" and the other direction in the X directions is referred to as a "−X direction". The same applies to the Y and Z directions, that is, one direction is referred to as a "+Y direction" and a "+Z direction" and the other direction is referred to as a "−Y direction" and a "−Z direction", respectively.

The X, Y and Z directions are described in the following order: Z direction, Y direction and X direction. The Z directions represents a direction parallel to a gravity direction. The +Z direction is a gravity direction and the −Z direction is a direction opposite to the gravity direction. The Z directions are up/down directions of the liquid ejection apparatus 10, that is, matches a height direction. In the following description, the words "up" and "down" used in relation to the liquid ejection apparatus 10 mean the up/down directions based on the direction of the Z arrows unless otherwise specified, with "up" referring to the −Z direction and "down" referring to the +Z direction.

The Y directions represent front/back directions of the liquid ejection apparatus 10, that is, a direction parallel to a depth direction. The +Y direction is a direction from a front side to a rear side of the liquid ejection apparatus 10 and the −Y direction is a direction from the rear side to the front side of the liquid ejection apparatus 10. In the following description, the words "front" and "back" used in relation to the liquid ejection apparatus 10 mean the front/rear directions based on the direction of the Y arrows unless otherwise specified, with "front" referring to the −Y direction and "back" referring to the +Y direction.

The X directions refers to left/right directions of the liquid ejection apparatus 10, that is, directions parallel to a width direction. The +X direction coincides with a direction from the right to the left and the −X direction coincides with a direction from the left to the right when facing the front of the liquid ejection apparatus 10. In the following description, the words "right" and "left" used in relation to the liquid ejection apparatus 10 mean the left/right directions based on the direction of the X arrows unless otherwise specified, with "right" referring to the −X direction and "left" referring to the +X direction.

Note that in the following description, the X, Y and Z directions when describing components such as the case 61 and the liquid container 100 that can be removed from the liquid ejection apparatus 10 are all based on orientations of the components when the components are appropriately mounted to the liquid ejection apparatus 10 under the normal usage state of the liquid ejection apparatus 10.

In this embodiment, the liquid ejection apparatus 10 is an inkjet printer and the liquid ejection system 11 is an inkjet printing system. The liquid to be consumed through ejection by the liquid ejection apparatus 10 according to this embodiment is ink. The liquid ejection apparatus 10 discharges ink droplets to form an image by recording ink dots on a medium to be processed. The medium is, for example, printing paper. The liquid ejection apparatus 10 according to this embodiment includes a housing 10_c_ which is a hollow box made of resin. The housing 10_c_ forms the exterior of the liquid ejection apparatus 10. The housing 10_c_ has a substantially cuboid shape. A front portion 12 which faces the −Y direction and is envisioned to face the user when the user operates the liquid ejection apparatus 10 is provided with an operation unit 13, a media discharge port 14, a media receiver 15, a media storage port 16, a media storage portion 17 and a cover member 18.

The operation unit 13 includes a display unit 13_i_ configured to display information to the user and a plurality of operation buttons 13_b_ configured to receive operation by the user. The media discharge port 14 is a port for discharging media sent from within the liquid ejection apparatus 10. The media discharge port 14 is formed as a wide slit-shaped opening in the X directions and is open in the −Y direction. The media receiver 15 protrudes like an eave in the −Y direction on a lower side of the media discharge port 14 to receive media that has been discharged from the media discharge port 14. The media storage port 16 is an opening used by the user to resupply the liquid ejection apparatus 10 with the media. In this embodiment, the media storage port 16 is open in the −Y direction below the media receiver 15 and has a wide, substantially rectangular open shape in the X directions. The media storage portion 17 is a tray-shaped member configured to store a stock of the media which is to be processed in this embodiment. The media storage portion 17 is housed in the media storage port 16 in a state where a front surface of the media storage portion 17 can be seen from outside the liquid ejection apparatus 10 through the media storage port 16. The user is able to replenish the liquid ejection apparatus 10 with the media by storing the media in the media storage portion 17 which has been pulled out from the liquid ejection apparatus 10 in the −Y direction through the media storage port 16 and loading the media storage portion 17 to the media storage port 16 again.

The cover member 18 is a plate-shaped member made of resin and constitutes part of the exterior of the liquid ejection apparatus 10. In this embodiment, the cover member 18 has a wide, substantially rectangular shape in the X directions and is disposed below the media storage port 16. The cover member 18 has hook portions on the peripheral edge thereof and is removably attached to the housing 10_c_. The hook portions are not shown. The cover member 18 covers and protects a plurality of the liquid containers 100 stored inside the liquid ejection apparatus 10.

Internal Configuration of Liquid Ejection Apparatus

Figure 2:
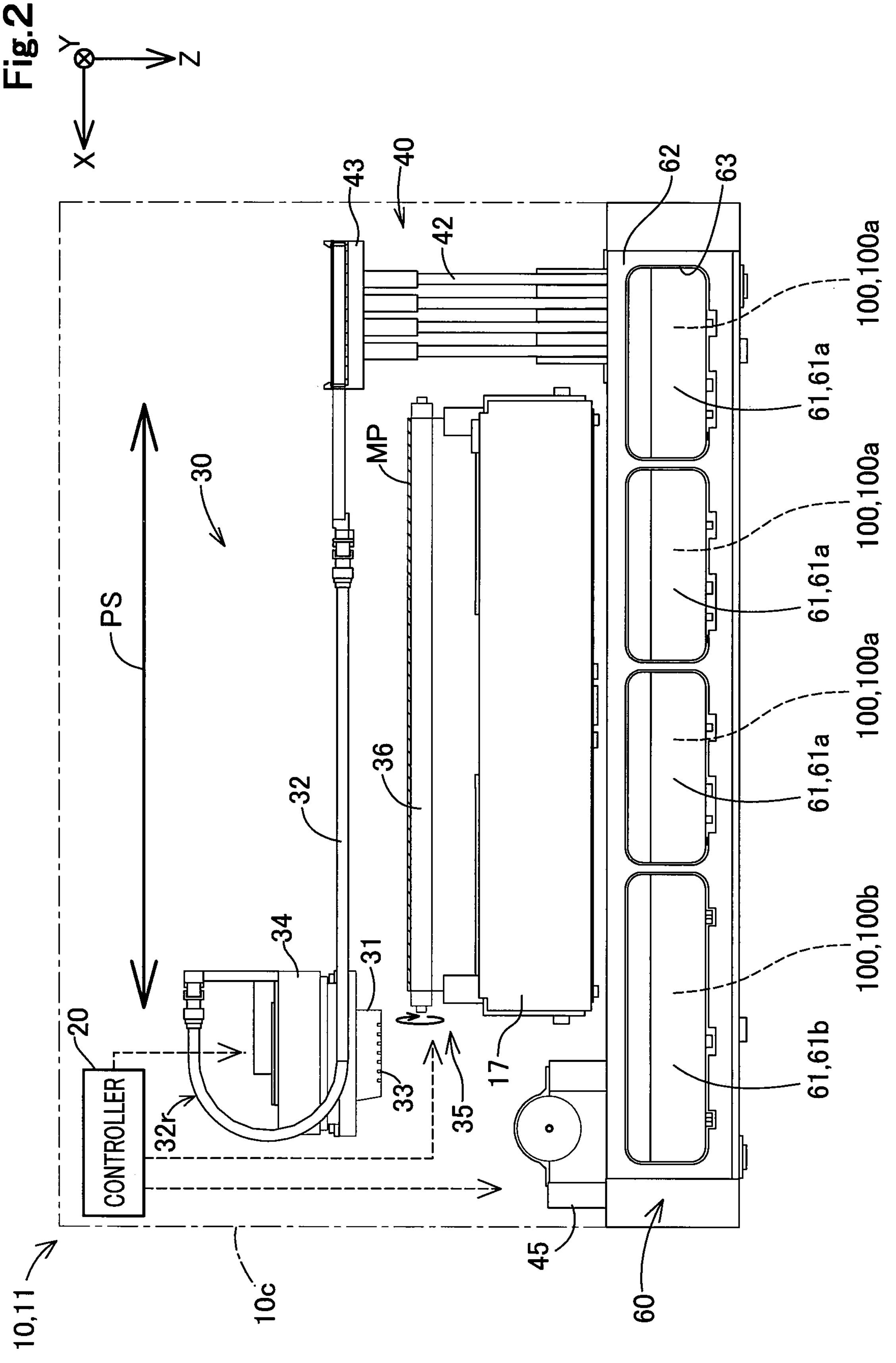
FIG. 2 is a first schematic diagram for illustrating an internal configuration of the liquid ejection apparatus.
Figure 3:
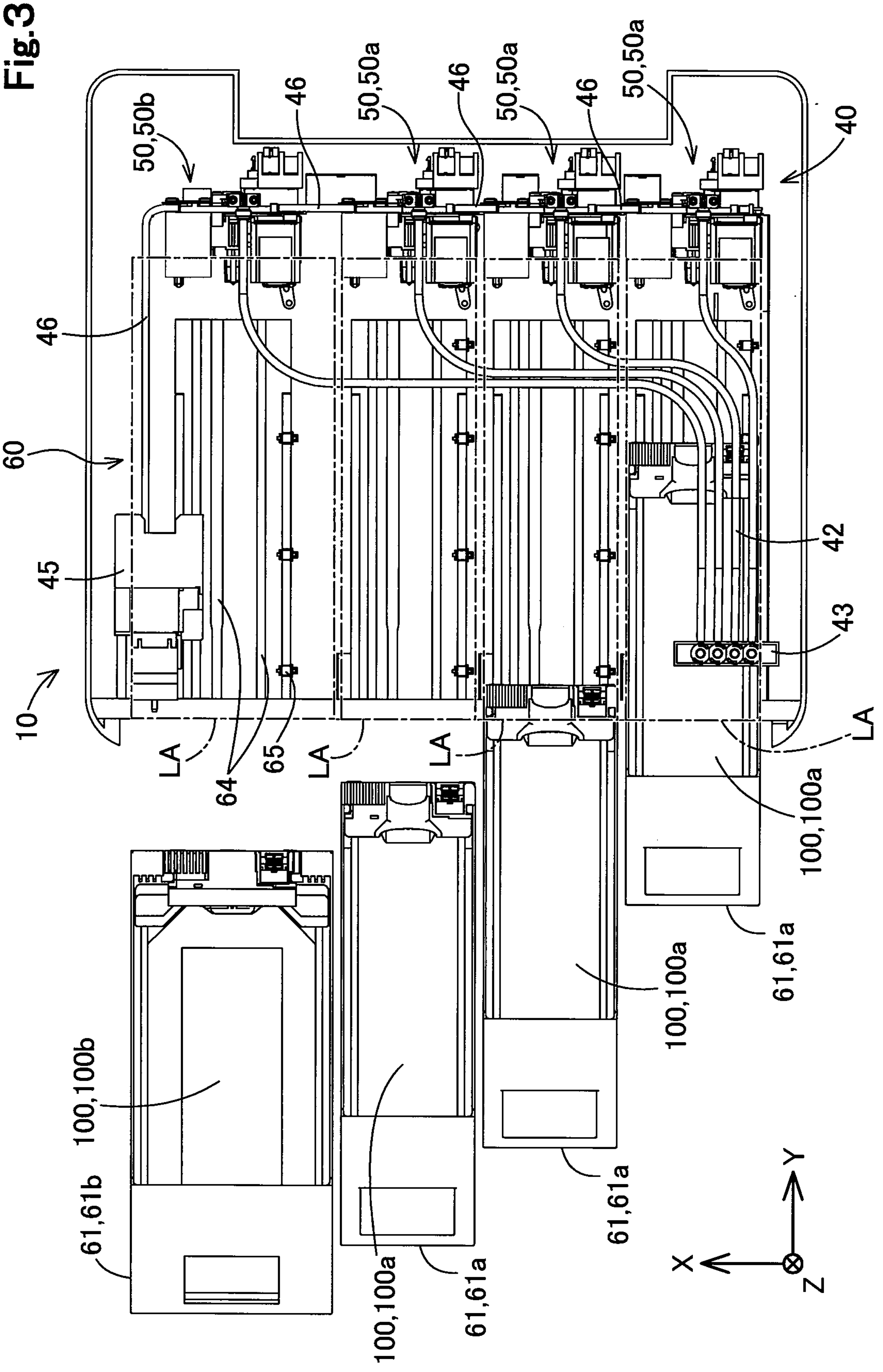
FIG. 3 is a second schematic diagram for illustrating the internal configuration of the liquid ejection apparatus.

An outline of the internal configuration of the liquid ejection apparatus 10 is described with reference to FIGS. 2 to 5, in that order. FIG. 2 is a schematic diagram for illustrating the internal configuration of the liquid ejection apparatus 10 when viewed in the +Y direction excluding the housing 10_c_ and the cover member 18. Of the main components of the liquid ejection apparatus 10, FIG. 2 illustrates a controller 20, a liquid ejector 30, a media feeder 35, a liquid supply unit 40 and case storage portion 60 removed from the liquid ejection apparatus 10. FIG. 3 is a schematic diagram for illustrating the internal configuration of the liquid ejection apparatus 10 without the housing 10*c* and the cover member 18 when viewed in the +Z direction. In FIG. 3, the controller 20, the liquid ejector 30 and the media feeder 35 illustrated in FIG. 2 are not shown. In addition, for the sake of convenience, FIG. 3 illustrates a state in which each of the plurality of liquid containers 100 and the case 61 have been pulled out in the −Y direction from an arrangement region LA, which is a mounting position at which mounting to the liquid ejection apparatus 10 is complete.

FIG. 2 is now referenced. The liquid ejection apparatus 10 includes the controller 20, the liquid ejector 30, the media feeder 35, the liquid supply portion 40 and the case storage portion 60. In the liquid ejection apparatus 10, liquid is supplied to the liquid ejector 30 from the liquid container 100 stored in the case storage portion 60 via a supply pipe 42 of the liquid supply portion 40. The liquid ejector 30 discharges liquid onto a medium MP which is sent out and fed from the media storage portion 17 by the media feeder 35, to thereby form a printed image on the medium MP. The controller 20, the liquid ejector 30, the media feeder 35, the liquid supply portion 40 and the case storage portion 60 are now described in the above order.

Controller

The controller 20 is configured to control the operation of each component in the liquid ejection apparatus 10. The controller 20 is constituted by a microcomputer which includes at least a central processing unit and a main storage device. The central processing unit reads and runs various programs to the main memory device to realize various functions. The functions of the controller 20 are sequentially described.

Liquid Ejector

FIG. 2 is now referenced. The liquid ejector 30 includes a head portion 31 and a plurality of tubes 32. The head portion 31 receives a supply of liquid from the liquid supply portion 40 via the plurality of tubes 32. The mechanism behind supplying liquid from the liquid supply portion 40 is described later. The head portion 31 includes a liquid chamber configured to store the liquid supplied from the liquid supply portion 40. The liquid compartment is not shown in the drawings for the sake of convenience. A nozzle 33 which opens downward is provided on a bottom surface of the liquid compartment. The head portion 31 is controlled by the controller 20 to, for example, discharge liquid in the liquid compartment from the nozzle 33 using a known method such as applying pressure to the ink using a piezo element.

In this embodiment, the head portion 31 is mounted onto a carriage 34 and is configured to move back and forth in a straight line in the X directions under the control of the controller 20. In FIG. 2, the double-headed arrow PS indicates the movement direction and movement range of the head portion 31. In this embodiment, a main scanning direction of the liquid ejection apparatus 10 coincides with the X directions. As a drive mechanism for moving the head portion 31, the liquid ejector 30 includes a guide shaft along which the carriage 34 travels, a motor which generates drive force and a pulley which transmits the drive force. Note that the above-described components are not described in detail nor shown in the drawings.

Each of the plurality of tubes 32 connected to the head portion 31 are flexible. Each of the plurality of tubes 32 is arranged in parallel in the Y directions. The plurality of tubes 32 is arranged in a substantially straight line in the +X direction along a scan path of the head portion 31 from a coupling portion 43 which is a point of connection with a supply pipe 42 of the liquid supply portion 40 to be described later. Each of the plurality of tubes 32 curves upward and folds back in the −X direction and is connected to the head portion 31. A curved portion 32*r* of each of the plurality of tubes 32 displaces in the X directions as the head portion 31 moves. With this configuration, main scanning of the head portion 31 can be prevented from hindering the plurality of tubes 32 and the head portion 31 can move more smoothly.

Media Feeder

FIG. 2 is now referenced. The media feeder 35 feeds the medium MP to be processed under the control of the controller 20. The media feeder 35 includes a feed roller 36 which is suspended in the X directions below the head portion 31. The above-mentioned media storage portion 17 is disposed below the transfer roller 36. The media feeder 35 includes a feeding mechanism which feeds the medium MP one-by-one from the media storage portion 17 on an outer peripheral side of the feed roller 36. The feeding mechanism is not shown in the drawings for the sake of convenience. The media feeder 35 rotates the feed roller 36 using the drive motor and uses the rotational drive force produced by that action to move the medium MP in the −Y direction below the head portion 31. The drive motor is not shown in the drawings for the sake of convenience. In this embodiment, a sub-scanning direction of the liquid ejection apparatus 10 coincides with the −Y direction. After the medium MP has passed through a region below the head portion 31, the medium MP is discharged to the outside of the liquid ejection apparatus 10 via the media discharge port 14.

When the liquid ejection apparatus 10 performs printing processing, the controller 20 uses the media feeder 35 to feed the medium MP in the above-mentioned sub-scanning direction. Then, the head portion 31 is made to travel back and forth above the feed roller 36 in the main scanning direction along the feed roller 36. Then, ink droplets are discharged from the head portion 31 toward a printing surface of the medium MP at a timing determined on the basis of printing data. As a result, ink dots are recorded at positions on the medium MP determined on the basis of printing data to form an image based on the printing data.

Liquid Supply Portion

Figure 4:
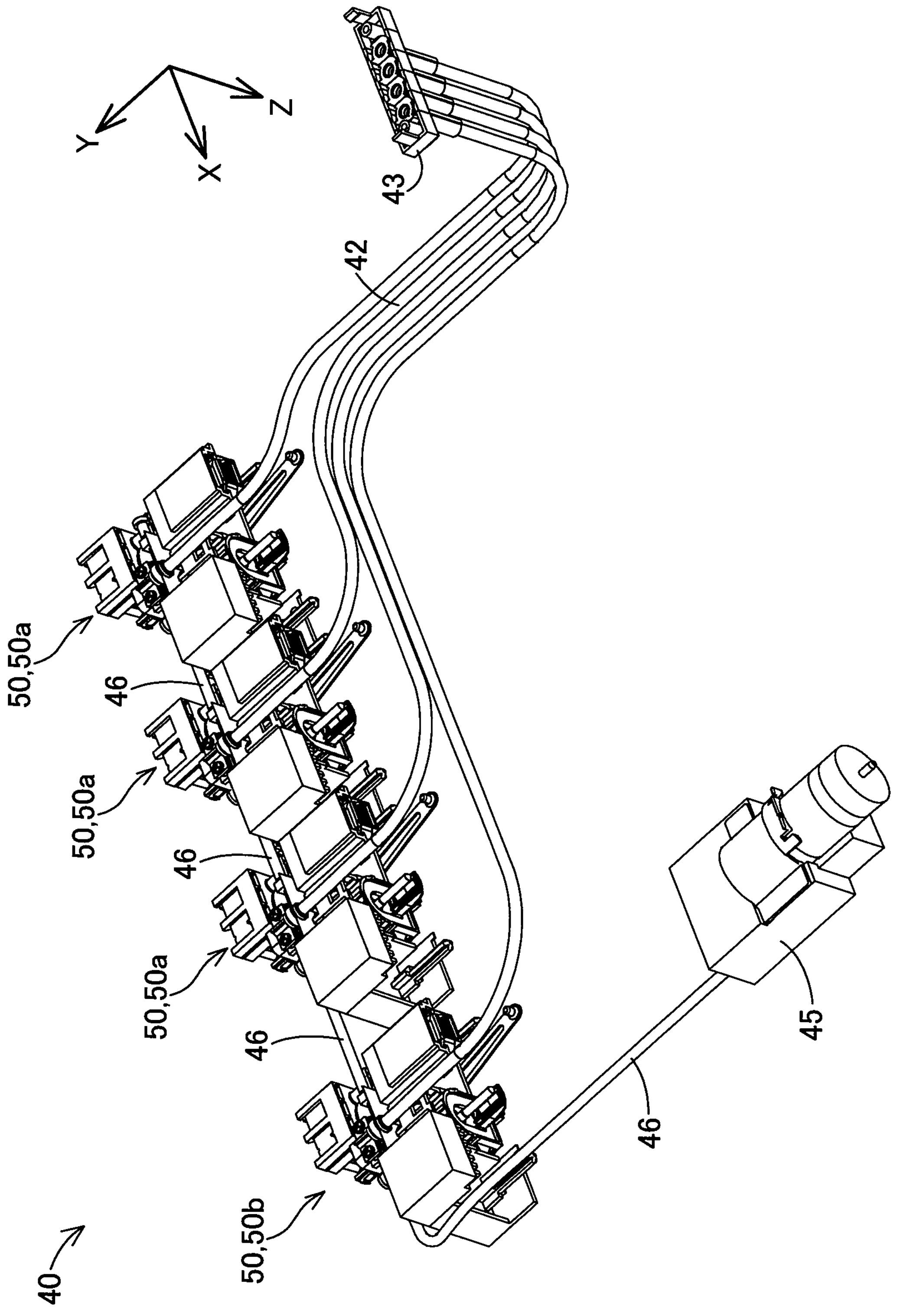
FIG. 4 is a schematic perspective view for separately illustrating a liquid supply portion.

Referring FIG. 4 with FIGS. 2 and 3, the liquid supply portion 40 is described. FIG. 4 is a schematic perspective view for separately illustrating the liquid supply portion 40. As illustrated in FIGS. 3 and 4, the liquid supply portion 40 includes a plurality of connection receivers 50, a variable pressure generator 45 and a pressure transmission pipe 46, in addition to the above-mentioned plurality of supply pipes 42 and the coupling portion 43. First, the configuration of each of the plurality of connection receivers 50 is described and next the supply pipes 42 and the coupling portion 43 are described. Then, the variable pressure generator 45 and the pressure transmission pipe 46, which constitute a suction/delivery mechanism of the liquid, are described.

Connection Receiver

The liquid supply portion 40 is connected to each of the plurality of liquid containers 100 stored in the case storage portion 60 via the plurality of connection receivers 50. In the liquid ejection apparatus 10 according to this embodiment, as described later, four liquid containers 100 each having a different color are mounted onto the liquid ejection apparatus 10. Therefore, in this embodiment, the liquid supply portion 40 includes four connection receivers 50 to correspond to each of the four liquid containers 100.

In the liquid ejection apparatus 10 according to this embodiment, the four liquid containers 100 consist of three first liquid containers 100*a* which each have the same capacity for storing liquid and a second liquid container 100*b* which has a larger storage capacity than each first liquid container 100*a*. Therefore, the plurality of connection receivers 50 consist of three first connection receivers 50*a* which correspond to the first liquid containers 100*a* and one second connection receiver 50*b* which corresponds to the second liquid container 100*b*. The first connection receivers 50*a* and the second connection receiver 50*b* are collectively referred to as "connection receiver 50" unless otherwise needing to be differentiated from each other. The same applies to the first liquid containers 100*a* and the second liquid container 100*b*, that is, the first liquid containers 100*a* and the second liquid container 100*b* are collectively referred to as "liquid container 100" unless otherwise needing to be differentiated from each other. Note that, in this embodiment, the first connection receivers 50*a* and the second connection receivers 50*b* have substantially the same configuration in terms of connection with the liquid container 100.

FIG. 3 is now referenced. The plurality of connection receivers 50 are disposed on an end portion of the case storage portion 60 in the +Y direction. Each connection receiver 50 is arranged in a row in the X directions on the lowermost level at the backmost position on the back side of the liquid ejection apparatus 10. Each connection receiver 50 is installed so as to accept connection from the −Y direction side of the corresponding liquid container 100. The three first connection receivers 50*a* are disposed in parallel at almost equal intervals from the right side. The second connection receiver 50*b* is disposed to the furthermost left.

Figure 5:
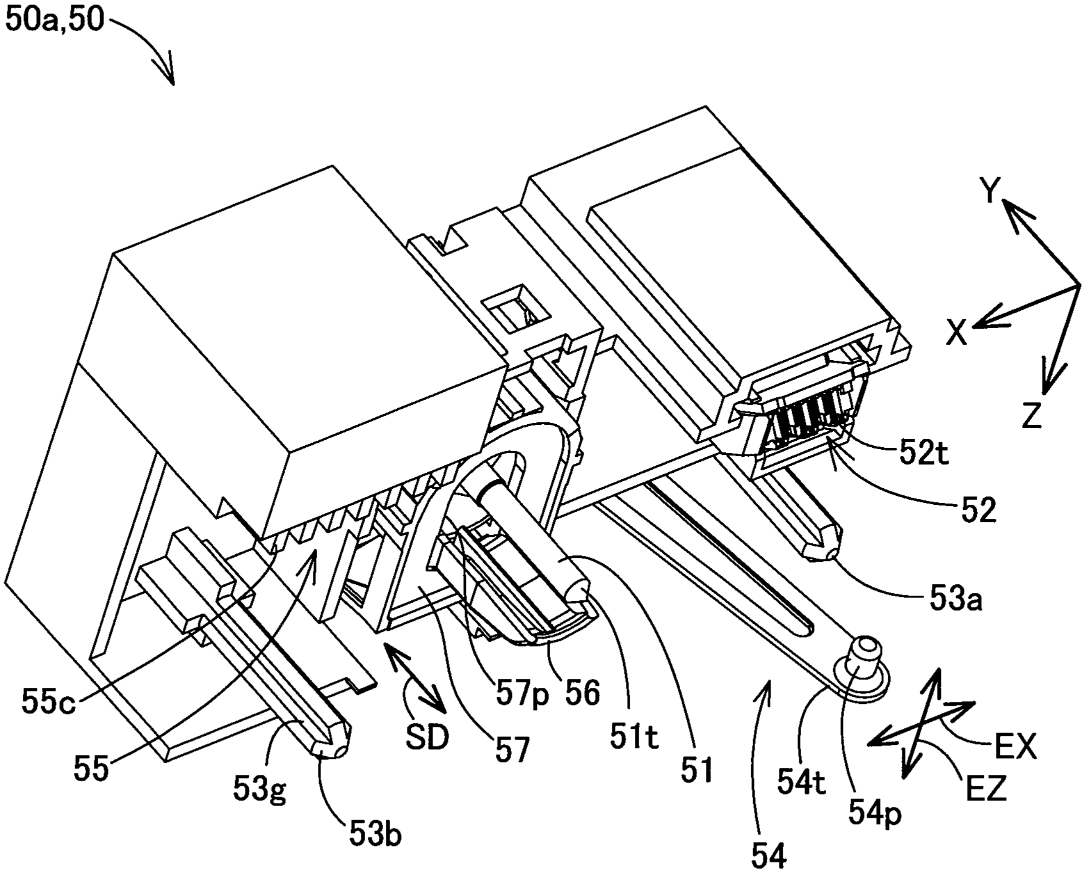
FIG. 5 is a schematic perspective view for separately illustrating a connection receiver included in the liquid supply portion.

The overall configuration of each connection receiver 50 is described with reference to FIG. 5. FIG. 5 is a schematic perspective view for separately illustrating part of the first connection receiver 50*a* of the plurality of connection receivers 50. Unless otherwise specified, the following description applies to both the first connection receivers 50*a* and the second connection receiver 50*b*. The connection receivers 50 are constituted as one member in which a liquid introduction unit 51, an apparatus-side electrical connection unit 52, a first positioning portion 53*a*, a second positioning portion 53*b*, an apparatus-side fixing structure 54 and a fitting mechanism 55 are integrated.

Liquid flows into the liquid introduction unit 51 from the liquid container 100. In this embodiment, the liquid introduction unit 51 is positioned on an end portion of the case storage portion 60 in the +Y direction. The liquid introduction unit 51 is configured of a pipe portion which has a shape that linearly extends in the −Y direction and is open at a tip portion 51*t* on the −Y direction side. The tip portion 51*t* of the liquid introduction unit 51 is connected to the liquid container 100 by being inserted into the liquid container 100. In this embodiment, the liquid introduction unit 51 protrudes outward in the −Y direction at substantially the center of the connection receiver 50 in the X directions.

A rear end portion on the +Y direction side of the liquid introduction unit 51 communicates with a pump compartment provided inside the connection receiver 50. The pump compartment is not shown in the drawings for the sake of convenience. Liquid that has entered the liquid introduction unit 51 flows into the pump chamber. Note that a check valve mechanism used for minimizing the occurrence of liquid that has entered the pump compartment from flowing back to the liquid introduction unit 51 is provided in the connection receiver 50. The check valve mechanism is not shown in the drawings for the sake of convenience.

In the connection receiver 50 according to the present embodiment, a liquid receiver 56 is provided under the liquid introduction unit 51. The liquid receiver 56 extends along the liquid introduction unit 51 in the −Y direction. The liquid receiver 56 slightly curves downward so as to follow the shape of a side surface on a lower side of the liquid introduction unit 51 and functions as a pan for receiving liquid that has leaked from the point of connection between the liquid introduction unit 51 and the liquid container 100. The liquid receiver 56 may be omitted.

A proximal member 57 is provided on a rear end portion on the +Y direction side of the liquid introduction unit 51 and the liquid receiver 56. The proximal member 57 is a resin member including a through hole 51*p* through which the liquid introduction unit 51 is inserted. The proximal member 57 is mounted so as to be able to move toward the Y directions. A helical spring, which is a biasing member, is disposed on the rear side of the proximal member 57 so as to surround the liquid introduction unit 51 and applies −Y direction elastic force to the proximal member 57. As a result, as indicated by the arrow SD, the proximal member 57 elastically moves in the Y directions. When the liquid container 100 is mounted on the liquid ejection apparatus 10, force toward the −Y direction is applied to the liquid container 100 and the case 61 due to the proximal member 57.

The apparatus-side electrical connection unit 52 is a connector which is electrically connected to the liquid container 100. As illustrated in FIG. 3, the apparatus-side electrical connection unit 52 is positioned on an end portion of the case storage portion 60 on the +Y direction side. The apparatus-side electrical connection unit 52 includes a plurality of terminal portions 52*t* arranged in the X directions. Each terminal portion 52*t* protrudes from a front surface of the apparatus-side electrical connection unit 52 and is electrically connected through contact to a container-side electrical connector of the liquid container 100 to be described later. Each terminal portion 52*t* is preferably biased in the direction in which the terminal portion 52*t* protrudes by an elastic member such as a leaf spring. In this embodiment, the apparatus-side electrical connection unit 52 is disposed at an inclination angle corresponding to an arrangement angle of the container side electrical connector of the liquid container 100. The apparatus-side electrical connection unit 52 is disposed facing obliquely downward such that a normal vector of the front surface of the apparatus-side electrical connection unit 52 includes a −Y direction vector component and a +Z direction vector component.

The apparatus-side electrical connection unit 52 is connected to the controller 20 illustrated in FIG. 2 via wiring which is not shown in figures. The wiring is formed of, for example, a flexible flat cable. The controller 20 exchanges electrical signals with the liquid container 100 through the apparatus-side electrical connection unit 52 and the container-side electrical connector being electrically connected to each other. With this configuration, the controller 20 acquires information on the liquid stored in the liquid container 100. The information on the liquid is, for example, a parameter or the like representing the color of ink, the type of ink or the amount of ink stored in the liquid container 100. Further, the controller 20 electrically detects a connection state of the liquid container 100.

The first positioning portion 53*a* and the second positioning portion 53*b* protrude out from positions mutually separated from each other. In this embodiment, the first positioning portion 53*a* and the second positioning portion 53*b* are formed as axial portions which extend in the −Y direction and are arranged in parallel to the liquid introduction unit 51. The first positioning portion 53*a* is positioned on the −X direction side of the liquid introduction unit 51 and the second positioning portion 53*b* is positioned on the +X direction side of the liquid introduction unit 51. The first positioning portion 53*a* is positioned further on the −X direction side than the apparatus-side electrical connection unit 52. In this embodiment, the positions of tip portions of the first positioning portion 53*a* and the second positioning portion 53*b* are substantially the same in the Y directions. In addition, the first positioning portion 53*a* and the second positioning portion 53*b* are provided at substantially the same height and at positions lower than the liquid introduction unit 51 and the apparatus-side electrical connection unit 52.

When the liquid container 100 has been mounted, the first positioning portion 53*a* and the second positioning portion 53*b* are both inserted into corresponding receiving portions to be described later provided in the liquid container 100. When the liquid container 100 is mounted, the first positioning portion 53*a* and the second positioning portion 53*b* have a function of defining the arrangement position of the liquid container 100 in the X directions of a horizontal direction.

The first positioning portion 53*a* and the second positioning portion 53*b* preferably protrude further toward the −Y direction side than the top portion 51*t* of the liquid introduction unit 51. With this configuration, the liquid introduction unit 51 is able to be connected to the liquid container 100 after the pair of positioning portions 53*a* and 53*b* have defined the mounting posture of the liquid container 100. As illustrated in the figures, a groove portion 53*g* which extends in parallel in the Y directions is preferably provided on an outer peripheral surface of each positioning portion 53*a*, 53*b*. With this configuration, insertion into the receiver of the liquid container 100 is smoother.

The apparatus-side fixing structure 54 moves in coordination with a case-side fixing structure to be described later provided in the case 61 which houses the liquid container 100, to thereby restrict movement of the case 61 in the Y directions.

In this embodiment, the apparatus-side fixing structure 54 extends toward the −Y direction side so as to enter a lower side of the liquid container 100 to be mounted. The apparatus-side fixing structure 54 is configured as an arm-shaped member. The apparatus-side fixing structure 54 is positioned on the −X direction of the liquid introduction unit 51 and below the apparatus-side electrical connection unit 52. A tip portion 54*t* on the −Y direction of the apparatus-side fixing structure 54 protrudes further toward the −Y direction side than the tip portion 51*t* of the liquid introduction unit 51. The tip portion 54*t* also protrudes further toward the −Y direction than the tip portions of each positioning portion 53*a*, 53*b*. A protrusion 54*p* is formed on the tip portion 54*t*. The protrusion 54*p* protrudes in the −Z direction from the center of the tip portion 54*t*. The protrusion 54*p* engages with an engaged portion provided in the case-side fixing structure in a case storage state in which the case 61 is mounted to the case storage portion 60. In the following description, the protrusion 54*p* is also referred to as "engaging portion 54*p*". The protrusion 54*p* locks into the engaged portion provided in the case-side fixing structure, to thereby restrict movement of the case 61 in the −Y direction.

As indicated by the double-ended arrow EX, the apparatus-side fixing structure 54 is mounted so as to allow rotation toward a width direction with the rear end on the +Y direction side as a fulcrum. The apparatus-side fixing structure 54 is biased in the +X direction by an elastic member disposed inside the connection receiver 50 and elastically rotates in the −X direction when receives external force in the −X direction. The elastic member is not shown in the drawings for the sake of convenience. In addition, as indicated by the double-ended arrow EZ, the apparatus-side fixing structure 54 is mounted so as to allow rotation toward a height direction with the rear end on the +Y direction as a fulcrum. The apparatus-side fixing structure 54 is biased in the −Z direction by an elastic member disposed inside the connection receiver 50 and elastically rotates in the +Z direction when receives external force in the +Z direction. The elastic member is not shown in the drawings for the sake of convenience. The mechanism of engagement between the apparatus-side fixing structure 54 and the case-side fixing structure of the case 61 is described later.

The fitting structure 55 is provided on the +X direction of the liquid introduction unit 51. The fitting structure 55 is positioned above the second positioning portion 53*b* and protrudes at the same height in the +Z direction. In addition, the fitting structure 55 includes an uneven structure. In the uneven structure, a plurality of protrusions 55*c* which have a substantially rectangular shape and extend in parallel to the −Y direction is disposed in a row. The arrangement pattern of the protrusions 55*c* in the uneven structure of the fitting structure 55 is different for each connection receiver 50. The corresponding liquid container 100 of each connection receiver 50 is provided with a fitting structure receiver to be described later which corresponds to the arrangement pattern of the uneven structure and is able to be fitted into the uneven structure. With this configuration, a wrong, incompatible liquid container 100 is less likely to be connected to the connection receiver 50.

Supply Pipe and Coupling Portion

FIG. 4 is now referenced. A plurality of supply pipes 42 is formed of flexible resin tube members. Each supply pipe 42 is connected to the above-mentioned pump compartment provided in each connection receiver 50, respectively. The pump compartment is omitted from the drawings. As illustrated in FIGS. 3 and 4, each supply pipe 42 is routed in parallel to the −Y direction after converging at a −X direction end after passing from the connection receiver 50 above a region in which the liquid container 100 is stored. Then, as illustrated in FIGS. 2 and 4, each supply pipe 42 is routed toward the −Z direction at a front-end portion of the liquid ejection apparatus 10 and is connected to the coupling portion 43 disposed at a position higher than the media feeder 35. As described above, each supply pipe 42 is connected to a corresponding tube among the plurality of tubes 32 of the liquid ejector 30.

Suction/Delivery Mechanism of Liquid in Liquid Supply Portion

As illustrated in FIGS. 2 and 3, the variable pressure generator 45 is a generation source which generates variable pressure for sucking in/delivering liquid. The variable pressure generator 45 is configured of, for example, a pump. The variable pressure generator 45 is disposed above the case storage portion 60 at a position close to the front portion 12 of the liquid ejection apparatus 10. The variable pressure generator 45 is located above a mounting position of the first liquid container 100*a*. The pressure transmission pipe 46 is connected to the variable pressure generator 45 and transmits the variable pressure generated by the variable pressure generator 45. The pressure transmission pipe 46 is connected to a pressure chamber provided in each connection receiver 50. The pressure chamber is not shown in the drawings for the sake of convenience.

The pressure chambers in each connection receiver 50 are adjacent to the above-mentioned pump compartment into which liquid flows from the liquid container 100 with a flexible membrane interposed therebetween. Therefore, when the variable pressure generator 45 reduces the pressure in the pressure chamber, the flexible membrane bends toward the pressure chamber and increases the capacity of the pump compartment. Thereby, the liquid in the liquid container 100 is sucked into the pump compartment via the liquid introduction unit 51. On the other hand, when the variable pressure generator 45 increases the pressure in the pressure chamber, the flexible membrane bends toward the pump chamber and decreases the capacity of the pump chamber. Thereby, the liquid that has flown into the pump chamber is pushed out to the supply pipe 42. In this way, liquid is supplied to the liquid ejector 30 through the variable pressure generator 45 repeating increase and decrease of pressure in the pressure chamber in the liquid supply portion 40.

Case Storage Portion

In the liquid ejection apparatus 10 according to this embodiment, as illustrated in FIGS. 2 and 3, the case storage portion 60 is provided on the lowest level. A plurality of the cases 61 are stored inside the case storage portion 60. When the plurality of cases 61 is in the above-mentioned case storage state, the plurality of cases 61 is disposed in the case storage portion 60 as a row along the X directions. A plurality of liquid containers 100 are disposed in each of the plurality of cases 61. One liquid container 100 is disposed in one case 61. In other words, in the case storage portion 60, each of the plurality of liquid containers 100 is stored in the cases 61 in a row along the X directions. In FIG. 2, the liquid container 100 is denoted by a reference number and a broken line at its arrangement position because the liquid container 100 is hidden behind the case 61. In addition, in FIG. 3, the arrangement area LA, which is the arrangement position at the time of mounting the case 61 and the liquid container 100, in the case storage portion 60 is indicated by a dashed-dotted line.

As illustrated in FIG. 2, in the case storage portion 60, the second liquid container **100*b* is housed on a +X direction end and the three first liquid containers 100*a* are housed on the −X direction side end. As illustrated in FIG. 3, a corresponding connection receiver 50 is disposed at the +Y direction side of the arrangement area LA of each liquid container 100. As described above, in this embodiment, a different color ink is stored in each liquid container 100. The combination of different colored ink stored in the liquid containers 100 is not particularly limited. For example, the three first liquid containers 100*a* may store cyan, magenta and yellow ink and the second liquid container 100*b* may store black ink, which is expected to be most heavily consumed. Note that some or all of the liquid containers 100** may store the same color ink.

The plurality of cases 61 is used to mount the liquid container 100. In this embodiment, the case 61 is configured of a tray-shaped container. The case 61 is moved in the Y directions within the case storage portion 60, to thereby allow mounting/removal to/from the liquid ejection apparatus 10. Note that details of the case 61 and mounting the case 61 to the liquid ejection apparatus 10 of the liquid container 100 are described later.

The liquid container 100 is removably disposed on a −Z direction side of the case 61 which is pulled out from the case storage portion 60. The liquid container 100 is mounted to the liquid ejection apparatus 10 while disposed in the case 61. In other words, the liquid container 100 is mounted to the case storage portion 60 of the liquid ejection apparatus 10 while disposed in the case 61. In addition, the liquid container 100 is removed from the case storage portion 60 while disposed in the case 61. Note that the case 61 includes a first case **61*a* in which the first liquid container 100*a* is disposed and a second case 61*b* in which the second liquid container 100*b* is disposed. The first case 61*a* and the second case 61*b* are collectively referred to as "case 61" unless otherwise needing to be differentiated from each other. Details of the configuration of the case 61** are described later.

As illustrated in FIG. 2, the case storage portion 60 includes an open member 62. The open member 62 is a plate member with a substantially rectangular shape and includes four through holes 63 which penetrate a thickness direction. The thickness direction of the open member 62 coincides with the Y directions and a longitudinal direction of the open member 62 coincides with the X directions. In this state, the open member 62 is fixably disposed to an end portion of the case storage portion 60 on the −Y direction side. Each through hole 63 is an insertion hole through which the case 61 is inserted. Each through hole 63 has an open shape which corresponds to the shape of an external outline of the corresponding case 61 when viewed from the Y directions. The open member 62 guides insertion/removal of the case 61 to/from the liquid ejection apparatus 10. In addition, the open member 62 prevents the user from inserting the first case **61*a* and the second case 61*b* are the incorrect positions. Note that the open member 62** may be omitted.

As illustrated in FIG. 3, a plurality of rail grooves 64 are formed on a bottom surface of the case storage portion 60. Each rail groove 64 is formed as a straight line across the entire Y direction area of the case storage portion 60 at the arrangement area LA of each liquid container 100. A rail rib, which is described later, provided on a lower surface of the case 61 fits into each rail groove 64. The rail grooves 64 guide the movement of the case 61 in the Y directions inside the liquid ejection apparatus 10 and prevent adjacent cases 61 from making contact in the X directions. In addition, the rail grooves 64 simplify connection between the liquid container 100 and the connection receiver 50. Note that the configurations of the rail grooves 64 and the corresponding rail ribs may be different for each case 61 in order to prevent incorrect mounting. In addition, part or all of the rail grooves 64 may be omitted.

As illustrated in FIG. 3, a plurality of rollers 65 is provided on the bottom surface of the case storage portion 60. Each roller 65 is arranged in a distributed manner in the Y directions as appropriate for each arrangement area LA of each liquid container 100. In the case storage portion 60, each roller 65 revolves to reduce travel resistance when the case 61 moves toward the Y directions and make the operation of the user moving the case 61 smoother. The rollers 65 may be omitted.

Configuration of Liquid Container and Case

The configurations of the first liquid container **100*a* and the first case 61*a* are described with reference to FIGS. 6 to 12 as necessary. Then, the configurations of the second liquid container 100*b* and the second case 61*b* are described with reference to FIGS. 13 to 18**.

First Liquid Container and First Case

Figure 6:
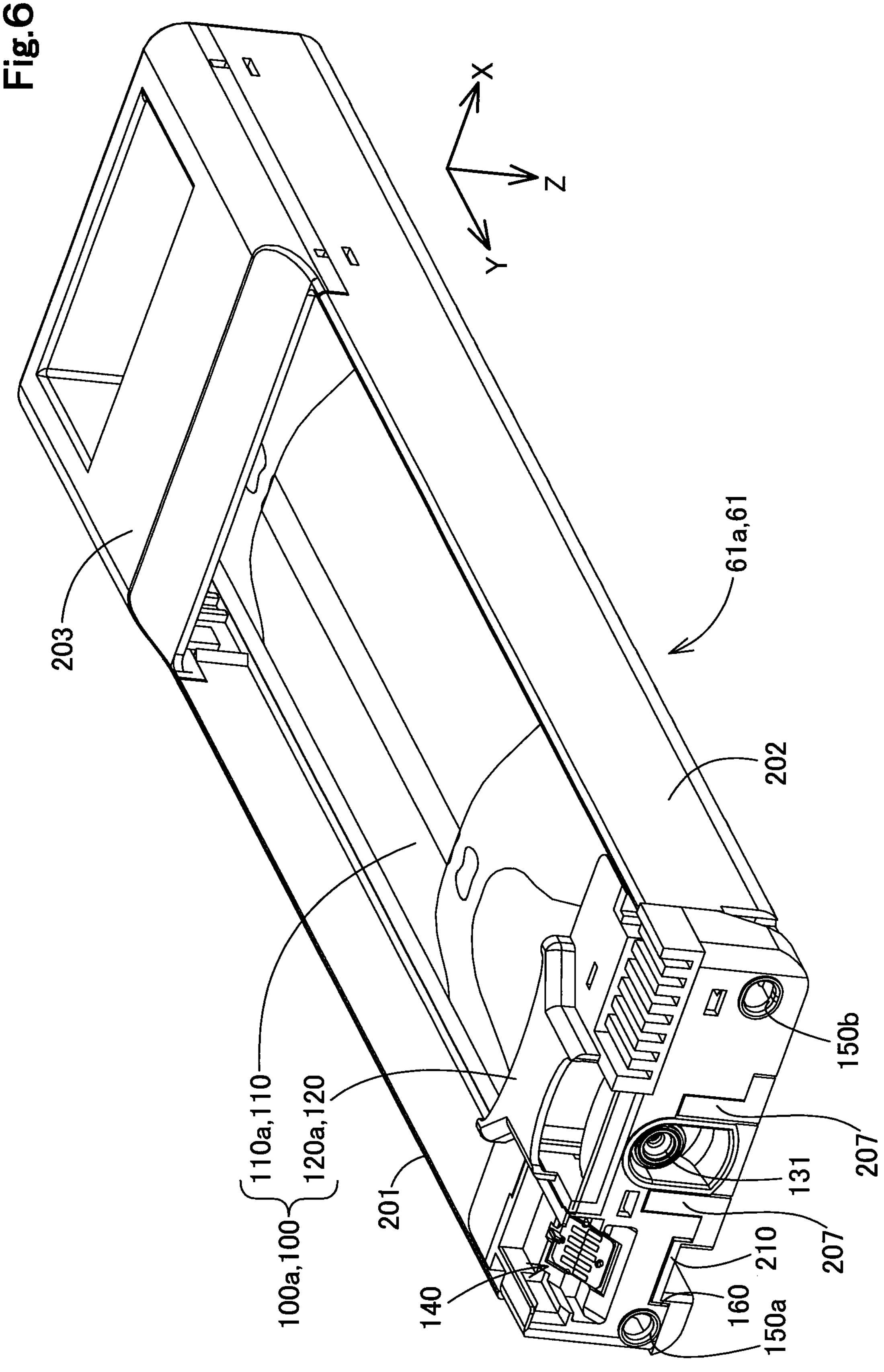
FIG. 6 is a schematic perspective view for illustrating a first liquid container disposed in a first case.
Figure 7:
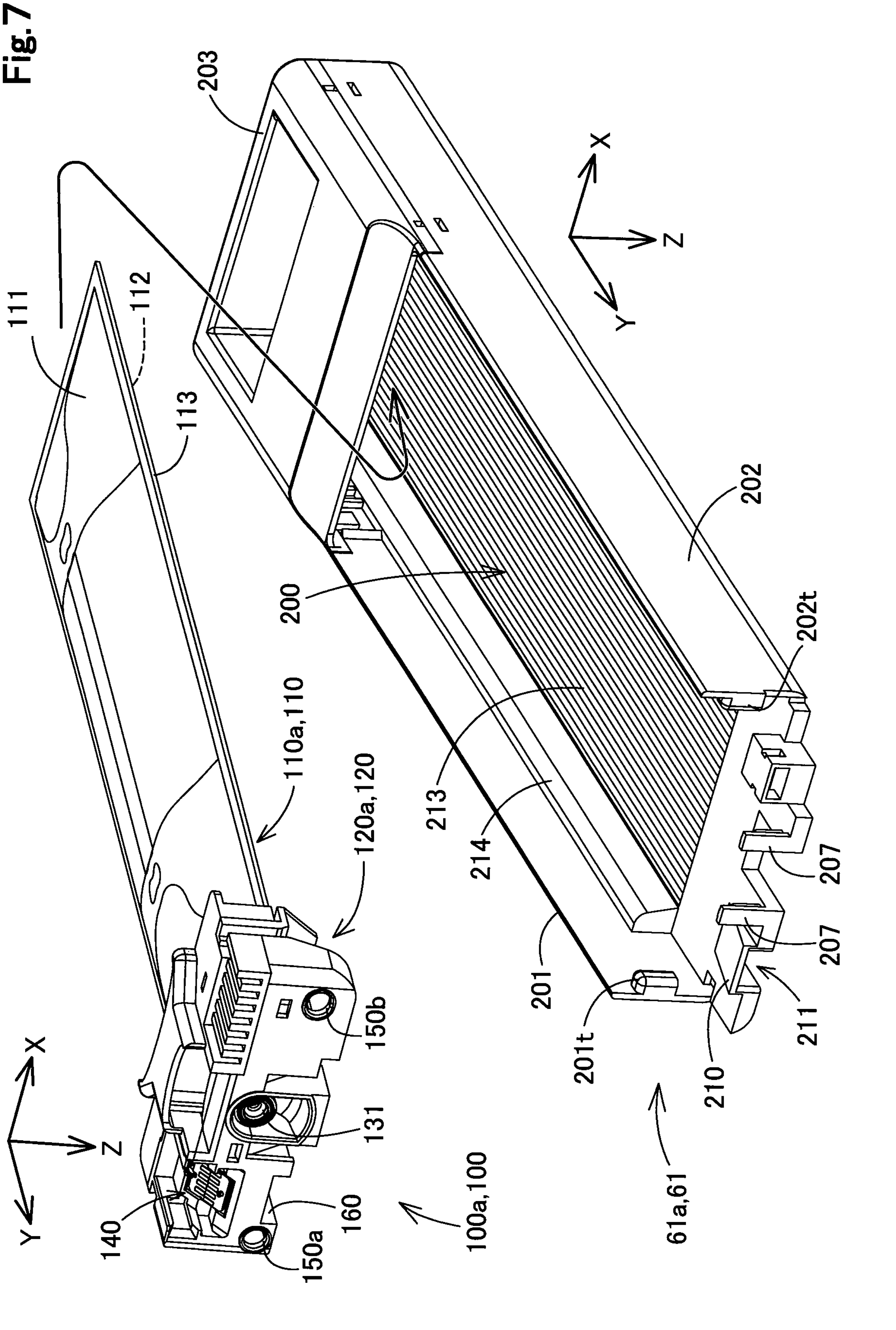
FIG. 7 is a schematic exploded perspective view for illustrating a state in which the first liquid container has been removed from the first case.
Figure 8:
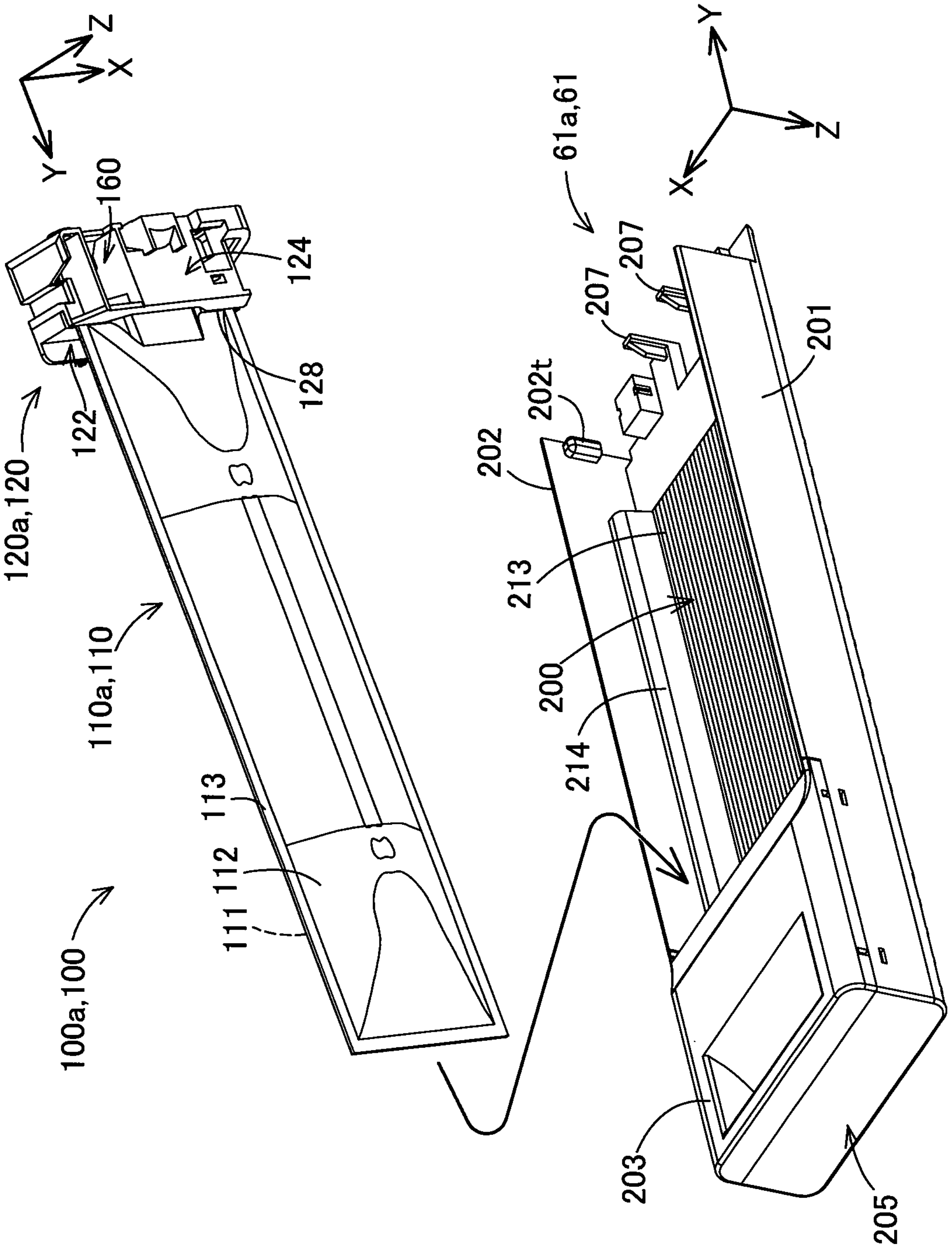
FIG. 8 is a second exploded perspective view for illustrating a state in which the first liquid container has been removed from the first case.

FIG. 6 is a schematic perspective view for illustrating the first liquid container **100*a* disposed in the first case 61*a*. FIG. 7 is a first schematic exploded perspective view for illustrating a state in which the first liquid container 100*a* has been removed from the first case 61***a*, and illustrates a state when viewed from the +Y direction side. FIG. 8 is a second schematic exploded perspective view for illustrating a state in which the first liquid container 100*a* has been removed from the first case 61*a*, and illustrates a state when viewed from the −Y direction side. Note that, in FIGS. 7 and 8, the arrows X, Y and Z corresponding to the first liquid container 100*a* and the first case 61*a* are illustrated separately. Herein, the overall configuration of the first liquid container 100*a* and the overall configuration of the first case 61*a* is described.

First Liquid Container

FIGS. 7 and 8 are now referenced. The first liquid container 100*a* is an ink pack and includes a storage portion 110*a* and a connection member 120*a*. The first liquid container 100*a* has a substantially rectangular external peripheral outline shape which takes the Y directions as a longitudinal direction and the X directions as a transverse direction. The connection member 120*a* forms a point of connection for the first liquid container 100*a* on the +Y direction side. The storage portion 110*a* is positioned on the −Y direction side of the connection member 120*a*.

The width of the first liquid container 100*a* in the Z directions is smaller than the width thereof in the X directions and the width thereof in the Y directions. The term "width" herein means the distance in each direction between outermost portions of the first liquid container 100*a*. In other words, the first liquid container 100*a* has a thin flat shape. Therefore, according to the first liquid container 100*a*, high stability in terms of the arrangement orientation on the first case 61*a* illustrated in FIG. 6 can be obtained.

Container

FIGS. 7 and 8 are now referenced. The storage portion 110*a* is a member which stores liquid. In this embodiment, the storage portion 110*a* is configured as an elastic bag-shaped member. When viewed in the Z directions, the storage portion 110*a* has a substantially rectangular shape which takes the Y directions as a longitudinal direction. The storage portion 110*a* is formed by stacking two sheet members 111, 112 and fusing outer peripheral ends 113 of the sheet members 111, 112.

The first sheet member 111 is disposed on the −Z direction side and forms an upper surface of the container 110*a*. The second sheet member 112 is disposed on the +Z direction side and forms a lower surface of the container 110*a*. Each sheet member 111, 112 has a rectangular shape of the same size. Each sheet member 111, 112 does not need to have a completely flat shape. Each sheet member 111, 112 may have a bent shape in which a bulge is gradually formed toward the center in the container 110*a*. A framework member for holding the shape of the storage portion 110*a* may be housed inside the container 110*a*.

Each sheet member 111, 112 is formed of a flexible, material with a gas barrier property and liquid impermeability. Each sheet member 111, 112 may be formed of, for example, a film member such as polyethylene terephthalate (PET), nylon or polyethylene. Each sheet member 111, 112 may be formed by stacking a plurality of films made of the above-mentioned material. In this case, for example, the outer layer of each sheet member 111, 112 may be formed of a shock-resistant PET or nylon film and the inner layer of each sheet member 111, 112 may be formed of a polyethylene film resistant to ink. In addition, a layer deposited with, for example, aluminum may be added to the laminated structure of the sheet member 111, 112.

Connection Member

Figure 9A:
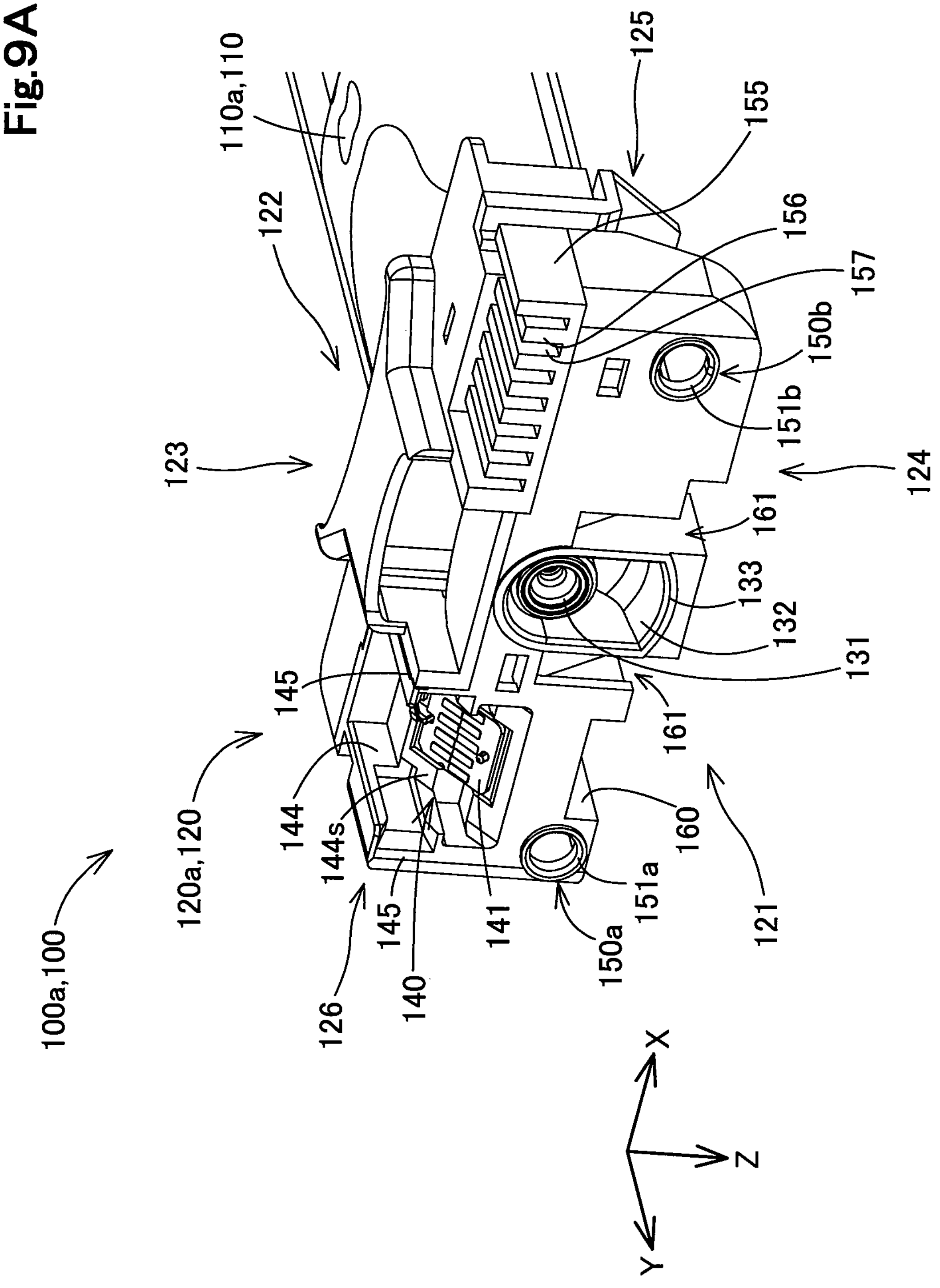
FIG. 9A is a schematic perspective view for separately illustrating the vicinity of a connection member in the first case.
Figure 9B:
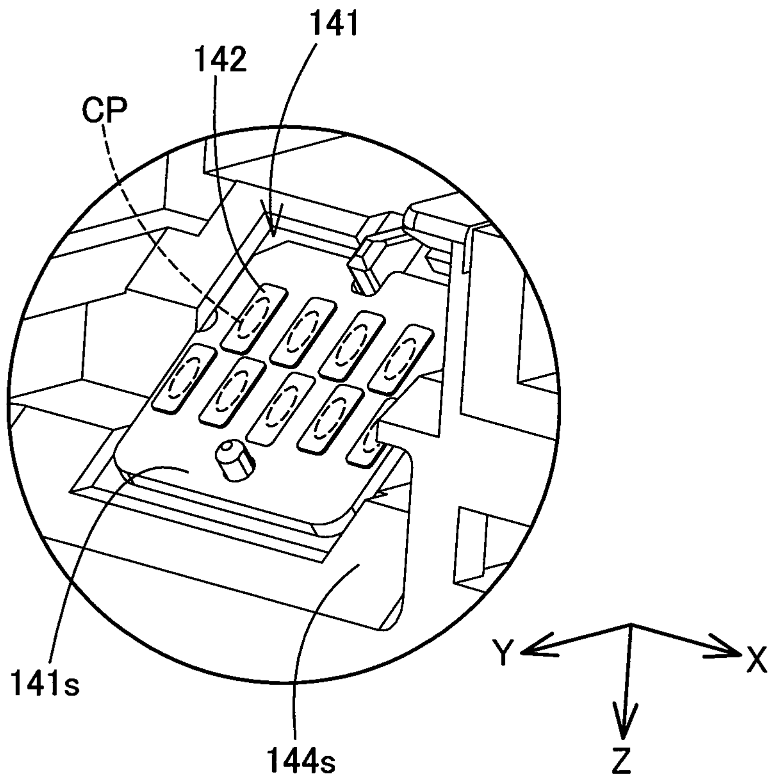
FIG. 9B is a schematic perspective view for separately illustrating the vicinity of a container-side electrical connector.

The configuration of the connection member 120*a* is described with further reference to FIGS. 9A and 9B. FIG. 9A is a schematic perspective view for separately illustrating the vicinity of a connection member 120*a* from FIG. 7. FIG. 9B is a schematic perspective view for separately illustrating the vicinity of a container-side electrical connector 140.

FIGS. 7 to 9A are now referenced. The connection member 120*a* is attached to an end portion of the storage portion 110*a* on the +Y direction side. The connection member 120*a* generally has a substantially cuboid shape which takes the X directions as a longitudinal direction. The width of the connection member 120*a* in the X directions is slightly smaller than the width of the storage portion 110*a* in the X directions. The difference between the two widths may be, for example, a few mm to a few ten mm. A body portion of the connection member 120*a* is manufactured by molding a resin member made of, for example, polypropylene.

The connection member 120*a* includes a first surface portion 121, a second surface portion 122, a third surface portion 123, a fourth surface portion 124, a fifth surface portion 125 and a sixth surface portion 126. In this Specification, a "surface portion" does not need to have a flat surface shape and may formed as a curved surface, a concave portion, a convex portion, a step, a groove, a bent portion, an inclined surface, or another type of portion. In addition, two surface portions "intersecting" means any one of a state in which the two surface portions actually intersect each other, a state in which an extended surface of one surface portion intersects with another surface portion, and a state in which extended surfaces of both the surface portions intersect each other. Therefore, a chamfered portion for forming a curved surface may be interposed between adjacent surface portions.

As illustrated in FIGS. 7 and 9A, the first surface portion 121 faces the forms a front portion of the connection member 120*a* facing the +Y direction. As illustrated in FIG. 8, the second surface portion 122 is located at a position opposing the first surface portion 121 and faces the −Y direction. The second surface portion 122 forms a rear portion of the connection member 120*a*.

FIGS. 7 and 9A are now referenced. The third surface portion 123 intersects with the first surface portion 121 and the second surface portion 122 and faces the −Z direction. The third surface portion 123 forms an upper surface of the connection member 120*a*. As illustrated in FIG. 8, the fourth surface portion 124 is positioned at a position opposing the third surface portion 123 and intersects with the first surface portion 121 and the second surface portion 122. The fourth surface portion 124 is a surface portion on the +Z direction side, faces the +Z direction and forms a bottom surface of the connection member 120*a*.

As illustrated in FIGS. 7 and 9A, the fifth surface portion 125 intersects with the first surface portion 121, the second surface portion 122, the third surface portion 123 and the fourth surface portion 124. The fifth surface portion 125 faces the +X direction and forms a left side surface of the connection member 120*a*. As illustrated in FIG. 8, the sixth surface portion 126 is positioned at a position opposing the fifth surface portion 125 and intersects with the first surface portion 121, the second surface portion 122, the third surface portion 123 and the fourth surface portion 124. The sixth surface portion 126 faces the −X direction and forms a right side surface of the connection member 120*a*.

As illustrated in FIG. 8, line-shaped slits 128 are formed across the entire fourth surface portion 124 of the connection member 120*a* in the X directions. The slit 128 is formed at substantially the center of the connection member 120*a* in the Z directions. In the container 110*a*, the outer peripheral ends 113 on the +Y direction side are inserted into the slits 128 and are fixed to the connection member 120*a* while being sandwiched in the thickness direction.

As illustrated in FIGS. 7 and 9A, a liquid outlet 131, a container-side electrical connector 140, a first receiver 150*a*, a second receiver 150*b* and a fitting structure receiver 155 are provided in the connection member 120*a* as components used for connecting to the first connection receiver 50*a*. In the connection member 120*a*, these components are all disposed on the first surface portion 121 side. Now, the components will be described in order and then other components provided to the connection member 120*a* will be described.

Liquid Outlet

FIG. 9A is now referenced. The liquid outlet 131 is an opening which opens in the +Y direction. In the liquid outlet 131, the liquid introduction unit 51 of the first connection receiver 50*a* illustrated in FIG. 5 is inserted in the Y direction. The liquid outlet 131 is provided at a substantially central position of the first surface portion 121 in the X directions. The liquid outlet 131 is formed at a position which is almost the same height as the height at which the storage portion 110*a* is fixed.

The liquid outlet 131 is connected to a flow passage, which is not shown in figures, provided in the connection member 120*a* and the fourth surface portion 124 side of the connection member 120*a* and communicates with a liquid storage portion in the storage portion 110*a* using a connection member, which is not shown in figures, housed in the connection portion 110*a*. A detailed description of the configuration of the liquid flow passage is not provided. Note that a valve structure or a sealing structure, which is not shown in figures, is provided in the connection member 120*a* in order to prevent the liquid from leaking. The valve structure or the sealing structure maintains a closed state before the liquid introduction unit 51 is inserted into the liquid outlet 131 and opens when the liquid introduction unit 51 is inserted.

In this embodiment, in the first surface portion 121, a peripheral edge 132 of the liquid outlet 131 is entirely recessed in the −Y direction, and the liquid outlet 131 is open at a position deep on the −Y direction side. With this configuration, the outer periphery of the liquid outlet 131 is surrounded by wall a wall portion formed by the peripheral edge 132. In this state, the liquid outlet 131 is more effectively protected and, for example, the user can be prevented from erroneously touching the liquid outlet 131. In addition, deterioration such as damage or deformation of the liquid container 100*a* due to collision with the liquid outlet 131 when the liquid container 100*a* is erroneously dropped can be suppressed.

In this embodiment, the peripheral edge 132 of the liquid outlet 131 is surrounded by a peripheral rib 133 which protrudes toward the +Y direction. When the liquid introduction unit 51 of the first connection receiver 50*a* is connected to the liquid outlet 131, the peripheral rib 133 makes contact with and is pushed by the proximal member 57 provided in the vicinity of the liquid introduction unit 51 and receives elastic force in the −Y direction. Note that, as described later, in the mounting state in which the first liquid container 100*a* is mounted to the liquid ejection apparatus 10, the first case 61*a* provided with the first liquid container 100*a* engages with the first connection receiver 50*a*. Because of this, even if the peripheral rib 133 is biased in the −Y direction by the proximal member 57, the first liquid container 100*a* and the first case 61*a* are prevented from moving toward the −Y direction from the arrangement area LA.

Container-Side Electrical Connector

As illustrated in FIGS. 9A and 9B, the container-side electrical connector 140 includes a base plate portion 141 used for connection to the apparatus-side electrical connection unit 52. The container-side electrical connector 140 electrically connects to the apparatus-side electrical connection unit 52 of the first connection receiver 50*a* illustrated in FIG. 5. A plurality of terminal portions 142 are disposed on a front surface 142*s* of the base plate portion 141. The plurality of terminal portions 142 is disposed at a position corresponding to the terminal portion 52*t* of the apparatus-side electrical connection unit 52. A surface of the base plate portion 141 opposite to the front surface 141*s* may be provided with a storage device configured to store information on liquid, a circuit for detecting connection of the apparatus-side electrical connection unit 52, or another component. The storage device and the circuit are not shown in the drawings and a detailed description thereof is not provided.

In this embodiment, each terminal portion 142 has a substantially flat contact surface which contacts with the terminal portion 52*t* of the apparatus-side electrical connection unit 52. In FIG. 9B, the position of a contact portion CP at which each terminal portion 142 contacts with the terminal portion 52*t* of the apparatus-side electrical connection unit 52 is represented by a broken line. The contact portions CP of the terminal portions 142 are arranged in rows along a row direction parallel to the X directions on both the top row and the bottom row of the front surface 141*s* of the base plate portion 141. Note that the arrangement pattern of the terminal portion 142 and the contact portion CP is not limited to that illustrated in FIG. 9B.

In this embodiment, the container-side electrical connector 140 is provided at a position close to an end of the connection member 120*a* on the −X direction side. In the connection member 120*a*, a base plate placement portion 144 for placing the base plate portion 141 of the container-side electrical connector 140 is formed as a recess which is recessed in the −Y direction and the +Z direction. The base plate placement portion 144 is formed with an inclined surface 144*s* which faces an obliquely upward direction between the +Y direction and the −Z direction. The container-side electrical connector 140 is disposed at an incline on the inclined surface 144*s* at a placement angle substantially parallel to the inclined surface 144*s*. In other words, a normal vector of the contact surface between the front surface 141*s* of the base plate portion 141 and the terminal portion 52*t* includes a +Y direction vector component and a −Z direction vector component.

As described above, the base plate portion 141 is disposed such that the front surface 141*s* faces the −Z direction. Because of this, when the apparatus-side electrical connection unit 52 is electrically connected, the container-side electrical connector 140 electrically contacts with the apparatus-side electrical connection unit 52 while receiving at least downward-acting +Z direction force from the apparatus-side electrical connection unit 52. This downward-acting force results in a favorable connection state between the container-side electrical connector 140 and the apparatus-side electrical connection unit 52 and improved electrical connectivity of the container-side electrical connector 140.

In this embodiment, as described above, the base plate portion 141 is disposed at an angle and the front surface 141*s* also faces the +Y direction side. Because of this, the first liquid container 100*a* is moved in the +Y direction together with the first case 61*a* and the container-side electrical connector 140 is connected to the apparatus-side electrical connection unit 52. In this case, the force when moving the first case 61*a* in the +Y direction is used to form the electrical connection state between the container-side electrical connector 140 and the apparatus-side electrical connection unit 52. Therefore, electrical connectivity between the container-side electrical connector 140 and the apparatus-side electrical connection unit 52 is improved.

During connection to the apparatus-side electrical connection unit 52, the terminal portion 52*t* of the apparatus-side electrical connection unit 52 moves while rubbing against the contact surface of the terminal portion 142 of the container-side electrical connector 140. With this configuration, foreign matter and the like which has adhered to the contact surface of the terminal portion 142 of the container-side electrical connector 140 is removed by the terminal portion 52*t* of the apparatus-side electrical connection unit 52, and hence electrical connectivity with the container-side electrical connector 140 is further improved.

In addition, when the first liquid container 100*a* is removed from the case storage portion 60 with the first case 61*a*, the −Y direction force applied to the first liquid container 100*a* from the apparatus-side electrical connection unit 52 assists movement of the first liquid container 100*a* toward the −Y direction. As a result, the first liquid container 100*a* is removed more easily.

The base plate portion 141 is provided at a deep position of the base plate placement portion 144. The base plate portion 141 is sandwiched by two wall portions 145 which protrude in the −Z direction and the +Y direction from the front surface 141*s* of the base plate portion 141 on either end of the in the X directions. The wall portions 145 function as protective portions of the base plate portion 141. Because of this, the base plate portion 141 can be prevented from becoming damages when, for example, the user erroneously touches the base plate portion 141 or erroneously drops the first liquid container 100*a*.

First Receiver and Second Receiver

When the first liquid container 100*a* is mounted to the liquid ejection apparatus 10, the first receiver 150*a* receives the first positioning portion 53*a* of the first connection receiver 50*a* illustrated in FIG. 5 and the second receiver 150*b* receives the second positioning portion 53*b* illustrated in FIG. 5. With this configuration, the mounting position of the first liquid container 100*a* is suitably restricted.

In this embodiment, the first receiver 150*a* and the second receiver 150*b* are formed as holes which extend in the −Y direction and include a first opening 151*a* and a second opening 151*b*, respectively. The openings 151*a*, 151*b* of the first receiver 150*a* and the second receiver 150*b* receive insertion of the corresponding positioning portions 53*a*, 53*b* from the +Y direction side. Note that, in this embodiment, the first opening 151*a* of the first receiver 150*a* and the second opening 151*b* of the second receiver 150*b* have different open shapes. The details thereof are described later.

The first receiver 150*a* is positioned on the −X direction side of the liquid outlet 131. In the first liquid container 100*a*, the first receiver 150*a* is provided at a lower corner portion on the −X direction side of the first surface portion 121. On the other hand, the second receiver 150*b* is positioned on the +X direction side of the liquid outlet 131. In the first liquid container 100*a*, the second receiver 150*b* is provided at a lower corner portion on the +X direction of the first surface portion 121.

In this embodiment, the liquid outlet 131 is sandwiched in the X directions by a pair of receivers 150*a*, 150*b*. With this configuration, when the first liquid container 100*a* is mounted to the liquid ejection apparatus 10, positional accuracy in the X directions of the liquid outlet 131 relative to the liquid introduction unit 51 illustrated in FIG. 5 is improved. Therefore, connectivity between the liquid introduction unit 51 and the liquid outlet 131 is improved. In addition, in this embodiment, because the distance between the pair of receivers 150*a*, 150*b* in the X directions is large, positioning accuracy is further improved.

Fitting Structure Receiver

The fitting structure receiver 155 is provided on the +X direction side of the liquid outlet 131. The fitting structure receiver 155 is disposed at a position dose to an end portion of the third surface portion 123 on the +Y direction side. The fitting structure receiver 155 protrudes at the same height in the −Z direction and has an uneven structure in which a plurality of substantially rectangular protrusions 156 which extend in parallel to the −Y direction is arranged in a row. An arrangement pattern of the protrusions 156 and valley portions 157, which are formed between the protrusions 156, in X directions has unevenness opposite to unevenness of a arrangement pattern of the uneven structure of the fitting structure 55 that is to be connected to the fitting structure receiver 155.

When the first liquid container 100*a* is moved in the +Y direction and connected to the corresponding first connection receiver 50*a*, the uneven structure of the fitting structure 55 and the uneven structure of the fitting structure receiver 155 are allowed to fit into each other. On the other hand, when the first liquid container 100*a* and the first connection receiver 50*a* do not form a suitable combination, the uneven structure of the fitting structure 55 is not compatible with the uneven structure of the fitting structure receiver 155 and the structures cannot fit into each other. Therefore, an incompatible and incorrect first liquid container 100*a* is prevented from being connected to the first connection receiver 50*a*.

Other Configuration of Connection Member

Recess

FIGS. 7, 8 and 9A are now referenced. A recess 160 which is recessed in the −Z direction is provided on the fourth surface portion 124 of the connection member 120*a*. In this embodiment, the recess 160 has a substantially rectangular shape, extends in the +Y direction to the first surface portion 121 and is open in the +Y direction. When the first liquid container 100*a* is disposed in the first 61*a*, a protrusion, which is described later, formed in the first liquid container 100*a* is housed in the recess 160. When viewed from the Z directions, the recess 160 is formed at a position which overlaps with at least part of the container-side electrical connector 140. The reason for this is described later.

Fitting Row

As illustrated in FIG. 9A, a pair of fitting recesses 161 are formed in the fourth surface portion 124 of the connection member 120*a*. In this embodiment, each fitting recess 161 is formed as a recess which is cut in the −Z direction. Similar to the above-mentioned recess 160, each fitting recess 161 opens in the +Y direction in the first surface portion 121. The two fitting recesses 161 are arranged in a row so as to sandwich the liquid outlet 131 in the X directions. The two fitting recesses 161 are each formed at a position adjacent to the peripheral edge 132 of the liquid outlet 131 in the X directions. When the first liquid container 100*a* is disposed in the first case 61*a*, corresponding fitting protrusions, which is described later, are inserted and fitted into the fitting recesses 161. With this configuration, the liquid outlet 131 is positioned on the first case 61*a* in the X directions.

First Case

FIGS. 6 to 8 are now referenced. The first case 61*a* has a substantially cuboid shape which takes the Y directions as a longitudinal direction. The first case 61*a* is formed as a hollow box which is open in the −Z direction and the +Y direction. The first case 61*a* is manufactured of a resin member made of, for example, polypropylene.

As illustrated in FIGS. 7 and 8, the first case 61*a* includes a bottom wall portion 200, two side wall portions 201, 202, a lid member 203 and a front wall portion 205. The bottom wall portion 200 is a substantially rectangular wall portion which forms a bottom surface of the first case 61*a*. The bottom wall portion 200 extends in the X directions and the Y directions. Herein, the term "extend" refers to a configuration which extends in one direction without interruption. As illustrated in FIG. 6, the first liquid container 100*a* is disposed above the bottom wall portion 200. When the first liquid container 100*a* is disposed, the bottom wall portion 200 has a size which can hold at least all of the storage portion 110*a*.

As illustrated in FIG. 8, the first side wall portion 201 is a substantially rectangular wall portion which intersects and communicates with a long −X direction side of the bottom wall portion 200 and forms a right side wall portion of the first case 61*a*. As illustrated in FIG. 7, the second side wall portion 202 is a substantially rectangular wall portion which intersects and communicates with a long +X direction side of the bottom wall portion 200 and forms a left side wall portion of the first case 61*a*. The first side wall portion 201 and the second side wall portion 202 extend parallel to each other across almost the entire area thereof. As illustrated in FIG. 6, the height of the first side wall portion 201 and the second side wall portion 202 are almost the same as the height of the connection member 120*a* of the first liquid container 100*a*. The first side wall portion 201 and the second side wall portion 202 sandwich the storage portion 110*a* of the first liquid container 100*a* in the X directions and define the arrangement angle of the storage portion 110*a* in a direction along a horizontal surface.

As illustrated in FIG. 7, an engagement protrusion 201*t* which protrudes in the +X direction is provided on an end of the first side wall portion 201 on the +Y direction side. Similarly, an engagement protrusion 202*t* which protrudes in the −X direction is provided on an end of the second side wall portion 202 on the +Y direction side. As illustrated in FIG. 6, when the first liquid container 100*a* is disposed in the first case 61*a*, the engagement protrusion 201*t* of the first side wall portion 201 engages with a recess in the sixth surface portion 126 of the connection member 120*a*. In addition, the engagement protrusion 202*t* of the second side wall portion 202 engages with a recess in the fifth surface portion 125 of the connection member 120*a*.

As illustrated in FIG. 7, the lid member 203 is suspended above the first side wall portion 201 and the second side wall portion 202 on the end on the −Y direction side. As illustrated in FIG. 6, when the first liquid container 100*a* is disposed in the first case 61*a*, the lid member 203 partially covers a portion on an end side of the storage portion 110*a* on the −Y direction side. The lid member 203 prevents the end of the storage portion 110*a* on the −Y direction side from rising up in the −Z direction. In this embodiment, the lid member 203 can be attached/removed to/from the body of the first case 61*a*.

Figure 10A:
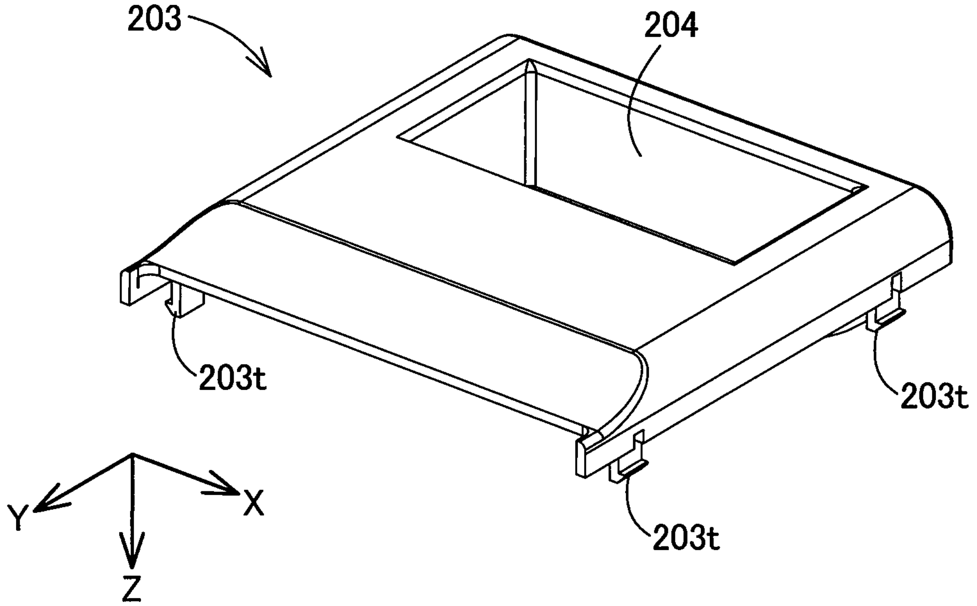
FIG. 10A is a first schematic perspective view for illustrating a lid member of the first case.
Figure 10B:
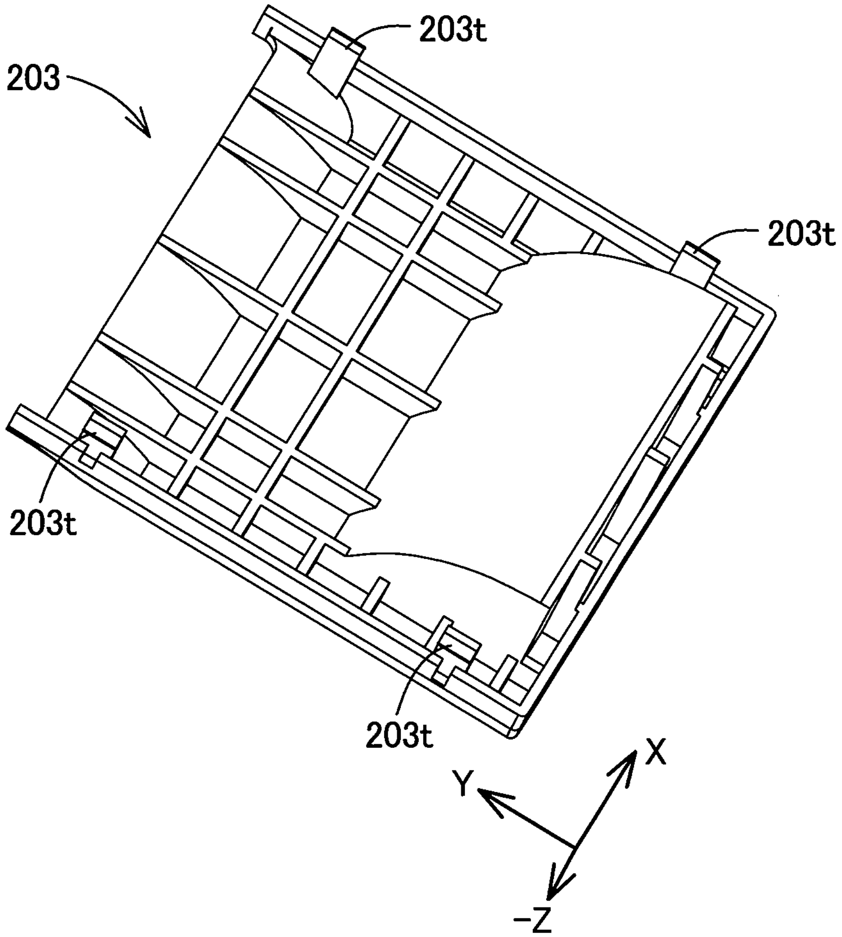
FIG. 10B is a second schematic perspective view for illustrating the lid member of the first case.

FIG. 10A is a schematic perspective view for illustrating a −Z direction side of the lid member 203. FIG. 10B is a schematic perspective view for illustrating a +Z direction side of the lid member 203. As illustrated in FIGS. 10A and 10B, a plurality of hooks 203*t* are formed on peripheral end portions of the lid member 203. Each hook 203*t* protrudes in the +Z direction and engages with recesses, which are not shown, provided in the first side wall portion 201 or the second side wall portion 202. A cavity 204 recessed toward the +Z direction is formed in a surface of the lid member 203 on the −Z direction side. When the user removes/inserts the first case 61*a* of the liquid ejection apparatus 10 from/to the case storage portion 60, the user can hook his/her finger in the cavity 204.

Figure 11:
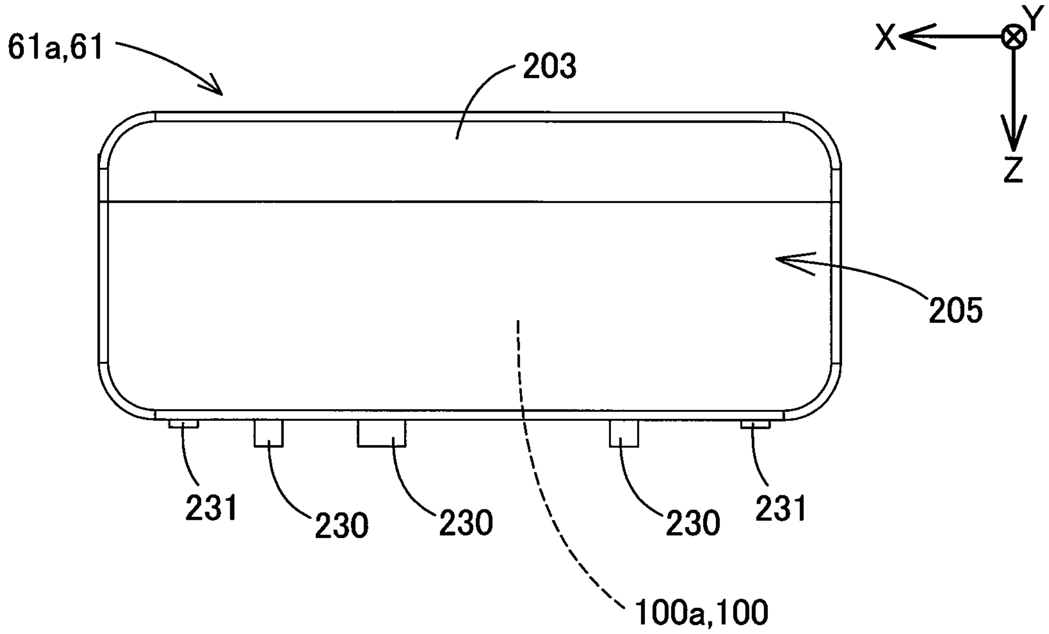
FIG. 11 is a schematic diagram for illustrating a front wall portion of the first case.

FIG. 11 is a schematic diagram for illustrating the front wall portion 205. The front wall portion 205 is a substantially rectangular wall portion which intersects with the bottom wall portion 200, the first side wall portion 201 and the second side wall portion 202 on an end portion on the −Y direction side. An upper end of the front wall portion 205 is formed by the lid member 203. When the first case 61*a* disposed with the first liquid container 100*a* is viewed from the Y directions, all of the first liquid container 100*a* is covered and hidden by the front wall portion 205.

Other components provided in the bottom wall portion 200 are described with reference to FIGS. 6 to 8, 11 and 12. As illustrated in FIG. 7, a pair of hook-shaped fitting protrusions 207 which protrude parallel to the −Z direction are formed on the +Y direction side of the bottom wall portion 200. Each of the fitting protrusions 207 is formed at a central portion in the X directions so as to be separated from each other in the X directions. As illustrated in FIG. 6, when the first liquid container 100*a* is disposed in the first case 61*a*, each of the fitting protrusions 207 is inserted and fitted into the above-mentioned corresponding fitting recesses 161.

As illustrated in FIG. 7, a protrusion 210 which protrudes in the −Z direction is also formed on an end of the bottom wall portion 200 on the +Y direction side. The protrusion 210 is positioned closer to the −X direction side from the central portion in the X directions and is positioned closer to the −X direction than the pair of fitting protrusions 207. In this embodiment, the protrusion 210 has a rectangular shape. The protrusion 210 is formed so as to be hollow. An internal space 211 in the protrusion 210 is described later. As illustrated in FIG. 6, when the first liquid container 100*a* is disposed in the first case 61*a*, the protrusion 210 is housed in the above-mentioned recess 160 of the connection member 120*a*.

In this embodiment, when the protrusion 210 is housed in the recess 160, an outer wall surface of the protrusion 210 and an inner wall surface of the recess 160 make surface contact. In other words, the protrusion 210 is fitted into the recess 160. Therefore, in this embodiment, the protrusion 210 and the recess 160 functions as a positioning portion for the connection member 120*a* in the first case 61*a*.

As illustrated in FIGS. 7 and 8, a plurality of straight narrow grooves 213 which extend across the Y directions are formed in rows parallel to the X directions surface of the bottom wall portion 200 on a −Z direction side. The narrow grooves 213 guide the movement of the storage portion 110*a* of the first liquid container 100*a* when the storage portion 110*a* is disposed on a surface of the bottom wall portion 200 by being slid in the Y directions.

As illustrated in FIGS. 7 and 8, step portions 214 which become taller stepwise in the −Z direction are provided at both a corner portion between the bottom wall portion 200 and the first side wall portion 201 and a corner portion between the bottom wall portion 200 and the second side wall portion. When the first liquid container 100*a* is disposed in the first case 61*a*, the step portions 214 support the outer peripheral edge 113 of the storage portion 110*a* from below. Therefore, the arrangement orientation of the storage portion 110*a* is stabilized on the first case 61*a*.

In this embodiment, the arrangement position of the first liquid container 100*a* on the first case 61*a* is fixed only with the connection member 120*a*. While the top portion of the storage portion 110*a* is covered by the lid member 203, the storage portion 110*a* is not practically constrained in the first case 61*a*. In other words, the storage portion 110*a* is disposed in a state in which movement away from the first case 61*a* is allowed except for an end portion on the +Y direction side which is connected to the connection member 120*a*. As a result, because the first liquid container 100*a* is not unnecessarily restricted by the first case 61*a*, the first liquid container 100*a* is easily mounted/removed to/from the first case 61*a*.

Figure 12:
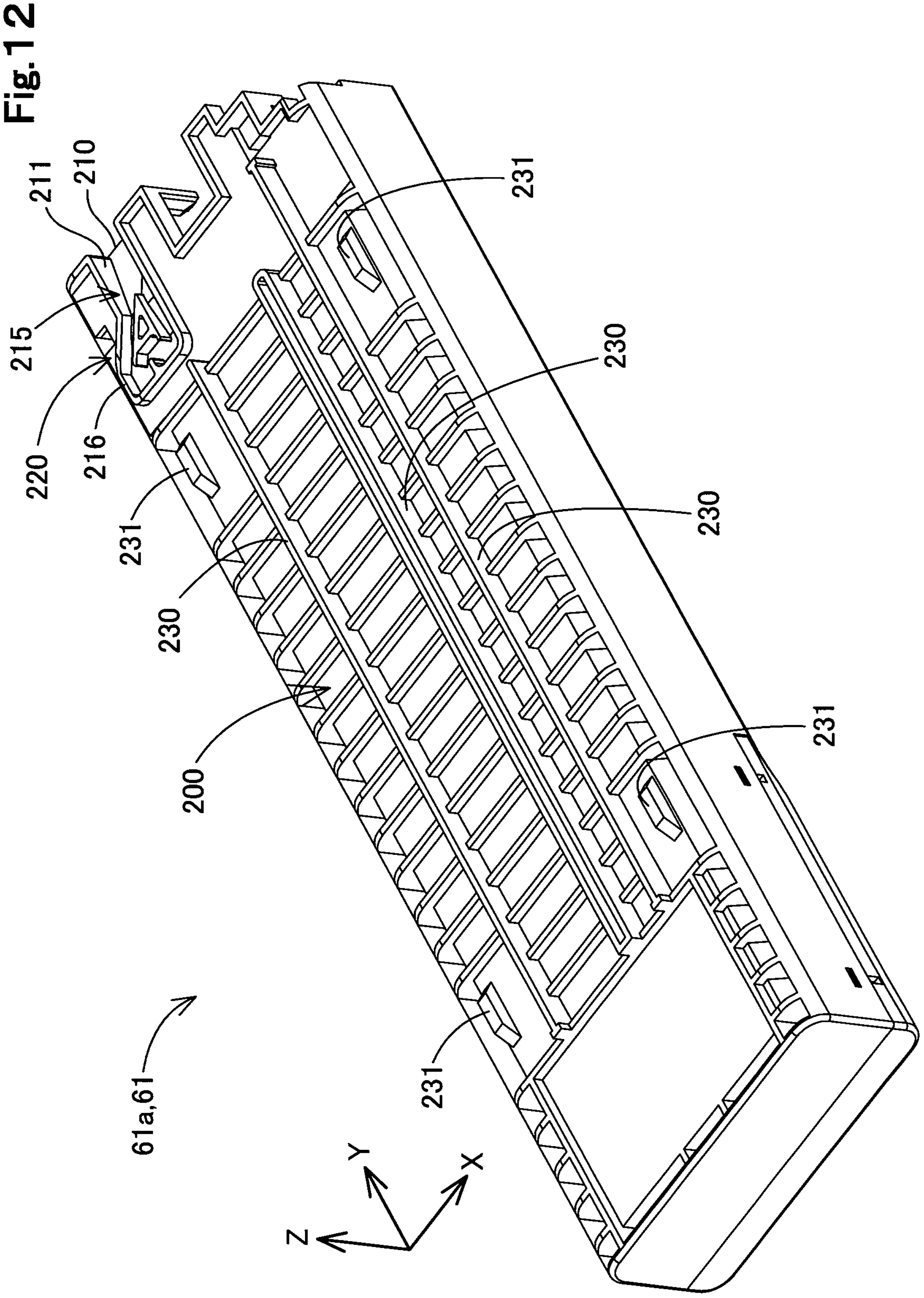
FIG. 12 is a schematic perspective view for illustrating a configuration of a lower surface side on a bottom wall portion of the first case.

The configuration of a lower surface side of the bottom wall portion 200 is described with reference to FIG. 12. FIG. 12 is a schematic perspective view for illustrating the first case 61*a* when viewed from the +Z direction side. A groove portions 215 is formed on an end of the bottom wall portion 200 on the +Y direction side on a +Z direction side surface of the bottom wall portion 200. In this embodiment, the groove portion 215 is formed by being surrounded by a rib 216. The groove portion 215 forms a case-side fixing structure 220. An end portion of the groove portion 215 on the +Y direction side is formed by the above-mentioned internal space 211 of the protrusion 210. In other words, the internal space 211 of the protrusion 210 forms part of the case-side fixing structure 220 and is included in the case-side fixing structure 220. The internal space 211 of the protrusion 210 is open in the +Y direction and forms the groove portion 215, that is, an entrance of the case-side fixing structure 220.

As described above, the case-side fixing structure 220 moves in conjunction with the apparatus-side fixing structure 54 to restrict the movement of the first case 61*a* toward the Y directions. In the case storage state in which the first case 61*a* is disposed in the predetermined arrangement area LA of the case storage portion 60 illustrated in FIG. 3, the case-side fixing structure 220 is provided with the protrusion 54*p* of the apparatus-side fixing structure 54 illustrated in FIG. 5, that is, an engaged portion which engages with the engaged member 54*p*. The engaged portion is described later. Movement of the first case 61*a* toward the −Y direction is restricted by the protrusion 54*p* locking into the engaged member. In this embodiment, the groove portion 215 which forms the case-side fixing structure 220 is formed as to as have a heart-cam groove structure, which is a loop-shaped groove structure to be described later. The configuration of the case-side fixing structure 220 and the mechanism of engagement between the engaged portion of the case-side fixing structure 220 and the protrusion 54*p*, that is, the engagement portion 54*p* of the apparatus-side fixing structure 54 are described later.

In addition, a plurality of rail ribs 230 and a plurality of legs 231 are provided on a surface of the bottom wall portion 200 on the +Z direction. As illustrated in FIG. 11, the rail ribs 230 are formed as protruding walls which protrude in the +Z direction and, as illustrated in FIG. 12, extend as almost constant straight lines in the Y directions. As described above, the rail ribs 230 fit into the rail grooves 64 formed on the bottom surface of the case storage portion 60 to guide the movement of the first case 61*a* in the Y directions. As illustrated in FIG. 11, the plurality of legs 231 protrude in the +Z direction and all have the same height. The plurality of legs 231 suitably maintain the arrangement orientation of the first case 61*a* in the arrangement area LA of the case storage portion 60 illustrated in FIG. 3.

Second Liquid Container and Second Case

Now, overall configurations of the second liquid container 100*b* and the second case 61*b* are first described. Note that in the following description and the figures, components that are the same or which correspond to the various above-mentioned components of the first liquid container 100*a* and the first case 61*a* are denoted by the same reference numbers, or the same reference numbers with different alphabet letters following the same numbers. Any components denoted by corresponding reference numbers as described above enact a similar effect to corresponding components in the second liquid container 100*b* or the second case 61*b* and the first liquid container 100*a* or the first case 61*a*. Therefore, the various above-described effects of the first liquid container 100*a* and the first case 61*a* can also be achieved by corresponding components in the second liquid container 100*b* and the second case 61*b*.

Figure 13:
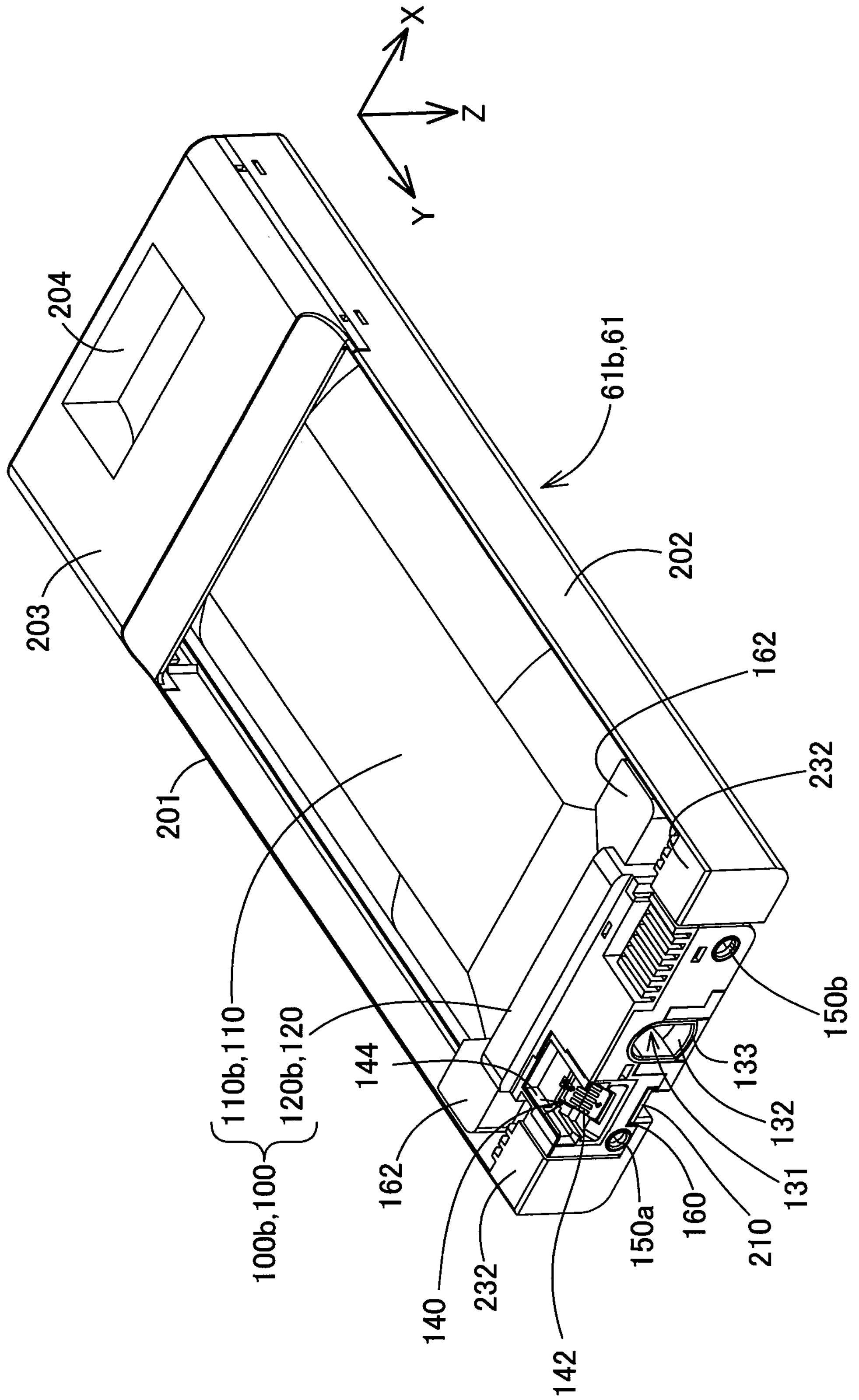
FIG. 13 is a schematic perspective view for illustrating a second liquid container when disposed in a second case.
Figure 14:
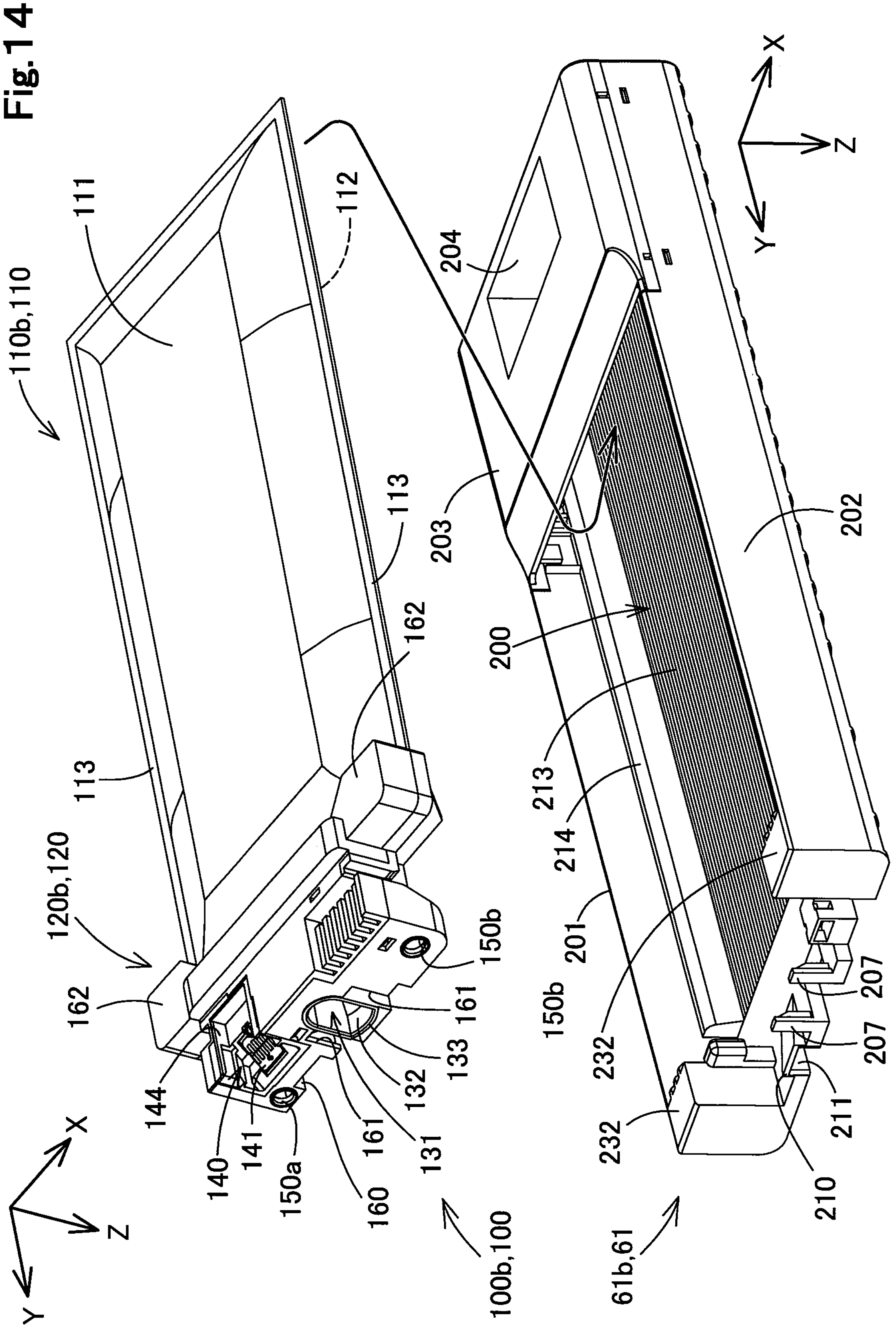
FIG. 14 is a first schematic exploded perspective view for illustrating a state in which the second liquid container has been removed from the second case.
Figure 15:
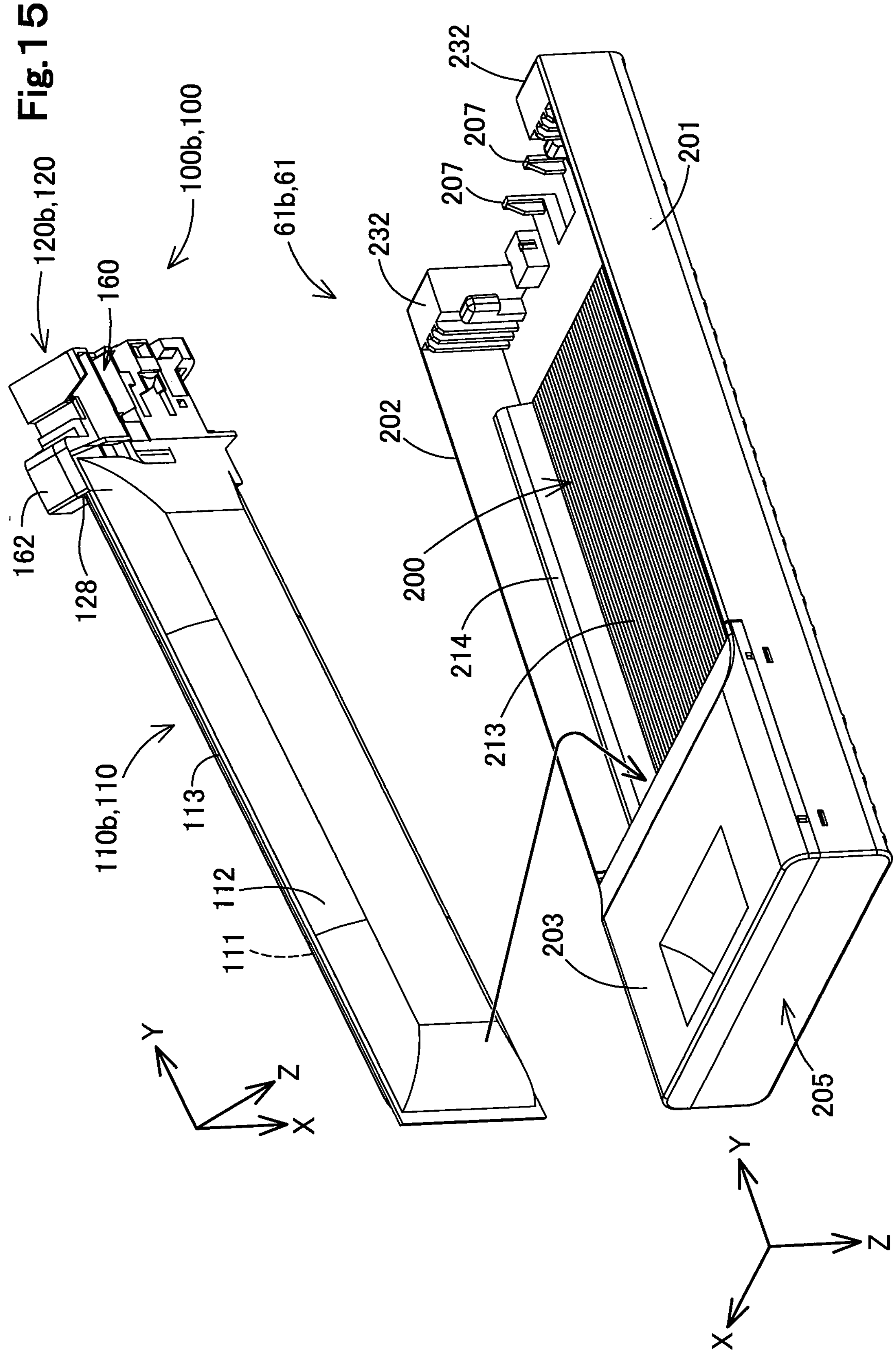
FIG. 15 is a second schematic exploded perspective view for illustrating a state in which the second liquid container has been removed from the second case.
Figure 16:
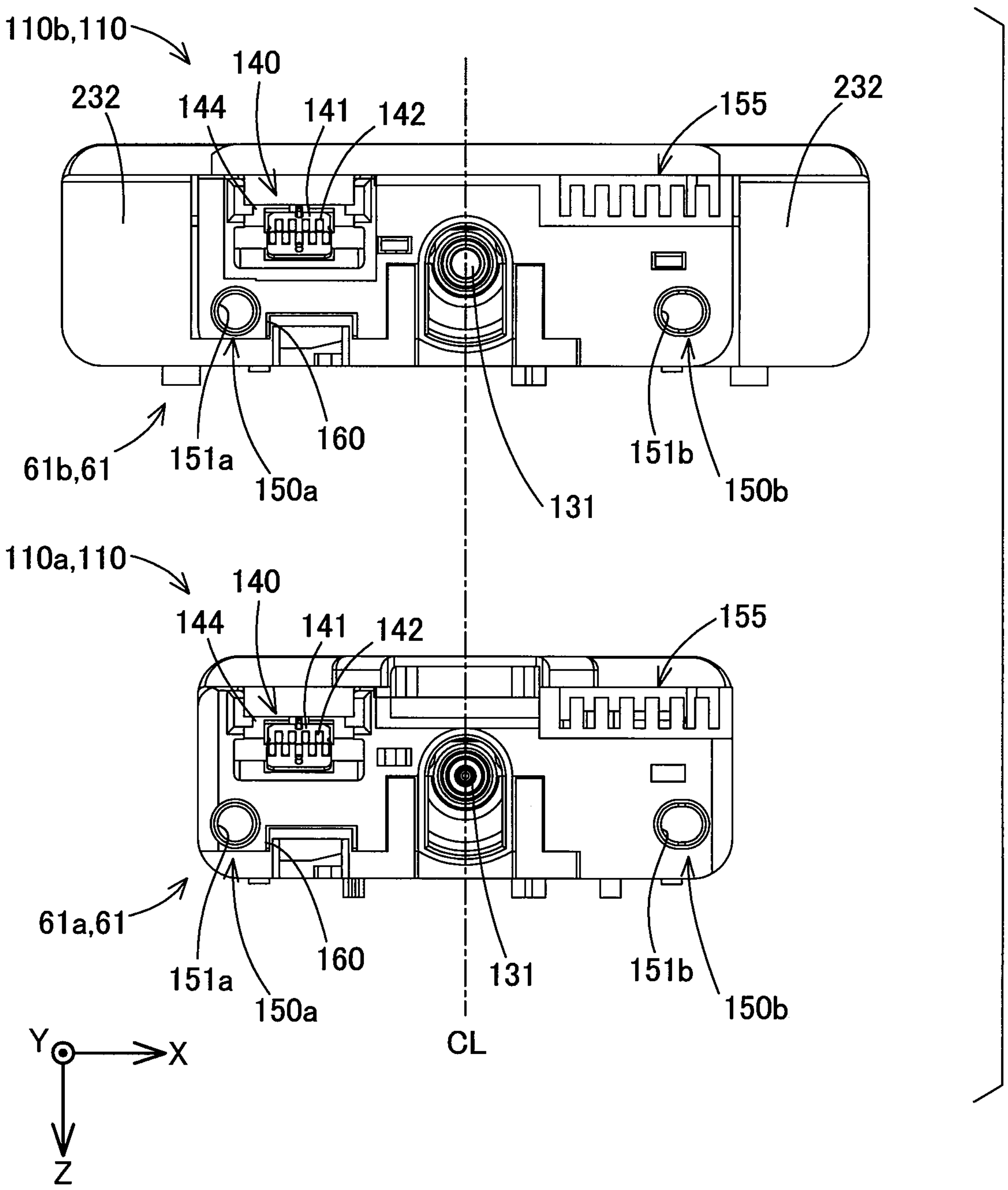
FIG. 16 is a schematic diagram for illustrating the second liquid container when disposed in the second case when viewed from a −Y direction.
Figure 17:
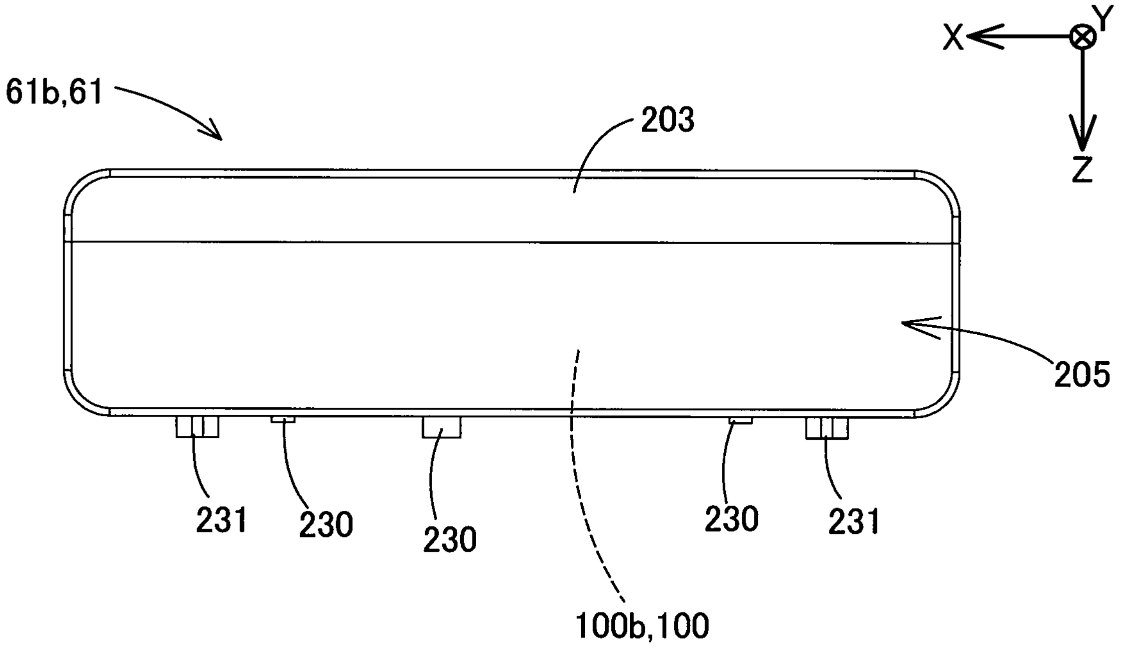
FIG. 17 is a schematic diagram for illustrating a front wall portion of the second case.
Figure 18:
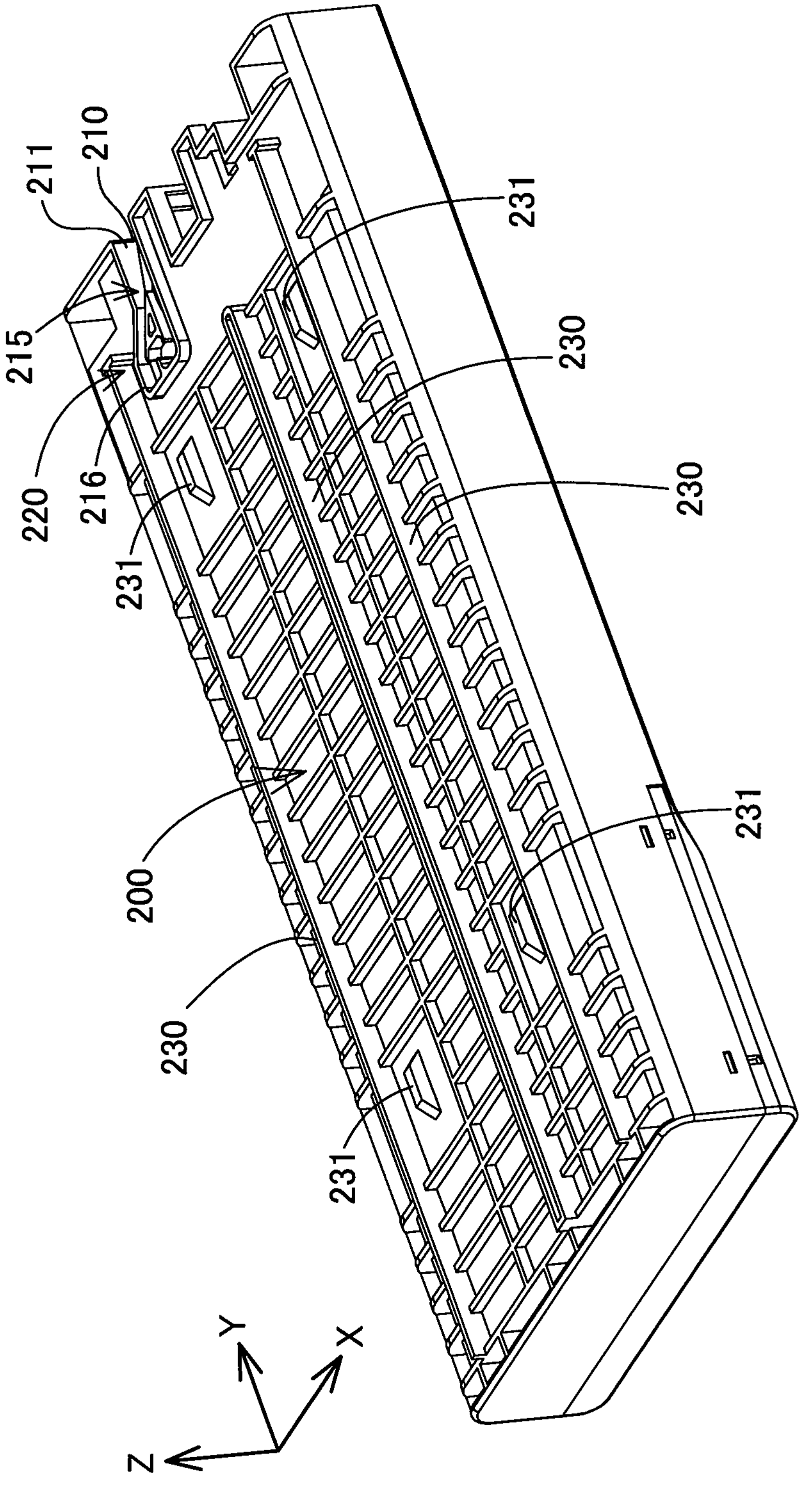
FIG. 18 is a schematic perspective diagram for illustrating a configuration of a lower surface side on a bottom wall portion of the second case.

FIGS. 13 to 18 are now referenced. FIG. 13 is a schematic perspective view for illustrating a second liquid container 100*b* when disposed in the second case 61*b*. FIG. 14 is a first schematic exploded perspective view for illustrating a state in which the second liquid container 100*b* has been removed from the second case 61*b* and illustrates the second liquid container 100*b* when viewed from a tip portion side on the +Y direction side. FIG. 15 is a second schematic exploded perspective view for illustrating a state in which the second liquid container 100*b* has been removed from the second case 61*b* and illustrates the second liquid container 100*b* when viewed from a rear end portion side on the −Y direction side. Note that, in FIGS. 14 and 15, the arrows X, Y and Z corresponding to the second liquid container 100*b* and the second case 61*b* are illustrated separately. FIG. 16 is a schematic diagram for illustrating the second liquid container 100*b* when disposed in the second case 61*b* when viewed from the −Y direction. The lower half of FIG. 16 illustrates the first liquid container 100*a* when disposed in the first case 61*a* and viewed from the same direction for comparison. In FIG. 16, a central axis CL in the X directions of the first liquid container 100*a* and the second liquid container 100*b* is denoted by a dash-dotted line. FIG. 17 is a schematic diagram for illustrating the front wall portion 205 of the second case 61*b* when viewed from the +Y direction. FIG. 18 is a schematic perspective diagram for illustrating the configuration of a lower surface side on the bottom wall portion 200 of the second case 61*b* and illustrates the second case 61*b* when viewed from the +Z direction side.

Send Liquid Container

As illustrated in FIGS. 14 and 15, the second liquid container 100*b* has substantially the same configuration as the first liquid container 100*a* apart from the following aspects. The width of the second liquid container 100*b* in the X directions is larger than that of the first liquid container 100*a* so that the second liquid container 100*b* can store a larger amount of liquid than the first liquid container 100*a*.

As illustrated in FIGS. 14 and 15, similar to the first liquid container 100*a*, the second liquid container 100*b* includes a storage portion 110*b* and a connection member 120*b*. The storage portion 110*b* of the second liquid container 100*b* has substantially the same configuration as the storage portion 110*a* of the first liquid container 100*a* except that the storage portion 110*b* has a larger width in the X directions.

The connection member 120*b* of the second liquid container 100*b* has substantially the same configuration as the connection member 120*a* of the first liquid container 100*a* except that a pair of side end support members 162 have been added. Each of the side end support members 162 expands in the +X direction or the −X direction on an end of a −Y direction side of a body portion which has substantially the same shape as the connection member 120*a* of the first liquid container 100*a*. Each of the side end support members 162 holds a corner portion on a +Y direction side of the storage portion 110*b*.

FIG. 16 is now referenced. The configuration of arrangement of components for connection to a second connection receiver 50*b* of the connection member 120*b* of the second liquid container 100*b* is substantially the same as that of the connection member 120*a* of the first liquid container 100*a*. The connection member 120*b* of the second liquid container 100*b* is only slightly changed from the connection member 120*a* of the first liquid container 100*a*, and hence members can be used in common, which can reduce manufacturing costs. In addition, the second connection receiver 50*b* which corresponds to the connection member 120*b* of the second liquid container 100*b* also has substantially the same configuration as the first connection receiver 50*a* which corresponds to the connection member 120*a* of the first liquid container 100*a*, and hence manufacturing costs of the connection member 120 are reduced.

In the following description, the storage portion 110*a* of the first liquid container 100*a* and the storage portion 110*b* of the second liquid container 100*b* are collectively referred to as "storage portion 110" unless otherwise needing to be differentiated from each other. In addition, the connection member 120*a* of the first liquid container 100*a* and the connection member 120*b* of the second liquid container 100*b* are collectively referred to as "connection member 120" unless otherwise needing to be differentiated from each other.

Second Case

FIGS. 14, 15 and 16 to 18 are now referenced. The second case 61*b* has substantially the same configuration as the first case 61*a* except that the second case 61*b* has been altered so as to be compatible with the width of the second liquid container 100*b* in the X directions. An end portion of the second case 61*b* on the +Y direction side is provided with additional wall portions 232. As illustrated in FIG. 13, the additional wall portions 232 oppose one of the pair of side end support members 162 of the connection member 120*b* in the Y directions when the second liquid container 100*b* has been disposed.

Mounting Mechanism of Liquid Container

Figure 19:
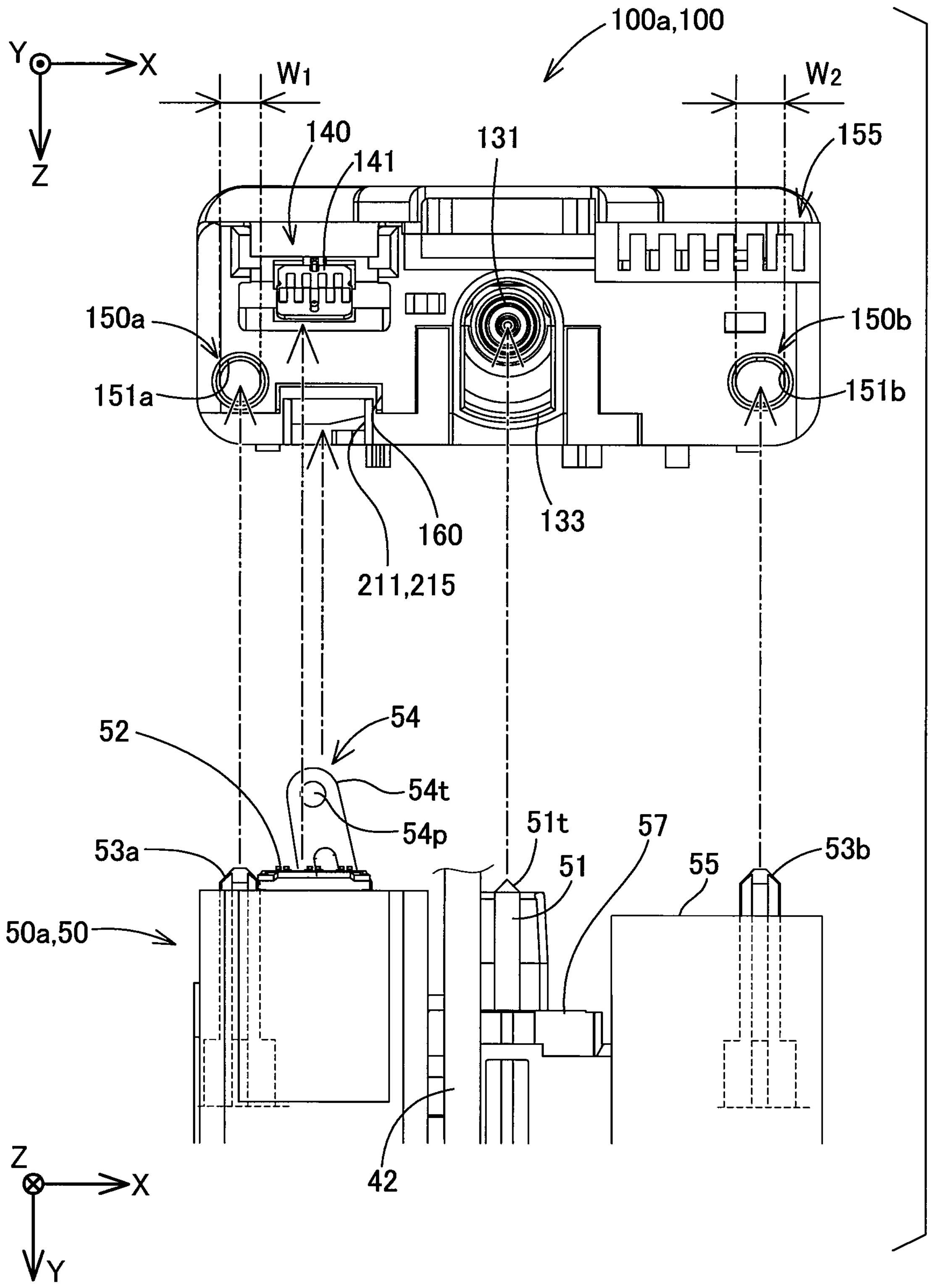
FIG. 19 is a schematic diagram mounting the liquid container onto the connection receiver.

The mechanism of mounting the liquid container 100 to the connection receiver 50 is described with reference to FIG. 19. The top half of FIG. 19 illustrates the first liquid container 100*a* when disposed with the first case 61*a* when viewed from the −Y direction. The lower half of FIG. 19 illustrates part of the first connection receiver 50*a* when viewed from the −Z direction so as to correspond to the first liquid container 100*a* illustrated in the top half. Note that, the following description can be applied to both mounting of the first liquid container 100*a* to the first connection receiver 50*a* and mounting of the second liquid container 100*b* to the second connection receiver 50*b*.

In the case storage portion 60 illustrated in FIG. 3, when the case 61 moves in the +Y direction toward the arrangement area LA with the liquid container 100 disposed therein, first, the pair of positioning portions 53*a*, 53*b* of the connection receiver 50 is inserted into the pair of receivers 150*a*, 150*b* of the liquid container 100 and the liquid outlet 131 of the liquid container 100 is positioned.

Then, the liquid introduction unit 51 of the connection receiver 50 is inserted into the liquid outlet 131 of the liquid container 100 and the liquid outlet 131 of the liquid container 100 and the liquid introduction unit 51 and the connection receiver 50 connect to each other. Note that the peripheral rib 133 provided around the liquid outlet 131 makes contact with the proximal member 57 provided around the liquid introduction unit 51 before connection between the liquid outlet 131 and the liquid introduction unit 51 is complete. When the liquid container 100 and the case 61 are pushed in the +Y direction before connection between the liquid outlet 131 and the liquid introduction unit 51 is complete, the proximal member 57 displaces in the +Y direction. The liquid container 100 is biased in the −Y direction by the biasing member provided inside the proximal member 57.

In parallel with the connection between the liquid outlet 131 and the liquid introduction unit 51, the apparatus-side electrical connection unit 52 of the connection receiver 50 is inserted into the base plate placement portion 144 of the liquid container 100 to electrically connect to the base plate portion 141 of the container-side electrical connector 140. When connection between the liquid outlet 131 and the liquid introduction unit 51 is complete, electrical connection between the container-side electrical connector 140 and the apparatus-side electrical connection unit 52 is established.

Before the pair of positioning portions 53*a*, 53*b* is inserted into the pair of receivers 150*a*, 150*b*, the apparatus-side fixing structure 54 of the connection receiver 50 is inserted into the internal space 211 of the protrusion 210 which forms the entrance of the groove portion 215 in the case 61. When connection between the liquid outlet 131 and the liquid introduction unit 51 is complete, the protrusion 54*p* of the apparatus-side fixing structure 54 engages with the engaged portion of the case-side fixing structure 220 in the case 61 illustrated in FIGS. 12 and 18 due to an engagement mechanism to be described later. As a result, the state in which the position of the case 61 is fixed at the predetermined arrangement area LA in the case 61 illustrated in FIG. 3 is the "case storage state in which the case 61 is mounted to the case storage portion 60".

With the liquid container 100 according to this embodiment, the container-side electrical connector 140 is positioned between the liquid outlet 131 and the first receiver 150*a* in the X directions. Because of this, providing the pair of positioning portions 53*a*, 53*b* and the pair of receivers 150*a*, 150*b* enhances positioning accuracy in the X directions when positioning the liquid outlet 131 and the container-side electrical connector 140 with respect to the apparatus-side electrical connection unit 52.

With the liquid container 100 according to this embodiment, the recess 160 which includes the internal space 211 as the entrance of the case-side fixing structure 220 is positioned between the liquid outlet 131 and the first receiver 150*a* in the X directions. Because of this, the pair of positioning portions 53*a*, 53*b* and the pair of receivers 150*a*, 150*b* guide movement of the apparatus-side fixing structure 54 toward the Y directions after the apparatus-side fixing structure 54 has been inserted into the groove portion 215 and enhance positioning accuracy when positioning the apparatus-side fixing structure 54 with respect to the case-side fixing structure 220.

In addition, with the liquid container 100 according to this embodiment, the distance in the X directions between each of the pair of receivers 150*a*, 150*b* is increased by the size of the container-side electrical connector 140 and the recess 160 provided between the liquid outlet 131 and the first receiver 150*a* as described above. Therefore, providing the pair of positioning portions 53*a*, 53*b* and the pair of receivers 150*a*, 150*b* further enhances positioning accuracy as described above.

As described above, in the liquid container 100 according to this embodiment, the first opening 151*a* of the first receiver 150*a* and the second opening 151*b* of the second receiver 150*b* have different open shapes. An open width $W_2$ of the second opening 151*b* in the X directions is larger than an open width $W_1$ of the first opening 151*a* in the X directions. With this configuration, the angle of the second positioning portion 53*b* with respect to the Y directions in the horizontal direction when the second positioning portion 53*b* is inserted into the second receiver 150*b* can be given some margin. Because of this, the operation of connecting the liquid container 100 to the connection receiver 50 is simplified. In addition, providing such a margin reduces stress generated when the second positioning portion 53*b* is inserted into the second receiver 150*b* during connection of the liquid container 100 to the connection receiver 50. Note that, in this embodiment, the first opening 151*a* and the second opening 151*b* have substantially the same open width in the Z directions, but the first opening 151*a* and the second opening 151*b* may have different open widths in the Z directions.

Figure 20A:
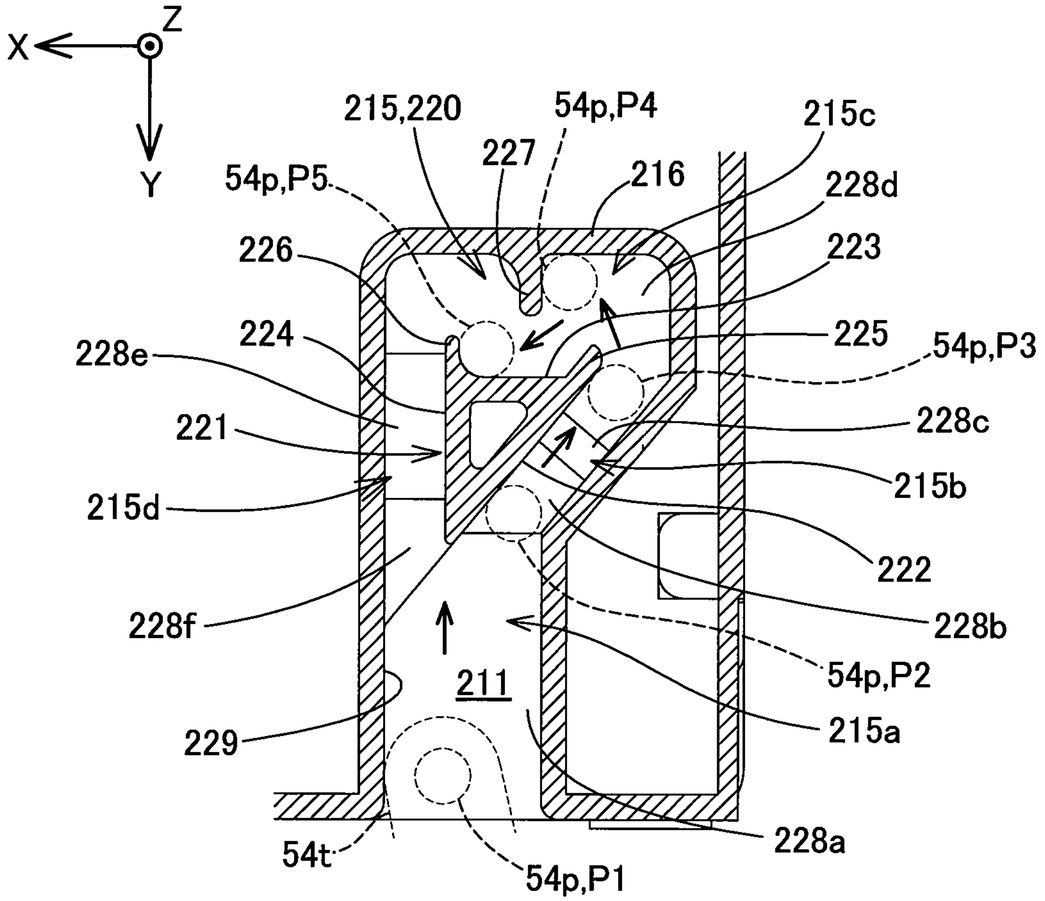
FIG. 20A is a schematic diagram for explaining the mechanism in place until an engagement portion completely engages with an engaged portion.
Figure 20B:
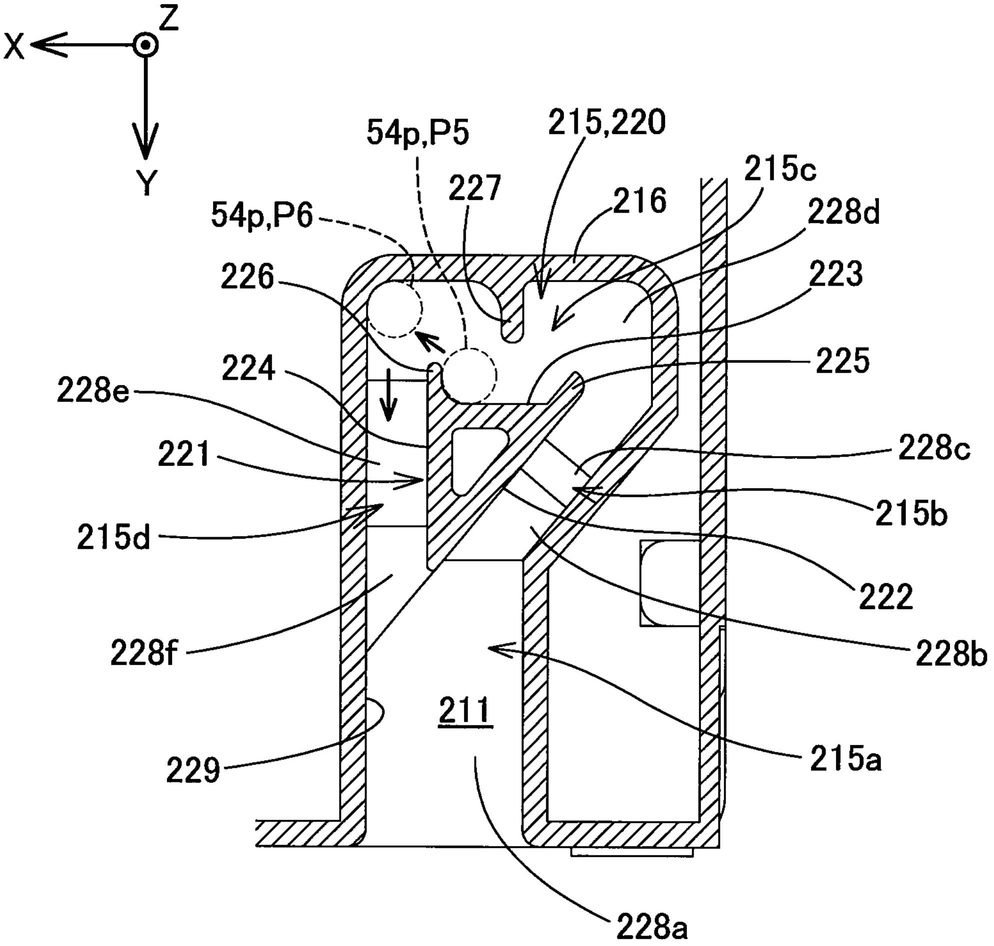
FIG. 20B is a schematic diagram for explaining a mechanism on releasing engagement between the engagement portion and the engaged portion.

Mechanism of Apparatus-Side Fixing Structure Engaging with Case-Side Fixing Structure The mechanism of the apparatus-side fixing structure 54 engaging with the case-side fixing structure 220 of the case 61 is described with reference to FIGS. 20A and 20B. FIGS. 20A and 20B both illustrate the case-side fixing structure 220 when viewed from the −Z direction. In FIGS. 20A and 20B, positions P1 to P6 of the protrusion 54*p* at different timings are indicated by broken lines in order to illustrate the movement trajectory of the protrusion 54*p* of the apparatus-side fixing structure 54 in the groove portion 215.

First, the configuration of the case-side fixing structure 220 is described with reference to FIG. 20A. The case-side fixing structure 220 includes a central protrusion 221 which protrudes in the +Z direction at the center of an area deep on the −Y direction side of the internal space 211 of the protrusion 210. When viewed from the Z directions, an outer peripheral wall surface of the central protrusion 221 forms a substantially triangular outer peripheral outline. The inside of the central protrusion 221 has been hollowed out.

The outer peripheral wall surface of the central protrusion 221 includes a first wall surface 222, a second wall surface 223 and a third wall surface 224. The first wall surface 222 extends in an oblique direction between the X directions and the Y directions. At least one part of the first wall surface 222 overlaps with the internal space 211 in the Y directions. The second wall surface 223 extends in the X directions and intersects with the first wall surface 222. The third wall surface 224 extends in the Y directions and intersects with the first wall surface 222 and the second wall surface 223. The third wall surface 224 overlaps with the internal space 211 of the protrusion 210 in the Y directions.

The central protrusion 221 includes a first protruding wall portion 225 and a second protruding wall portion 226. The first protruding wall portion 225 slightly extends from the second wall portion 223 toward the −Y direction side along a direction in which the first wall portion 222 extends at an end portion of the second wall portion 223. The second protruding wall portion 226 is a wall portion that functions as an engaged member. Herein, the second protruding wall portion 226 is also referred to as "engaged portion 226". The second protruding wall portion 226 slightly extends from the second wall surface 223 toward the −Y direction side along the direction in which the third wall surface 224 extends at an end portion on the +X direction side of the second wall surface 223.

The case-side fixing structure 220 further includes a third protruding wall portion 227. The third protruding wall portion 227 is formed as part of the rib 216. The third protruding wall portion 227 protrudes from the rib 216 toward the second wall surface 223 at a position opposing the Y directions on the second wall surface 223 of the central protrusion 221.

For the sake of convenience, the groove portion 215 is divided into a first groove portion 215*a*, a second groove portion 215*b*, a third groove portion 215*c* and a fourth groove portion 215*d*. The first groove portion 215*a* is a portion which is formed by the internal space 211 and extends in the Y directions. The second groove portion 215*b* is a portion that faces the first wall surface 222 and extends in an oblique direction between the X directions and the Y directions. The third groove portion 215*c* is a portion which includes a portion that faces the second wall portion 223 and is formed so as to wind in a substantially zig-zag shape in the X directions due to three protruding wall portions 225 to 227. The fourth groove portion 215*d* is a portion that faces the third wall surface 224 and extends in the +Y direction toward the first groove portion 215*a*.

A first bottom surface 228*a* as a bottom surface of the first groove portion 215*a* constitutes an inclined surface which gradually rises in the +Z direction toward the −Y direction. A second bottom surface 228*b*, which is the bottom surface of a portion connected to the first groove portion 215*a* of the second groove portion 215*b*, constitutes a substantially horizontal surface. A third bottom surface 228*c* located at the center of the second groove portion 215*b* constitutes an inclined surface which is depressed in the −Z direction from the second bottom surface 228*b*. A fourth bottom surface 228*d* which includes the bottom surface of the second groove portion 215*b* at an end portion on the −Y direction side and a bottom surface of the third groove portion 215*c* constitutes a substantially horizontal surface. A fifth bottom surface 228*e*, which is the bottom surface of the fourth groove portion 215*d*, constitutes an inclined surface which gradually rises to the +Y direction side in the +Z direction from the fourth bottom surface 228*d*. A sixth bottom surface 228*f*, which is a bottom surface between the first bottom surface 228*a* and the fifth bottom surface 228*e*, constitutes a substantially horizontal surface.

The mechanism in place until engagement between the second protruding wall portion 226, that is, the engaged portion 226, of the case-side fixing structure 220 and the engaging portion formed by the protrusion 54*p* of the apparatus-side fixing structure 54 is complete is described with reference to FIG. 20A. At the time the tip portion 54*t* of the apparatus-side fixing structure 54 is inserted into the first groove portion 215*a* in the −Y direction, an end surface on the +X direction side of the tip portion 54*t* makes contact with a side wall surface 229 on the +X direction side of the first groove portion 215*a* and the protrusion 54*p* of the apparatus-side fixing structure 54 is positioned at the position P1 far from the side wall portion 229. At this time, an end surface of the tip portion 54*t* of the apparatus-side fixing structure 54 is pushed in the −X direction by the side wall surface 229, and hence rotates further toward the −X direction side than when not receive external force toward the horizontal direction. The protrusion 54*p* of the apparatus-side fixing structure 54 makes contact with the first bottom surface 228*a* which is an inclined surface and is pushed toward the +Z direction by the first bottom surface 228*a* while moving from the position P1 to the +Y direction.

When the liquid container 100 is further pushed in the +Y direction, the protrusion 54*p* of the apparatus-side fixing structure 54 is pushed in the +Z direction to the first base surface 228*a* and the tip portion 54*t* of the apparatus-side fixing structure 54 is located further on the +Z direction than the end surface on the +Z direction of the rib 216 to separate from the rib 216. Then, the protrusion 54*p* of the apparatus-side fixing structure 54 makes contact with the first wall surface 222 and rises up to the position P2 on the horizontal second bottom surface 228*b*.

While the protrusion 54*p* of the apparatus-side fixing structure 54 is pushed to the −X direction side by the first wall surface 222, the protrusion 54*p* moves to the −Y direction side along the first wall surface 222 and travels below the third bottom surface 228*c* to reach the horizontal third bottom surface 228*c* and reach the position P3 which makes contact with the first protruding wall portion 225. Then, when the protrusion 54*p* of the apparatus-side fixing structure 54 moves further to the −Y direction side to release the state of connection with the first protruding wall portion 225, the protrusion 54*p* spontaneously moves to the +X direction due to biasing force applied to the apparatus-side fixing structure 54 toward the +X direction side and collides with the third protruding wall portion 227 at the position P4. This collision produces a clicking sound.

The user uses this clicking sound as an indication to release the force applied in the +Y direction to the liquid container 100 and the case 61. When this force is released, the liquid container 100 and the case 61 slightly move in the +Y direction due to biasing force toward the +Y direction due to the proximal member 57 illustrated in FIG. 19. Due to this, the protrusion 54*p* of the apparatus-side fixing structure 54 moves in the +Y direction along the third protruding wall portion 227 and the state of connection between the protrusion 54*p* and the third protruding wall portion 227 is released. Then, the protrusion 54*p* spontaneously moves to the +X direction side due to biasing force applied to the apparatus-side fixing structure 54 toward the +X direction side and collides with the second wall surface 223 and the second protruding wall portion 226 at the position P5 to be received by the second wall surface 223 and the second protruding wall portion 226.

As described above, at the position P5, the protrusion 54*p* of the apparatus-side fixing structure 54 is locked into the second protruding wall portion 226 of the case-side fixing structure 220 and the second protruding wall portion 226 of the case-side fixing structure 220 and the protrusion 54*p* of the apparatus-side fixing structure 54 engage with each other. Herein, the second protruding wall portion 226 is also referred to as "locking portion 226" in addition to "engaged portion 226". The engagement between the second protruding wall portion 226 of the case-side fixing structure 220 and the protrusion 54*p* of the apparatus-side fixing structure 54 causes the case 61 to enter a state in which movement of the case 61 toward the −Y direction is restricted, and the case 61 enters the case storage state in which the case 61 is mounted to the case storage portion 60. In this state, the protrusion 54*p* of the apparatus-side fixing structure 54 makes contact with the fourth bottom surface 228*d*. As described first, the apparatus-side fixing structure 54 is biased in the −Z direction by an elastic member, which is not shown in figures, disposed inside the connection receiver 50 and elastically rotates in the +Z direction when receive external force in the +Z direction. This biasing force toward the +Z direction is transmitted to the fourth bottom surface 228*d* illustrated in FIG. 20A via the protrusion 54*p*. In other words, in the case storage state in which the case 61 is mounted to the case storage portion 60, the protrusion 54*p* applies force to the case 61 in the −Z direction.

Here, in the case storage state in which the engaged portion 226 of the case-side fixing structure 220 and the engagement portion 54*p* of the apparatus-side fixing structure 54 are engaged with each other, the container-side electrical connector 140 is electrically connected to the apparatus-side electrical connection unit 52 and the container-side electrical connector 140 receive at least +Z direction force from the apparatus-side electrical connection unit 52. According to the liquid container 100 of this embodiment, as described above, the recess 160 and the container-side electrical connector 140 have a positional relationship in which the recess 160 and the container-side electrical connector 140 at least partly overlap when viewed in the Z directions. The protrusion 210 of the case 61 is housed in the recess 160. The internal space 211 of the protrusion 210 at least partly forms the case-side fixing structure 220. At least part of the +Z direction force applied to the container-side electrical connector 140 from the apparatus-side electrical connection unit 52 is cancelled out by the force applied to the case 61 from the protrusion 54*p* in the −Z direction. Therefore, a reduction in the Z directions component of the force applied to the liquid container 100 on the +Y direction side can be suppressed and the arrangement orientation of the liquid container 100 in the Z directions can be prevented from deviating from the envisioned appropriate orientation. Therefore, the arrangement orientation of the liquid container 100 with respect to the connection receiver 50 can be prevented from worsening and the state of connection therebetween can be improved. In addition, unnecessary stress is prevented from being generated at the connection portion between the connection receiver 50 and the liquid container 100 due to the arrangement posture of the liquid container 100 worsening, and hence damage and deterioration to the above-described components used for connection between the connection receiver 50 and the liquid container 100 is suppressed.

The mechanism in place when the state of engagement between the case-side fixing structure 220 and the apparatus-side fixing structure 54 is released is described with reference to FIG. 20B. In the liquid ejection apparatus 10 according to this embodiment, as described below, when the case-side fixing structure 220 and the apparatus-side fixing structure 54 are in the above-mentioned engagement state, the liquid ejection apparatus 10 is configured such that the case 61 is further pushed to the +Y direction and the engagement state is released. When the user pushes the case 61 to the +Y direction, the protrusion 54*p* of the apparatus-side fixing structure 54 moves from the position P5 in the +Y direction and releases from the state of being engaged with the second protruding wall portion 226 in the +X direction. Because of this, the protrusion 54*p* spontaneously moves to the +X direction side due to biasing force applied to the apparatus-side fixing structure 54 toward the +X direction side by a biasing member and collides with the side wall surface 229 on the +X direction side of the rib 216 at the position P6.

As a result, because the protrusion 54*p* moves to the fourth groove portion 215*d*, movement toward the +Y direction is allowed. In other words, the state of engagement between the case-side fixing structure 220 and the apparatus-side fixing structure 54 is released. Due to the clicking sound generated when the protrusion 54*p* collides with the above-mentioned rib 216, the user knows that the state of engagement between the case-side fixing structure 220 and the apparatus-side fixing structure 54 has been released. When movement of the protrusion 54*p* toward the +Y direction is allowed, the liquid container 100 and the case 61 automatically move in the −Y direction due to the force applied in the +Y direction by the proximal member 57 illustrated in FIG. 19. After the proximal member 57 separates from the connection receiver 50, the user pulls out the case 61, and the liquid container 100 can be removed. As evident from the above description, the groove portion 215 constitutes a loop-shaped guide pathway configured to guide the protrusion 54*p*. The guide pathway has a common inlet portion and outlet portion. The guide pathway is configured of the locking portion 226 configured to lock the protrusion 54*p* and provided partway down, an inlet-side guide pathway and an outlet-side guide pathway. The inlet-side guide pathway is a pathway portion from the above-mentioned inlet portion to the locking portion 226. The outlet-side guide pathway is a pathway portion from the locking portion 226 to the above-mentioned outlet portion.

Packaging of Liquid Container

Figure 21A:
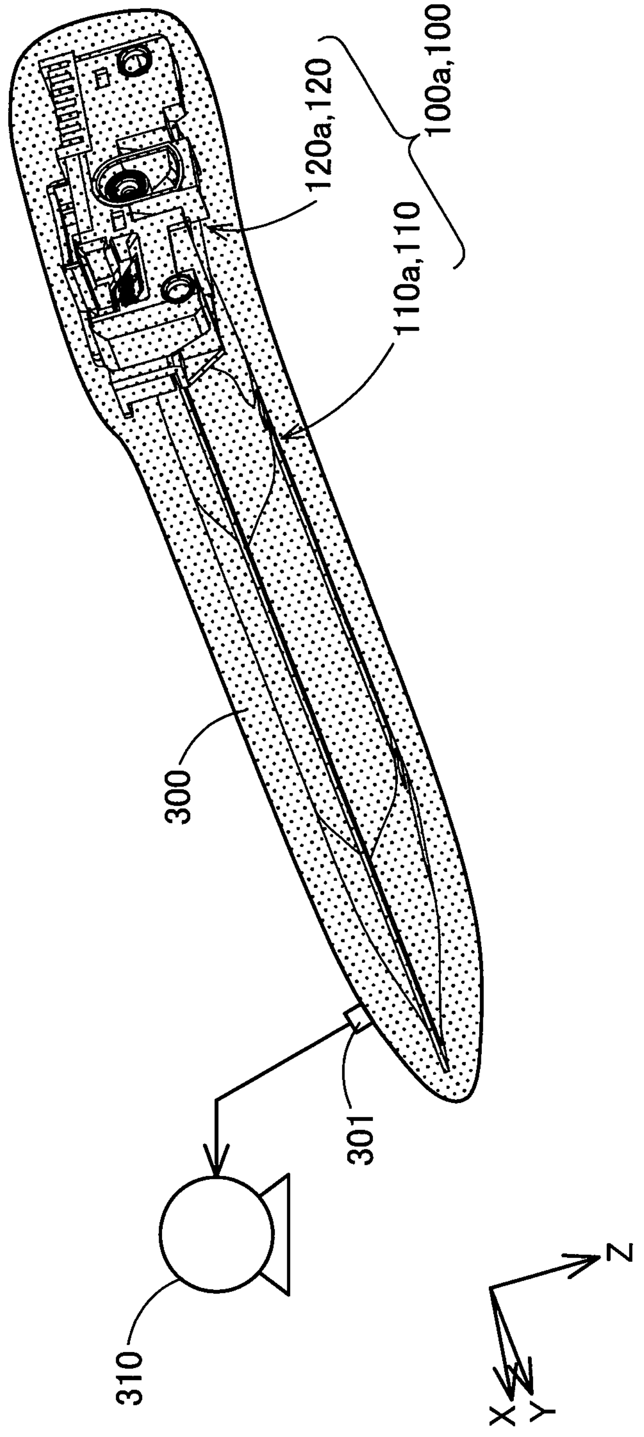
FIG. 21A is a first schematic diagram for explaining a method for packing the liquid container.
Figure 21B:
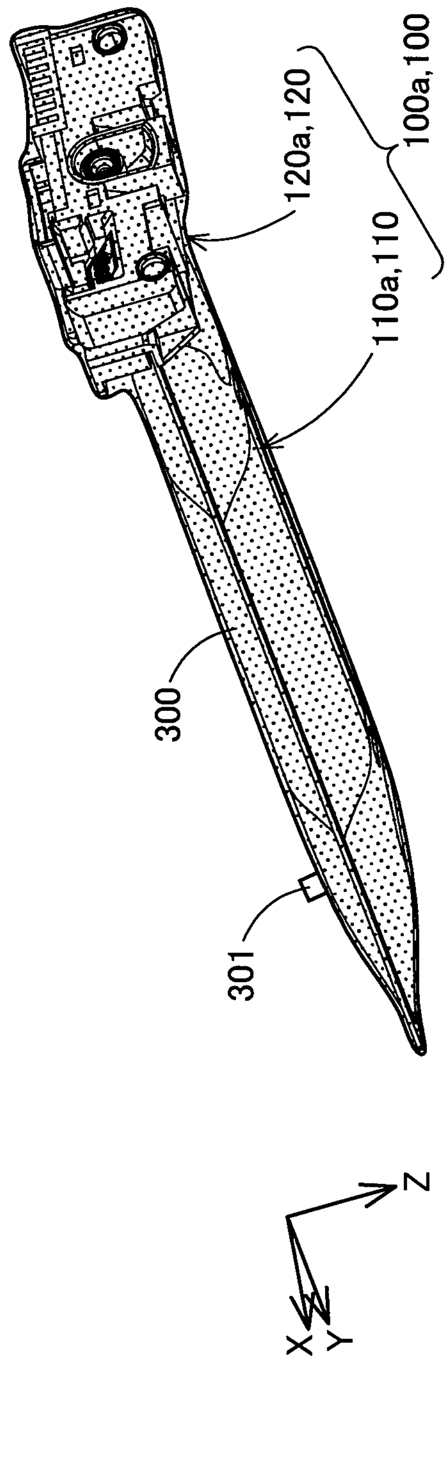
FIG. 21B is a second schematic diagram for explaining a method for packing the liquid container.

FIGS. 21A and 21B are schematic diagrams for explaining a method for packing the liquid container 100. The liquid container 100 is preferably packed in the following manner at a stage before being attached to the case 61 of the liquid ejection apparatus 10, such as at the time of shipment from a factory. In a first step, as illustrated in FIG. 21A, the entire liquid container 100 is housed in a packaging material 300 made of a flexible film material and formed into a bag shape and hermetically sealed.

The packaging material 300 is preferably made of a material with a good gas barrier property. The packaging material 300 has a gas permeability of preferably less than 1.0 [cc/($m^2$·day·atm)] and more preferably equal to or less than 0.5 [cc/($m^2$·day·atm)]. The gas permeability of the packaging material 300 is further preferably equal to or less than 0.1 [cc/($m^2$·day·atm)]. The gas permeability need only be a value measured using an isopiestic method. An isopiestic method is a method of measuring how fast a test gas can travel through a sample material from one indoor space to another indoor space when the indoor spaces are partitioned by a film made of the sample material by sealing both indoor spaces with inert gas at the same pressure and injecting the gas into one of the indoor spaces. The packaging material 300 is made of, for example, aluminum foil, silica-deposited film, or aluminum-deposited film. In terms of gas barrier properties, aluminum foil, silica-deposited film and aluminum-deposited film are preferred in the stated order.

An air intake port 301 which communicates with the internal space of the packaging material 300 is pre-formed in the packaging material 300. In a second step, a suction pump 310 is connected to the air intake port 301 and pressure in the internal space of the packaging material 300 is reduced. In this step, as illustrated in FIG. 21B, the packaging material 300 is preferably reduced in pressure until the liquid container 100 is completely covered by the packaging material 300.

When pressure in the internal space of the packaging material 300 has been reduced, air inside the storage portion 110 of the liquid container 100 can be guided to outside the storage portion 110 and durability of the liquid stored in the storage portion 110 can be increased. In addition, because the storage portion 110 is closely wrapped by the packaging material 300, deformation of the storage portion 110 which has flexibility is suppressed. Therefore, stability of the liquid in the storage portion 110 can be prevented from degrading due to, for example, swaying due to deformation of the storage portion 110 in the liquid in the storage portion 110. In addition, handling of the liquid container 100 can be improved because deformation of the storage portion 110 is suppressed.

Note that, in place of the pressure reduction step using the suction pump 310 in the second step, in the first step, the liquid container 100 may be wrapped with the packaging material 300 so as to tightly enclose the liquid container 100. This method can also simply suppress deformation of the storage portion 110 by using the packaging material 300 and improve protection of the liquid and handling of the liquid container 100.

Conclusion of First Embodiment

As described above, according to the liquid container 100 of this embodiment, the Z directions force applied to the container-side electrical connector 140 from the apparatus-side electrical connection unit 52 is at least partly reduced by the force applied to the case 61 from the protrusion 54*p*, that is, the engaged portion 54*p* of the apparatus-side fixing structure 54 when the case 61 is mounted to the liquid ejection apparatus 10. Therefore, the arrangement orientation of the liquid container 100 is prevented from deviating in the Z directions from the appropriate orientation. In addition, because the width of the liquid container 100 in the Z directions is smaller than the width of the liquid container 100 in the X directions and the Y directions, the arrangement orientation of the liquid container 100 on the case 61 is stabilized. As a result, the state of connection between the liquid ejection apparatus 10 and the liquid container 100 is improved. Additionally, the various actions and effects described in the embodiment above are achieved. These actions and effects can also be achieved with the liquid ejection system 11 in which the liquid container 100 is mounted to the liquid ejection apparatus 10.

B. SECOND EMBODIMENT

Figure 22:
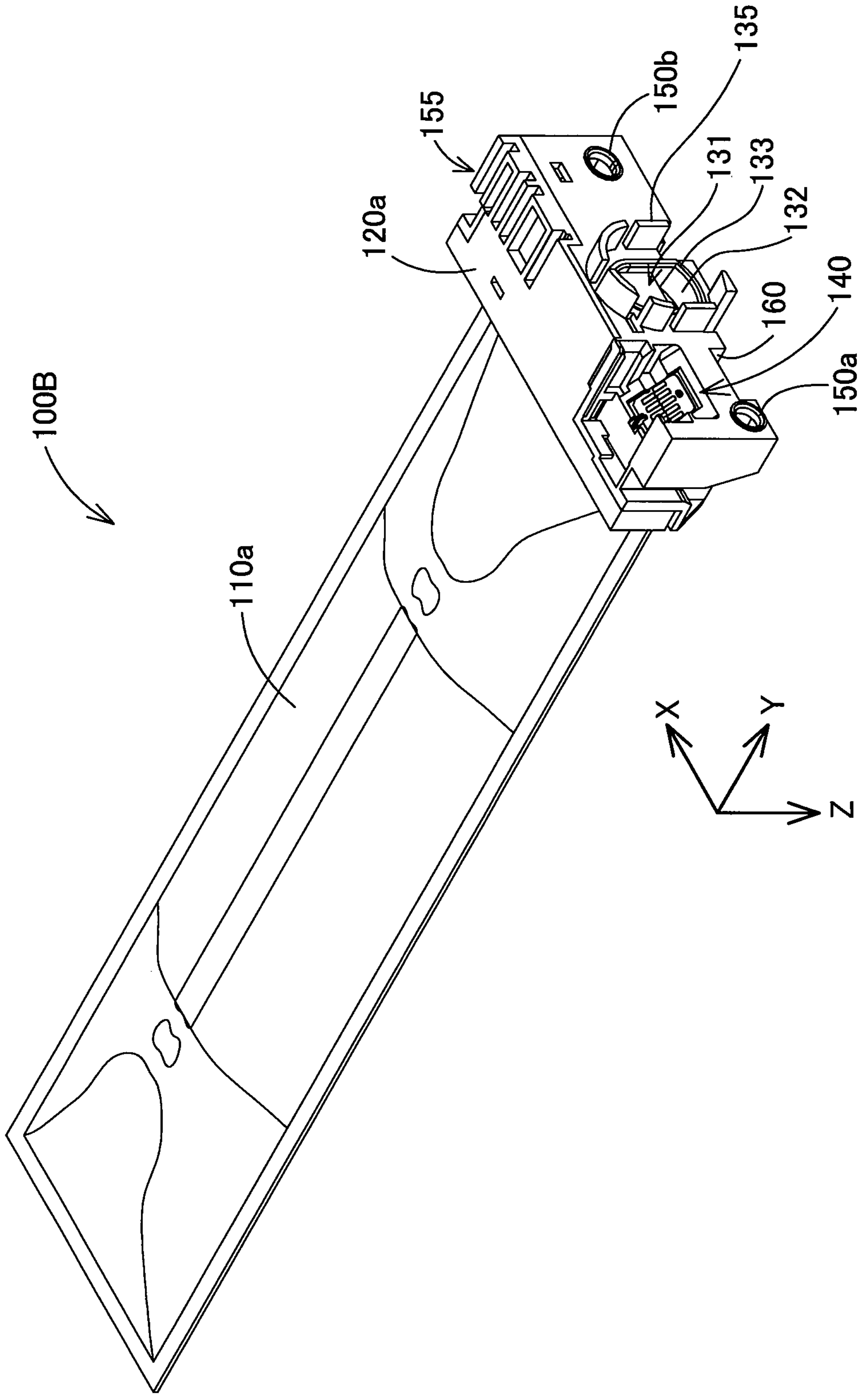
FIG. 22 is a schematic perspective view for illustrating the configuration of liquid container according to a second embodiment.

FIG. 22 is a schematic perspective view for illustrating the configuration of a liquid container 100B according to a second embodiment. The liquid container 100B according to the second embodiment has substantially the same configuration as the first liquid container 100*a* according to the first embodiment apart from the aspects described below. Similar to the first liquid container 100*a* according to the first embodiment, the liquid container 100B according to the second embodiment is housed in the case storage portion 60 of the liquid ejection apparatus 10 and connected to the first connection receiver 50*a* while disposed in the first case 61*a*.

In the liquid container 100B according to the second embodiment, a plurality of protective wall portions 135 are provided around the peripheral rib 133 which surrounds the liquid outlet 131. The plurality of protective wall portions 135 is arranged in a row along the peripheral edge 132 above and laterally to the liquid outlet 131. The plurality of protective wall portions 135 protrude furthest toward the +Y direction in the liquid container 100. With the liquid container 100B according to the second embodiment, the plurality of protective wall portions 135 increase protection of the liquid outlet 131.

In the liquid container 100B according to the second embodiment, the peripheral rib 133 and the peripheral edge 132 which is recessed in the +Y direction may be omitted. In addition, the liquid outlet 131 may be provided so as to protrude toward the +Y direction provided that the liquid outlet 131 does not protrude toward the +Y direction more than the plurality of protective wall portions 135. Each of the plurality of protective wall portions 135 may have different lengths in the −Y direction. The plurality of protective wall portions 135 may also be applied to the second liquid container 100*b* described in the first embodiment. Note that the liquid container 100B according to the second embodiment, or the liquid ejection system 11 in which the liquid container 100B according to the second embodiment is mounted to the liquid ejection apparatus 10 can achieve the various actions and effects described in the first embodiment.

C. THIRD EMBODIMENT

Figure 23:
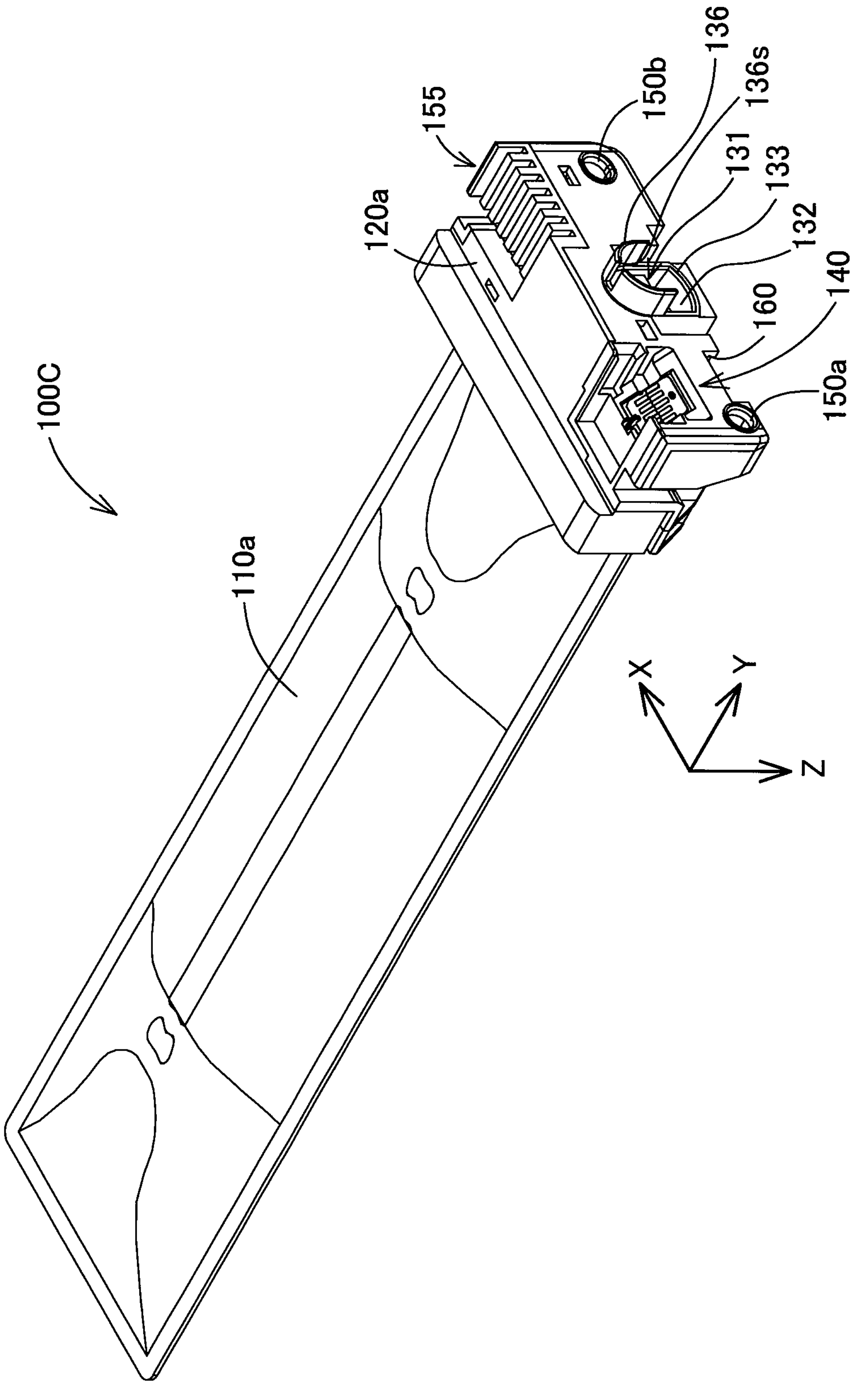
FIG. 23 is a schematic perspective view for illustrating the configuration of liquid container according to a third embodiment.

FIG. 23 is a schematic perspective view for illustrating the configuration of a liquid container 100C according to a third embodiment. The liquid container 100C according to the third embodiment has substantially the same configuration as the first liquid container 100*a* according to the first embodiment apart from the aspects described below. Similar to the first liquid container 100*a* according to the first embodiment, the liquid container 100C according to the third embodiment is housed in the case storage portion 60 of the liquid ejection apparatus 10 and connected to the first connection receiver 50*a* while disposed in the first case 61*a*.

The liquid container 1000 according to the third embodiment is provided with a protective wall portion 136 which protrudes toward the +Y direction only on an upper region of the liquid outlet 131. The protective wall portion 136 protrudes furthest toward the +Y direction in the liquid container 100. A slit 136*s* which extends in the Y directions is formed at the center of the protective wall portion 136 in the X directions. The slit 136*s* may be omitted. The liquid container 1000 according to the third embodiment can also increase protection of the liquid outlet 131 because the protective wall portion 136 is provided.

In the liquid container 1000 according to the third embodiment, the peripheral rib 133 and the peripheral edge 132 which is recessed in the −Y direction may be omitted. In addition, the liquid outlet 131 may be provided so as to protrude toward the +Y direction provided that the liquid outlet 131 does not protrude toward the +Y direction more than the protective wall portion 136. The protective wall portion 136 may also be applied to the second liquid container 100*b* described in the first embodiment. Note that the liquid container 100C according to the third embodiment, or the liquid ejection system 11 in which the liquid container 1000 according to the third embodiment is mounted to the liquid ejection apparatus 10 achieve the various actions and effects described in the first embodiment.

D. FOURTH EMBODIMENT

Figure 24:
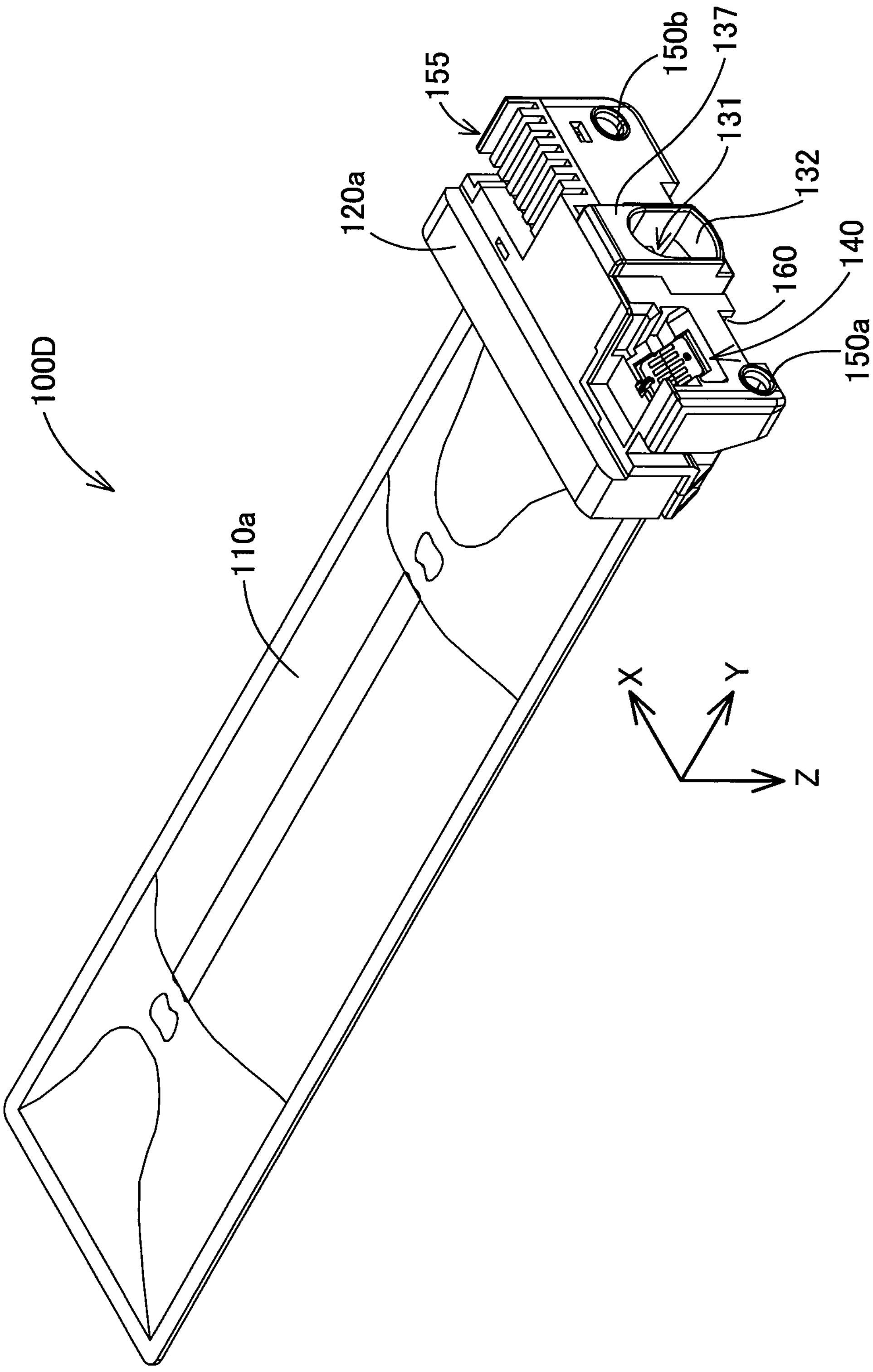
FIG. 24 is a schematic perspective view for illustrating the configuration of liquid container according to a fourth embodiment.

FIG. 24 is a schematic perspective view for illustrating the configuration of a liquid container 100D according to a fourth embodiment. The liquid container 100D according to the fourth embodiment has substantially the same configuration as the first liquid container 100*a* according to the first embodiment apart from the aspects described below. Similar to the first liquid container 100*a* according to the first embodiment, the liquid container 100D according to the fourth embodiment is housed in the case storage portion 60 of the liquid ejection apparatus 10 and connected to the first connection receiver 50*a* while disposed in the first case 61*a*.

In the liquid container 100D according to the fourth embodiment, the peripheral rib 133 is omitted and the entire periphery of the peripheral portion 132 protrudes in the +Y direction, to thereby form a peripheral edge protrusion 137 which surrounds the liquid outlet 131. The peripheral edge protrusion 137 protrudes furthest toward the +Y direction in the liquid container 100. According to the liquid container 100D of the fourth embodiment, the peripheral edge protrusion 137 increases protection of the liquid outlet 131. An incision may be made partway down the peripheral edge protrusion 137. The peripheral rib 133 described in the first embodiment may be provided on a surface of the peripheral edge protrusion 137 on the +Y direction side.

In the liquid container 100D according to the fourth embodiment, the liquid outlet 131 may be provided so as to protrude toward the +Y direction provided that the liquid outlet 131 does not protrude toward the +Y direction more than the peripheral edge protrusion 137. The peripheral edge protrusion 137 may also be applied to the second liquid container 100*b* described in the first embodiment. Note that the liquid container 100D according to the fourth embodiment, or the liquid ejection system 11 in which the liquid container 100D according to the fourth embodiment is mounted to the liquid ejection apparatus 10 can achieve the various actions and effects described in the first embodiment.

E. FIFTH EMBODIMENT

Figure 25:
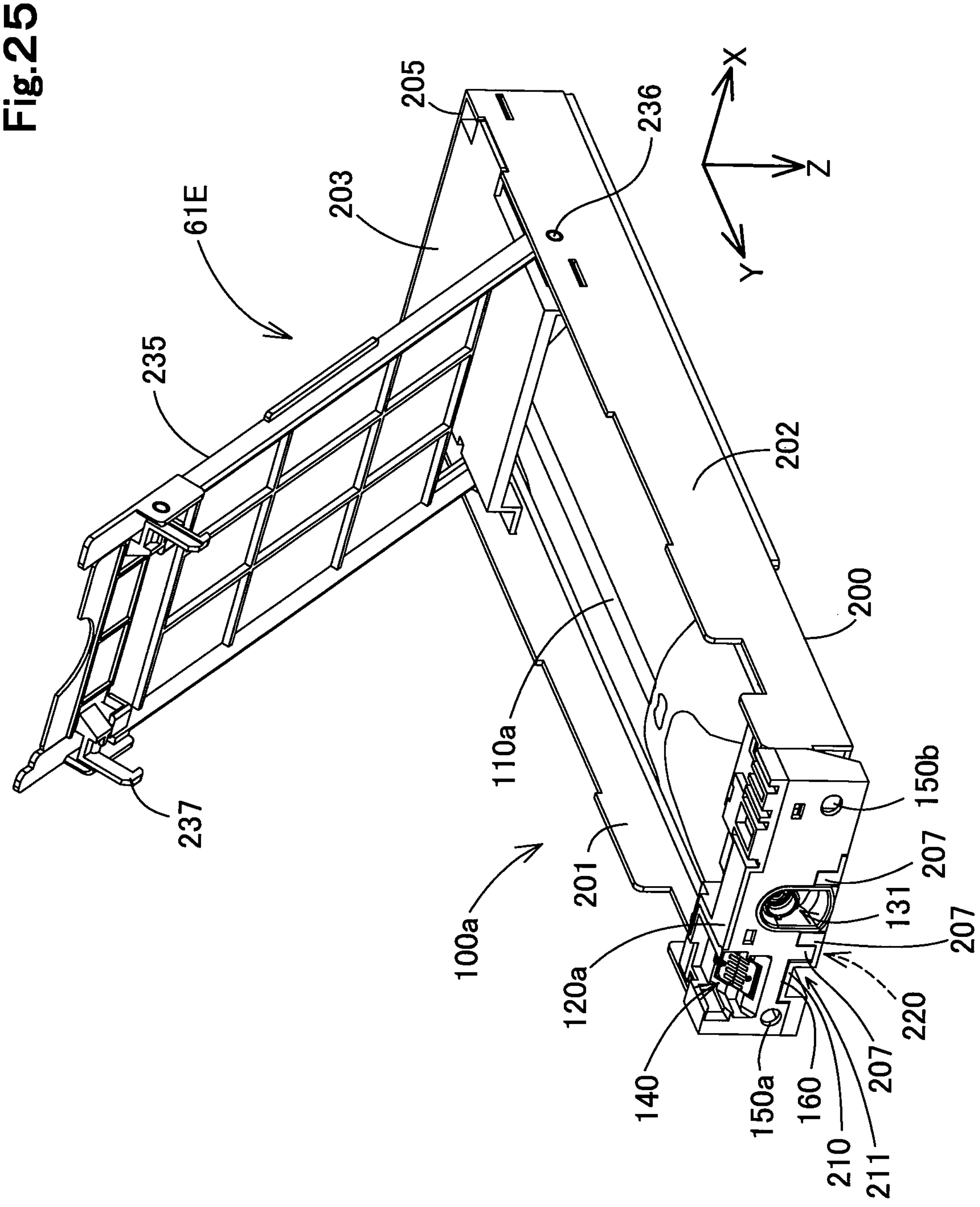
FIG. 25 is a schematic perspective view for illustrating the configuration of liquid container according to a fifth embodiment.

FIG. 25 is a schematic perspective view for illustrating a case 61E according to a fifth embodiment. FIG. 25 illustrates a case in which the first liquid container 100*a* described in the first embodiment is disposed in the case 61E according to the fifth embodiment and an open/close lid 235 is open. The case 61E according to the fifth embodiment has substantially the same configuration as the first liquid container 100*a* according to the first embodiment except that the open/close lid 235 has been added.

The open/close lid 235 rotates above the liquid container 100 about a hinge portion 236 provided on an end portion on the −Y direction. When the open/close lid 235 is closed, almost all of the upper portion of the storage portion 110*a* of the first liquid container 100*a* disposed in the case 61E is covered by the open/close lid 235 and the lid member 203. With this configuration, protection of the first liquid container 100*a* is increased.

Hooks 237 which can engage with the first side wall portion 201 and the second side wall portion 202 are provided on outer peripheral ends of the open/close lid 235. Note that the lid member 203 may be omitted and only the open/close lid 235 may cover the top portion of the storage portion 110*a*. In addition, the hinge portion 236 and the hooks 237 of the open/close lid 235 may be omitted. The open/close lid 235 may also be applied to the second liquid container 100*b* described in the first embodiment. Note that the case 61E according to the fifth embodiment can achieve the various actions and effects described in the first embodiment.

F. SIXTH EMBODIMENT

Figure 26:
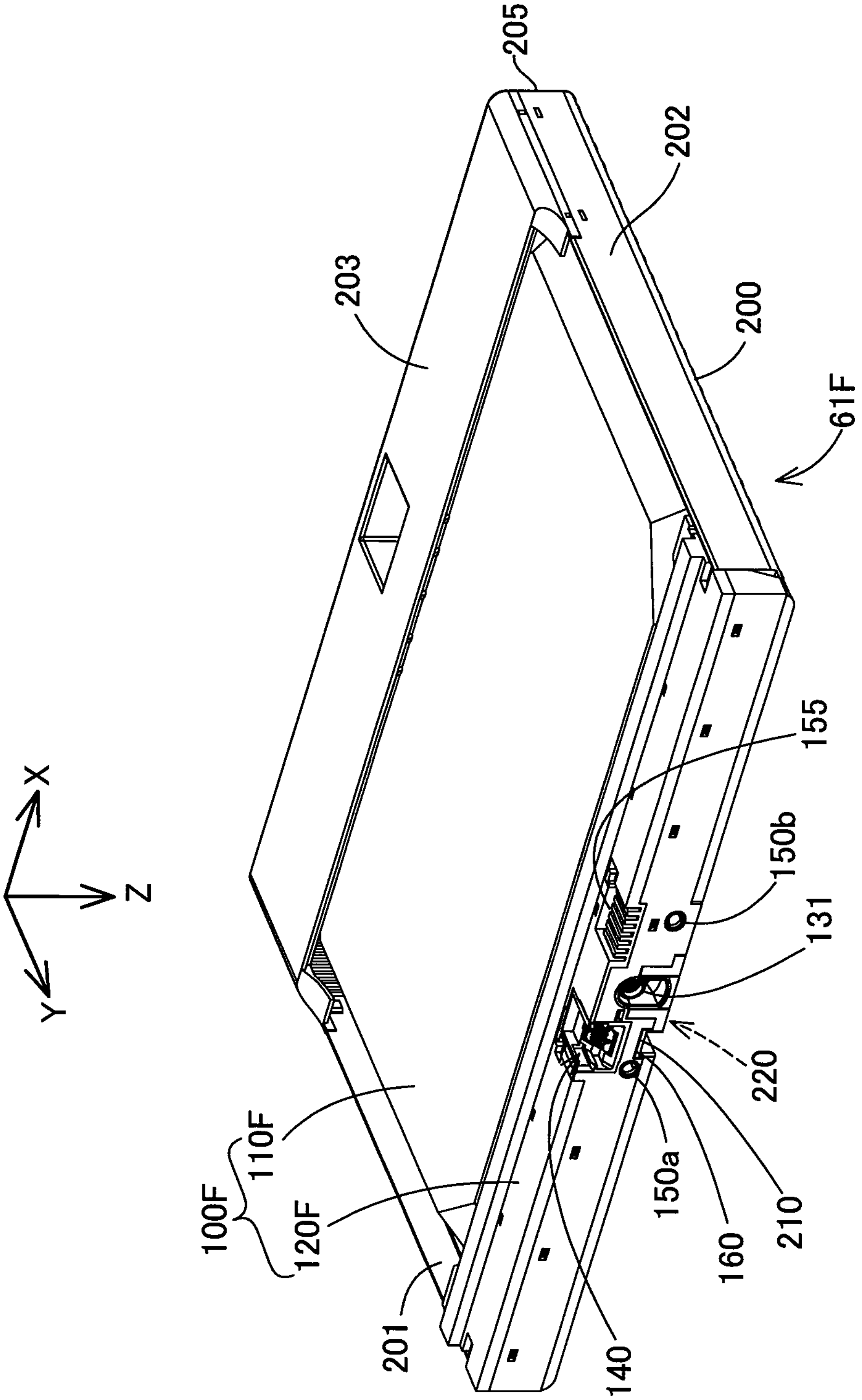
FIG. 26 is a first schematic diagram for illustrating a liquid container and a case according to a sixth embodiment.
Figure 27:
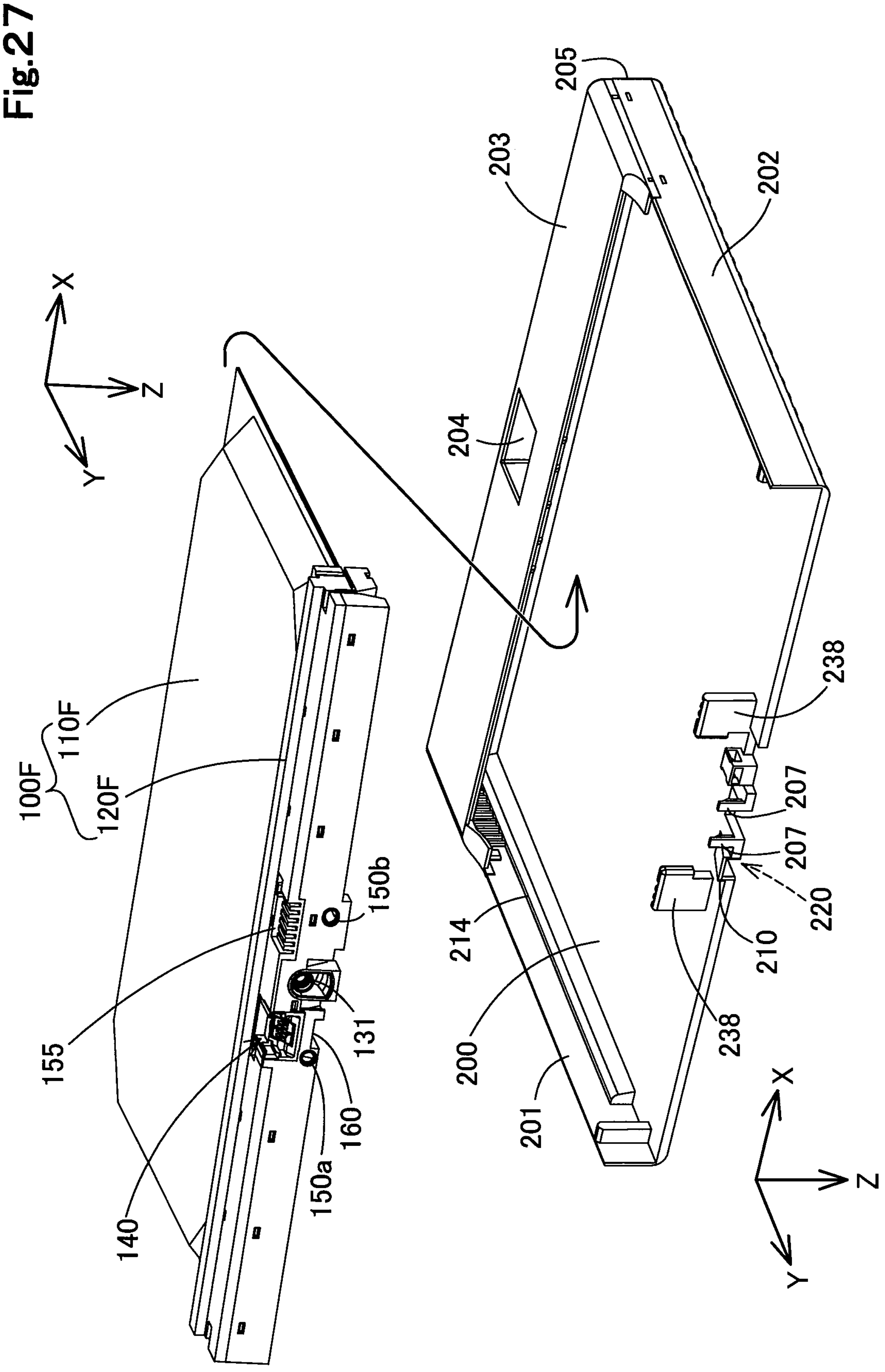
FIG. 27 is a second schematic diagram for illustrating the liquid container and the case according to the sixth embodiment.

The configurations of a liquid container 100F and a case 61F according to a sixth embodiment are described with reference to FIGS. 26 to 28. FIG. 26 is a schematic diagram for illustrating the liquid container 100F when disposed in the case 61F. FIG. 27 is a schematic diagram for illustrating the liquid container 100F when removed from the case 61F.

Figure 28:
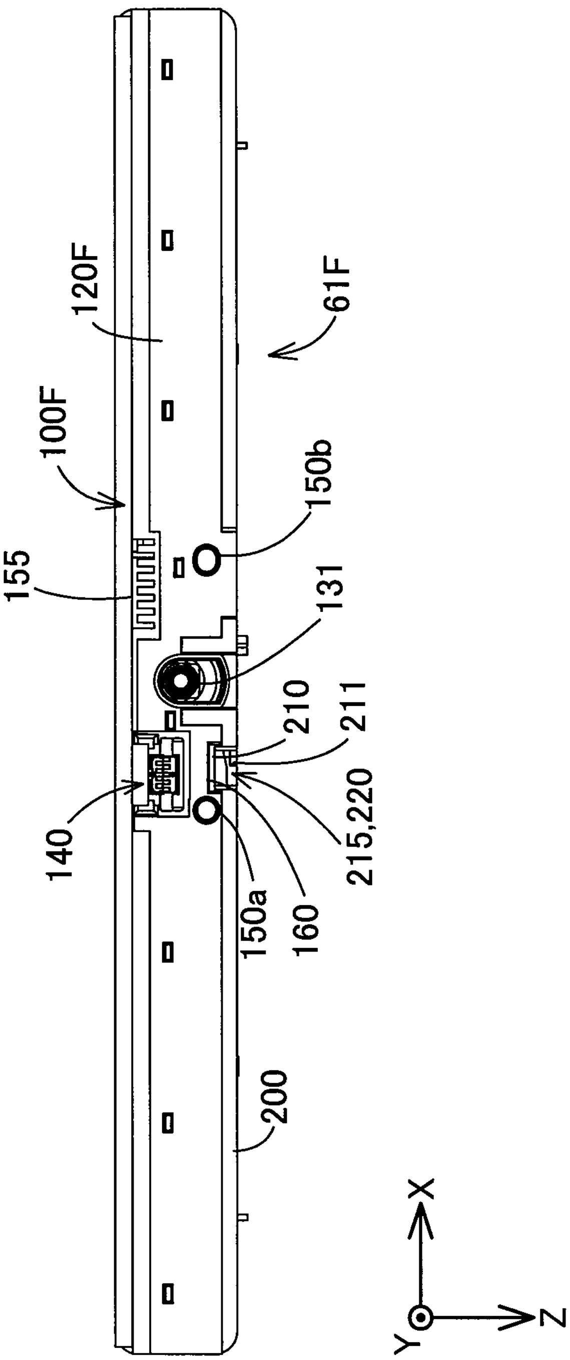
FIG. 28 is a third schematic diagram for illustrating the liquid container and the case according to the sixth embodiment.

FIG. 28 is a schematic diagram for illustrating the liquid container 100F disposed in the case 61F when viewed from the −Y direction. The liquid container 100F and the case 61F according to the sixth embodiment both have substantially the same configurations as the liquid container 100 and the case 61 according to the first embodiment apart from the aspects described below.

A liquid ejection apparatus to which the liquid container 100F according to the sixth embodiment is mounted has substantially the same configurations as the liquid ejection apparatus 10 described in the first embodiment except that the liquid ejection apparatus is an inkjet printer which performs monochromatic printing. In the liquid ejection apparatus according to the sixth embodiment, almost all of the case storage portion 60 in the X directions is occupied by the one liquid container 100F. One connection receiver 50 is disposed at substantially the center of the liquid ejection apparatus in the X directions in a region on the +Y direction side of the case storage portion 60.

The storage portion 110F of the liquid container 100F according to the sixth embodiment has a width which is further extended in the X directions than the liquid container 100 according to the first embodiment and a wider width in the Y directions than the liquid container 100. Both end portions of the connection member 120F of the liquid container 100F in the X directions extend in the +X direction or the −X direction according to the width of the storage portion 110F in the X directions. The connection member 120F is configured to connect to the connection receiver 50 with the same configuration as that described in the first embodiment. Because of this, the connection member 120F has almost the same configuration as the connection member 120 according to the first embodiment in terms of the arrangement layout of the liquid outlet 131, the container-side electrical connector 140, the first receiver 150*a*, the second receiver 150*b* and the fitting structure receiver 155, which are components used to connect to the connection receiver 50.

In the case 61F according to the sixth embodiment, the width of the bottom wall portion 200 in the X directions is expanded, and the distance between the first side wall portion 201 and the second side wall portion 202 and the width of the lid member 203 in the X directions are expanded so that the case 61F is compatible with the liquid container 100F. In addition, a pair of fitting wall portions 238 which protrude toward the −Z direction are provided on ends of an upper surface of the bottom wall portion 200 of the case 61F according to the sixth embodiment on the +Y direction side. The pair of fitting wall portions 238 is provided at positions that sandwich the protrusions 210 and the pair of fitting protrusions 207 in the X directions. Each of the fitting wall portions 238 is formed at an orientation such that a wall surface thereof substantially intersects with the Y directions. When the liquid container 100F is disposed in the case 61F, each of the fitting wall portions 238 is inserted and fitted into a fitting groove (not shown) formed in the fourth surface portion 124 of the connection member 120. With this configuration, stability of the arrangement orientation of the liquid container 100F in the case 61F is improved.

According to the liquid container 100F of the sixth embodiment, ink storage capacity can be increased. In addition, the arrangement orientation of the liquid container 100F can be made more stable. Additionally, the liquid container 100F according to the sixth embodiment, or the liquid ejection system 11 in which the liquid container 100F according to the sixth embodiment is mounted to the liquid ejection apparatus can achieve the various actions and effects described in the first embodiment. Note that the liquid ejection apparatus to which the liquid container 100F according to the sixth embodiment is mounted may has a configuration in which a plurality of the liquid containers 100F are mounted in parallel by being stacked in the Z directions.

G. SEVENTH EMBODIMENT

Figure 29:
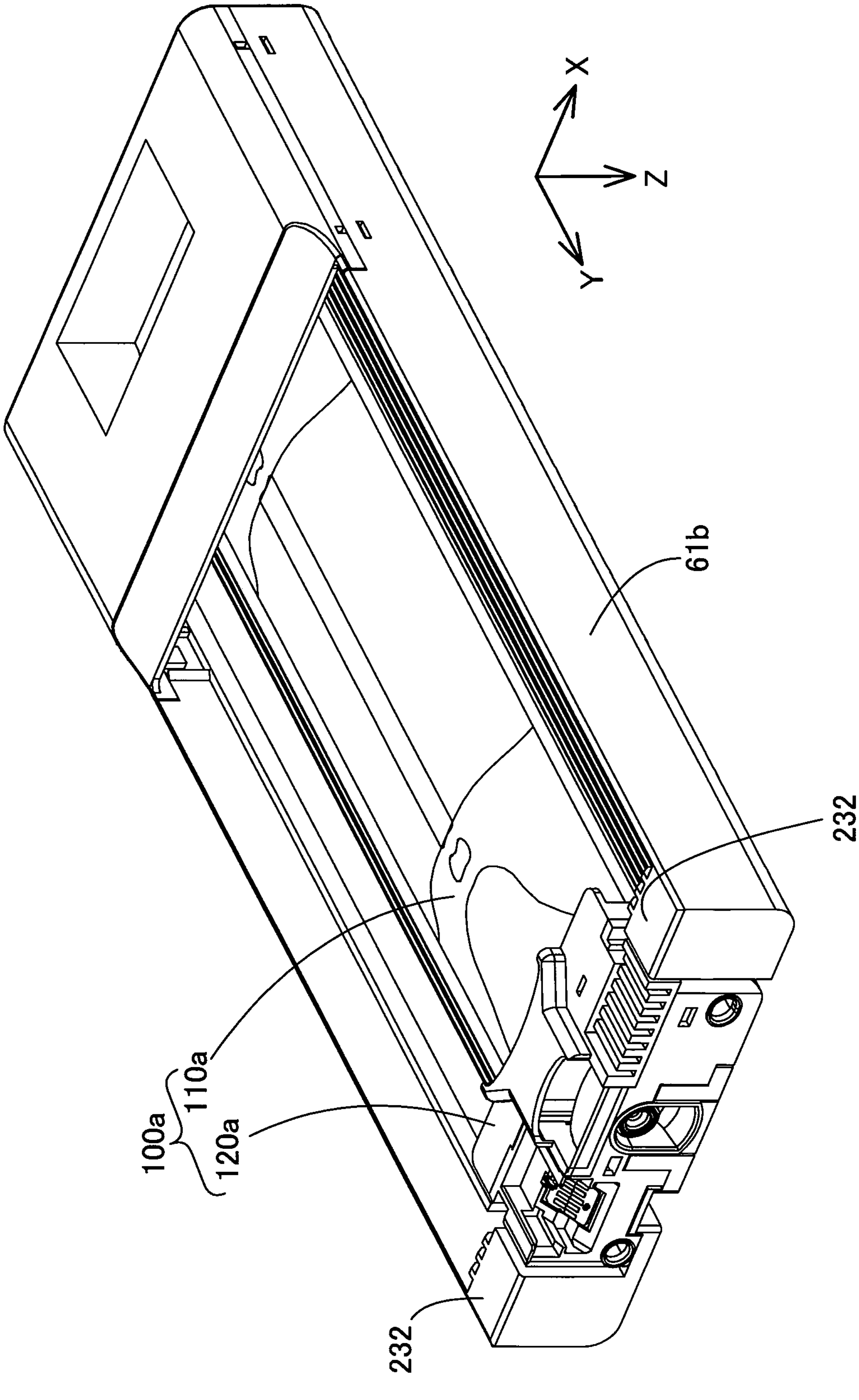
FIG. 29 is a schematic diagram for illustrating a first example of combining the liquid container and the case as a seventh embodiment.

A seventh embodiment is described with reference to FIGS. 29 to 31. In the seventh embodiment, various examples of combinations of the liquid container 100 and the case 61 are described. In the example of FIG. 29, the first liquid container 100*a* is disposed on the second case 61*b*. The connection member 120*a* of the liquid container 100*a* is supported by being sandwiched in the X directions by the additional wall portions 232 of the second case 61*b*. With this combination, the first liquid container 100*a* may be arranged in the arrangement area LA illustrated in FIG. 3 in which the second case 61*b* in the case storage portion 60 is arranged.

Figure 30:
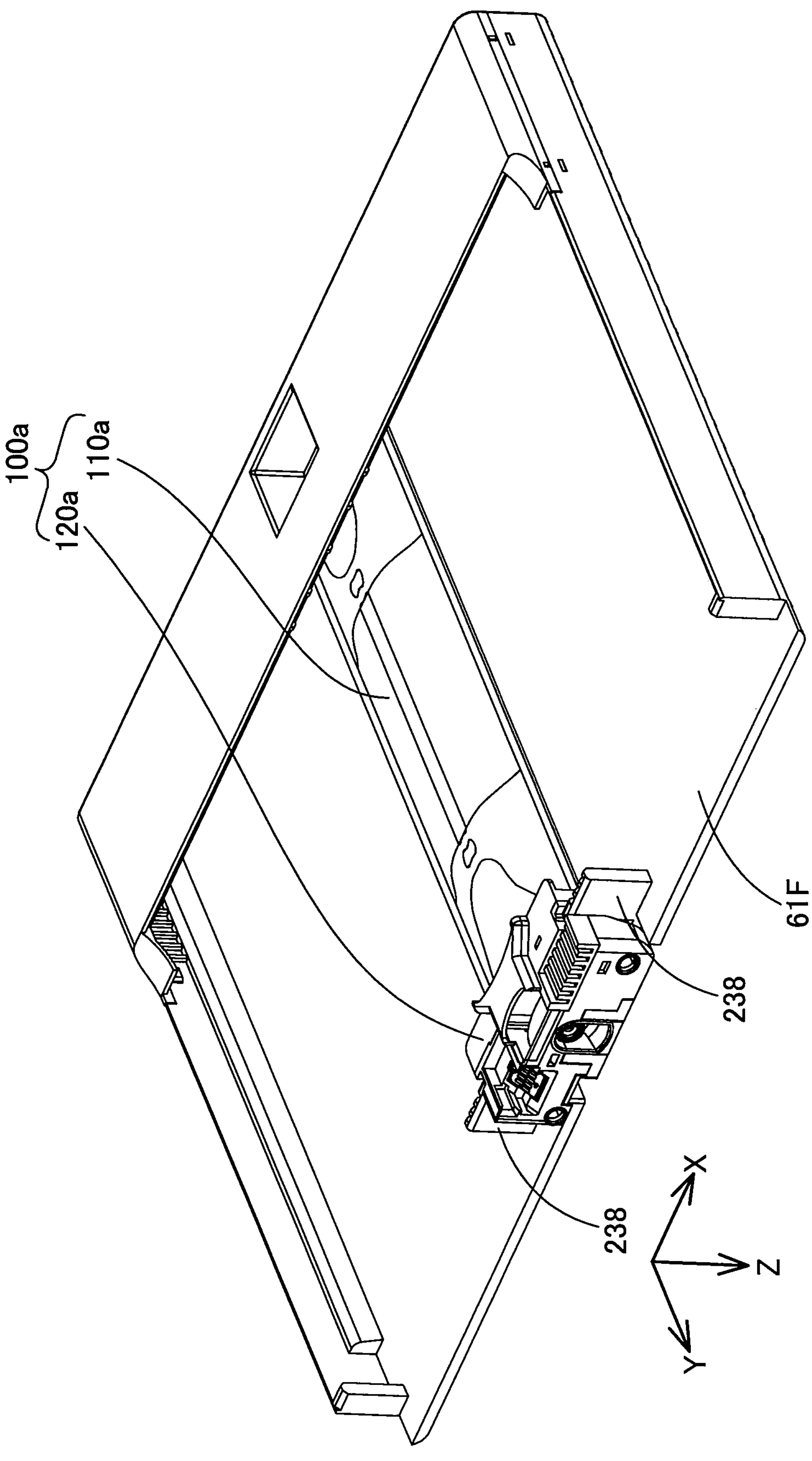
FIG. 30 is a schematic diagram for illustrating a second example of combining the liquid container and the case as the seventh embodiment.
Figure 31:
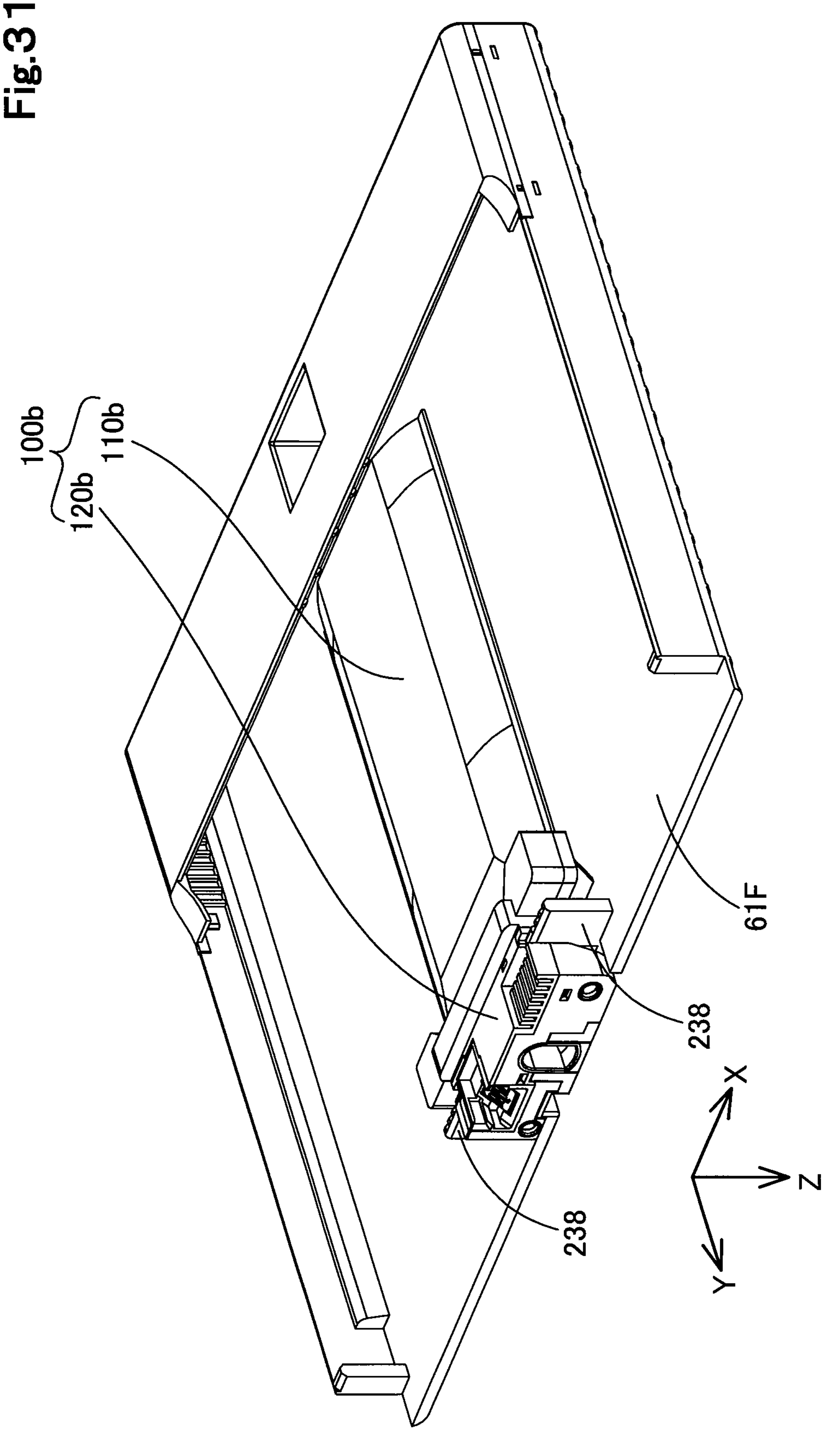
FIG. 31 is a schematic diagram for illustrating a third example of combining the liquid container and the case as the seventh embodiment.

In the example in FIG. 30, the first liquid container 100*a* is disposed on the case 61F according to the sixth embodiment. The connection member 120*a* of the first liquid container 100*a* is supported by being sandwiched in the X directions by the pair of fitting wall portions 238 of the case 61F. With this combination, the first liquid container 100*a* can be stably mounted to the liquid ejection apparatus described in the sixth embodiment. As illustrated in FIG. 31, the second liquid container 100*b* may be disposed in the case 61F according to the sixth embodiment.

G. MODIFICATION EXAMPLE OF EMBODIMENTS

Modified aspects of the configurations in the above-described embodiments are described as modification examples.

G1. Modification Example 1

In the above-described embodiments, the Y directions, which is the movement direction of the liquid container 100 and the case 61 in the case storage portion 60, coincides with the front/back direction of the liquid ejection apparatus 10. In contrast, the Y directions which is the movement direction of the liquid container 100 and the case 61 in the case storage portion 60 does not need to coincide with the front/back direction of the liquid ejection apparatus 10. The Y directions which is the movement direction of the liquid container 100 and the case 61 in the case storage portion 60 may be, for example, a transverse direction of the liquid ejection apparatus 10. In other words, the mounting port for the liquid container 100 and the case 61 may be provided on a left or right side surface of the liquid ejection apparatus 10. In addition, in the above-described embodiments, the case storage portion 60 is provided at the lowermost position in the liquid ejection apparatus 10. In contrast, the case storage portion 60 may be provided at a position having another height. The case storage portion 60 may be provided at a central portion in the Z directions.

G2. Modification Example 2

In the liquid ejection apparatus 10 according to the first embodiment, four liquid containers 100 are mounted and in the liquid ejection apparatus according to the sixth embodiment, one liquid container 100F is mounted. The number of liquid containers 100 mounted to the liquid ejection apparatus is not limited to the number(s) in the above-described embodiments. For example, the liquid ejection apparatus may be configured such that only one of the first liquid container 100*a* or the second liquid container 100*b* according to the first embodiment can be mounted, or the liquid ejection apparatus may be configured such that two or more of the liquid containers 100F according to the sixth embodiment can be housed. In addition, in the first embodiment, two types of liquid containers 100*a*, 100*b* are mounted to the liquid ejection apparatus 10. In contrast, three or more types of liquid containers having different configurations may be mounted to the liquid ejection apparatus 10.

G3. Modification Example 3

In the above-described embodiments, the case-side fixing structure 220 has a heart-cam groove structure. In contrast, the case-side fixing structure 220 may not have the heart-cam groove structure. The case-side fixing structure 220 may have a configuration in which, for example, in the engagement state, the protrusion 54*p* of the apparatus-side fixing structure 54 only includes a step portion which engages in the −Y direction. In this case, the apparatus-side fixing structure 54 is preferably configured so as to move in the X directions and release the state of engagement due to, for example, an operation by the user.

G4. Modification Example 4

In the above-described embodiments, the first receiver 150*a* and the second receiver 150*b* are both configured as holes through which corresponding positioning portions 53*a*, 53*b* are inserted. In contrast, the first receiver 150*a* and the second receiver 150*b* may not be configured as holes and, for example, may be formed as slits which extend in the Z directions. In addition, the first receiver 150*a* and the second receiver 150*b* may be configured as contact portions in which the tip of each positioning portion 53*a*, 53*b* makes contact.

G5. Modification Example 5

In the above-described embodiments, the container-side electrical connector 140 includes the base plate portion 141. In contrast, the container-side electrical connector 140 may not include the base plate portion 141. The container-side electrical connector 140 may, for example, only include an electrode portion which makes electrical contact with the apparatus-side electrical connection unit 52. In the above-described embodiments, the base plate portion 141 of the container-side electrical connector 140 is disposed so as to face an oblique direction. In contrast, the base plate portion 141 of the container-side electrical connector 140 may not be disposed so as to face an oblique direction. The base plate portion 141 need only be disposed at an angle at which the base plate portion 141 can electrically connect to the apparatus-side electrical connection unit 52 while being receive at least force facing the +Z direction from the apparatus-side electrical connection unit 52. The plate portion 141 may be, for example, disposed substantially horizontally so as to face the −Z direction.

G6. Modification Example 6

The configuration of the liquid container 100 is not limited to the configuration described in the above embodiments. For example, the storage portion 110 of the liquid container 100 may have an almost disc shape. Further, in the connection receiver 50, the liquid outlet 131 may not be positioned at the center in the X directions, and the container-side electrical connector 140 may be provided at the center in the X directions. The liquid outlet 131 may not be provided between the pair of receivers 150*a*, 150*b* in the X directions. In addition, the pair of receivers 150*a*, 150*b* may not be provided at the same height and may have different open shapes or different open sizes. The container-side electrical connector 140 may not be formed at a deep position on the −Y direction side and may be formed at a position protruded from the +Y direction side.

G7. Modification Example 7

The configuration of the case 61 in which the liquid container 100 is disposed is not limited to the configuration described in the above embodiments. The case 61 may not have a tray-shaped configuration and may, for example, be configured as a frame-shaped member formed by combining a plurality of columnar members.

G8. Modification Example 8

The connection receiver 50 to which the liquid container 100 is connected is not limited to the configuration described in the above embodiments. The connection receiver 50 may not be configured as a single member and may have a configuration in which each of the liquid introduction unit 51, the apparatus-side electrical connection unit 52 and the pair of positioning portions 53*a*, 53*b* are separately and independently disposed as different members.

G9. Modification Example 9

The liquid ejection apparatus 10 according to the above-described embodiments is a printer and the liquid ejection system 11 is an inkjet printing system. In contrast, the liquid ejection apparatus 10 may not be a printer and the liquid ejection system 11 may not be a printing system. For example, the liquid ejection apparatus 10 may be configured as a cleaning device configured to discharge liquid detergent. In this case, the liquid ejection system is a cleaning system.

The present invention is not limited to the above-described embodiments, examples and modification examples and can be implemented in the form of various configurations without departing from the gist of the present invention. For example, the technical characteristics in the embodiments, examples and modification examples which correspond to the aspects described in the Summary of Invention section can be replaced or combined as necessary in order to partly or entirely solve the above-mentioned problem or partly or entirely achieve the above-mentioned effect. In addition, any technical aspects not specified in the Specification as required components may be omitted as necessary in addition to those components described as components that may be omitted.

The present application claims priority from Japanese patent application 2016-106433, Japanese patent application 2016-106434 and Japanese patent application 2016-106435 filed on May 27, 2016 and Japanese patent application 2016-158399 filed on Aug. 12, 2016, the content of which is hereby incorporated by reference into this application.

REFERENCE SYMBOLS LIST

10 . . . liquid ejection apparatus, 10*c* . . . housing, 11 . . . liquid ejection system, 12 . . . front portion, 13 . . .

operation unit, 13*b* . . . operation button, 13*i* . . . display unit, 14 . . . media discharge port, 15 . . . media receiver, 16 . . . media storage port, 17 . . . media storage portion, 18 . . . cover member, 20 . . . controller, 30 . . . liquid ejector, 31 . . . head portion, 32 . . . tube, 32*r* . . . curved portion, 33 . . . nozzle, 34 . . . carriage, 35 . . . media feeder, 36 . . . feed roller, 40 . . . liquid supply portion, 42 . . . supply pipe, 43 . . . coupling portion, 45 . . . variable pressure generator, 46 . . . pressure transmission pipe, 50 . . . connection receiver, 50*a* . . . first connection receiver, 50*b* . . . second connection receiver, 51 . . . liquid introduction unit, 51*p* . . . through hole, 51*t* . . . tip portion, 52 . . . apparatus-side electrical connection unit, 52*t* . . . terminal portion, 53*a* . . . first positioning portion, 53*b* . . . second positioning portion, 53*g* . . . groove portion, 54 . . . apparatus-side fixing structure, 54*p* . . . protrusion (engagement portion), 54*t* . . . tip portion, 55 . . . fitting structure, 55*c* . . . protrusion, 56 . . . liquid receiver, 57 . . . proximal portion, 60 . . . case storage portion, 61, 61*a*, 61*b*, 61E, 61F . . . case, 62 . . . open member, 63 . . . through hole, 64 . . . rail groove, 65 . . . roller, 100, 100*a*, 100*b*, 100*c*, 100B, 100C, 100D, 100F . . . liquid container, 110, 110*a*, 110*b*, 110F . . . storage portion, 111 . . . first sheet member, 112 . . . second sheet member, 113 . . . outer peripheral edge, 120, 120*a*, 120*b*, 120F . . . connection member, 121 . . . first surface portion, 122 . . . second surface portion, 123 . . . third surface portion, 125 . . . fifth surface portion, 126 . . . sixth surface portion, 128 . . . slit, 131 . . . liquid outlet, 132 . . . peripheral portion, 133 . . . peripheral rib, 135 . . . protective wall portion, 136 . . . protective wall portion, 136*s* . . . slit, 137 . . . peripheral protrusion, 140 . . . container-side electrical connector, 141 . . . base plate portion, 141*s* . . . front surface, 142 . . . terminal portion, 144 . . . base plate placement portion, 144*s* . . . inclined surface, 145 . . . wall portion, 150*a* . . . first receiver, 150*b* . . . second receiver, 151*a* . . . first opening, 151*b* . . . second opening, 155 . . . fitting structure receiver, 156 . . . protrusion, 157 . . . valley portion, 160 . . . recess, 161 . . . fitting recess, 162 . . . side end support member, 200 . . . bottom wall portion, 201 . . . first side wall portion, 201*t* . . . engagement protrusion, 202 . . . second side wall portion, 202*t* . . . engagement protrusion, 203 . . . lid member, 203*t* . . . hook, 204 . . . cavity, 205 . . . front wall portion, 207 . . . fitting protrusion, 210 . . . protrusion, 211 . . . internal space, 213 . . . thin groove portion, 214 . . . step portion, 215 . . . groove portion, 215*a* . . . first groove portion, 215*b* . . . second groove portion, 215*c* . . . third groove portion, 215*d* . . . fourth groove portion, 216 . . . rib, 220 . . . case-side fixing structure, 221 . . . central protrusion, 222 . . . first wall surface, 223 . . . second wall surface, 224 . . . third wall surface, 225 . . . first protruding wall portion, 226 . . . second protruding wall portion (engaged portion, locking portion), 227 . . . third protruding wall portion, 228*a* . . . first bottom surface, 228*b* . . . second bottom surface, 228*c* . . . third bottom surface, 228*d* . . . fourth bottom surface, 228*e* . . . fifth bottom surface, 228*f* . . . sixth bottom surface, 229 . . . side wall surface, 230 . . . leaf rib, 231 . . . leg, 232 . . . additional wall portion, 235 . . . open/close lid, 236 . . . hinge portion, 237 . . . hook, 238 . . . fitting wall portion, 300 . . . packaging material, 301 . . . air intake port, 310 . . . suction pump, CL . . . central axis, CP . . . contact portion, LA . . . arrangement area, MP . . . medium, P1 to P6 . . . position

What is claimed is:

1. A combination of a liquid container and case configured to be mounted to and removed from a liquid ejection apparatus including, when directions parallel to a gravity direction are Z directions, a direction of the Z directions which is the same as the gravity direction is a +Z direction, a direction of the Z directions opposite to the gravity direction is a −Z direction, directions intersecting the Z directions are Y directions, one direction of the Y directions is a +Y direction and another direction of the Y directions is a −Y direction, directions orthogonal to the Z directions and the Y directions are X directions, one direction of the X directions is a +X direction and another direction of the X directions is a −X direction:

a case storage portion;

an apparatus-side fixing structure positioned on an end of the case storage portion on the +Y direction side;

a liquid introduction portion positioned on the end of the case storage portion on the +Y direction side; and an apparatus-side electrical connection unit positioned on the end of the case storage portion on the +Y direction side, the combination of the liquid container and case comprising:

a case configured to move along the +Y direction to thereby be inserted into the case storage portion; the case including:

a case-side fixing structure including a loop-shaped groove portion and an engaging portion which is provided in the groove portion and locks the apparatus-side fixing structure; and a liquid container configured to be mounted to and removed from the case, the liquid container including:

a storage portion configured to store liquid; and a connection member positioned on an end on the +Y direction side when the liquid container is in a mounting state in which the liquid container is mounted to the liquid ejection apparatus, wherein the connection member is provided with:

a liquid outlet configured to receive insertion of the liquid introduction portion in the +Y direction in the mounting state; and a container-side electrical connector configured to electrically connect to the apparatus-side electrical connection unit, the container-side electrical connector including a contact surface, a normal vector of which includes a −Z direction vector component and a +Y direction vector component in the mounting state, wherein the case-side fixing structure and the container-side electrical connector are provided at positions at which the case-side fixing structure and the container-side electrical connector at least partially overlap when viewed from the Z directions in a posture in the mounting state, wherein, in the posture in the mounting state, a width of the liquid container in the Z directions is smaller than a width of the liquid container in the Y directions and a width of the liquid container in the X directions, and wherein, in a state that the container-side fixing structure engages with the case-side fixing structure, the engaging portion restricts movement of the combination of the liquid container and case toward the −Y direction and the container-side electric connector electrically connects to the apparatus-side electrical connection unit while a force facing the −Y direction and the −Z direction is applied to the contact surface.

2. The combination of the liquid container and case in accordance with claim 1, wherein:

the connection member includes a first surface portion which faces the +Y direction, the connection member includes a protective wall portion which protrudes toward the +Y direction more than the first surface portion around the liquid outlet, and the liquid outlet is open at a position deeper on the −Y direction side than the first surface portion.

3. The combination of the liquid container and case in accordance with claim 1, wherein, the liquid ejection apparatus comprises a first positioning portion positioned on the end of the case storage portion on the +Y direction side, a first receiver configured to receive the first positioning portion in the mounting state is provided at the connection member, and in the posture in the mounting state, the container-side electrical connector is positioned between the liquid outlet and the first receiver in the X directions.

4. The combination of the liquid container and case in accordance with claim 3, wherein, in the posture in the mounting state, the liquid outlet is positioned between the container-side electrical connector and the first receiver in the Z directions.

5. The combination of the liquid container and case in accordance with claim 3, wherein, the liquid ejection apparatus comprises a second positioning portion positioned on the end of the case storage portion on the +Y direction side, a second receiver configured to receive the second positioning portion in the mounting state is provided at the connection member, and in the posture in the mounting state, the first receiver is positioned on the −X direction side relative to the liquid outlet and the second receiver is positioned on the +X direction side relative to the liquid outlet.

6. The combination of the liquid container and case in accordance with anyone of claim 5, wherein:

the first receiver has a first opening configured to receive insertion of the first positioning portion;

the second receiver has a second opening configured to receive insertion of the second positioning portion; and in the posture in the mounting state, an open width of the second opening in the X directions is larger than an open width of the first opening in the X directions.

* * * * *